(12) United States Patent
Watanabe et al.

(10) Patent No.: US 7,002,452 B2
(45) Date of Patent: Feb. 21, 2006

(54) COLLISION PREVENTING APPARATUS FOR A VEHICLE

(75) Inventors: Kazuya Watanabe, Anjo (JP); Takayuki Nakasho, Toyota (JP); Masahiko Sakabe, Anjo (JP); Keiji Kuzuya, Nagoya (JP); Masakatsu Nonaka, Toyota (JP); Munenaga Igaki, Toyota (JP); Sueharu Nagiri, Aichi (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/432,667
(22) PCT Filed: Nov. 26, 2001
(86) PCT No.: PCT/JP01/10263

§ 371 (c)(1),
(2), (4) Date: Nov. 14, 2003

(87) PCT Pub. No.: WO02/43029
PCT Pub. Date: May 30, 2002

(65) Prior Publication Data
US 2004/0085197 A1 May 6, 2004

(30) Foreign Application Priority Data
Nov. 24, 2000 (JP) .............................. 2000-357802
Nov. 24, 2000 (JP) .............................. 2000-357842

(51) Int. Cl.
*B60Q 1/00* (2006.01)
(52) U.S. Cl. ..................... 340/436; 340/435; 340/438; 340/901; 340/903; 701/96; 701/300

(58) Field of Classification Search ................ 340/435, 340/436, 901, 903, 988, 438, 905, 990; 701/96, 701/208, 211, 212, 300, 45, 70, 301; 180/168, 180/169; 342/69, 107
See application file for complete search history.

(56) References Cited

U.S. PATENT DOCUMENTS 5,572,428 A * 11/1996 Ishida et al. ................. 701/301

(Continued)

FOREIGN PATENT DOCUMENTS

EP 0 939 297 A2 9/1999

(Continued)

*Primary Examiner*—Hung Nguyen
(74) *Attorney, Agent, or Firm*—Buchanan Ingersoll PC

(57) ABSTRACT

To maintain a suitable vehicle separation between a driven vehicle and a preceding vehicle, a controller predicts a closest approach distance between the driven vehicle and the preceding vehicle on the assumption that the preceding vehicle decelerates at a deceleration detected by a sensor and that the driven vehicle decelerates at a prescribed assumed deceleration after running at a speed detected by the vehicle speed sensor for an idle running time. The controller predicts the speed at the time of closest approach when the separation between the preceding vehicle and the driven vehicle is the closest approach distance. A suitable vehicle separation is determined based on the predicted speed at the time of closest approach and a previously set length of time, and when the predicted closest approach distance is smaller than the suitable vehicle separation, a warning or braking force is generated.

25 Claims, 20 Drawing Sheets

U.S. PATENT DOCUMENTS

| | | | | |
|---|---|---|---|---|
| 5,850,176 A | * | 12/1998 | Kinoshita et al. | 340/435 |
| 5,906,184 A | * | 5/1999 | Maruyama et al. | 123/339.15 |
| 6,032,097 A | | 2/2000 | Iihoshi et al. | |
| 6,278,360 B1 | * | 8/2001 | Yanagi | 340/436 |
| 6,289,278 B1 | * | 9/2001 | Endo et al. | 701/208 |
| 6,311,123 B1 | * | 10/2001 | Nakamura et al. | 701/96 |

FOREIGN PATENT DOCUMENTS

| | | |
|---|---|---|
| JP | 6-231400 A | 8/1994 |
| JP | 6-277282 A | 8/1994 |
| JP | 6-242234 A | 9/1994 |
| JP | 11-66496 A | 3/1999 |
| JP | 2000-264092 A | 9/2000 |

\* cited by examiner $\tau$ : IDLE RUNNING TIME
Td: HEADWAY TIME
K : COEFFICIENT OF ASSUMED DECELERATION OF DRIVEN VEHICLE

DIAL SETTING FOR FIRST WARNING (ST)

COLLISION PREVENTING APPARATUS FOR A VEHICLE

TECHNICAL FIELD

This invention relates to a collision preventing apparatus for a vehicle which performs warning or braking when the distance from a preceding vehicle becomes inadequate.

BACKGROUND ART

As described in Japanese Published Unexamined Patent Application Hei 6-231400, for example, this type of apparatus finds a suitable vehicle separation at the present time based on the speed of a preceding vehicle, the deceleration of the preceding vehicle, the speed of a driven vehicle (vehicle being controlled), the maximum deceleration of the driven vehicle, and the like (in the prior art, the suitable vehicle separation corresponds to the vehicle separation at the present time, but the suitable vehicle separation in the present invention described below corresponds to a vehicle separation predicted for the future and is different from in the prior art), and it generates a warning when the actual vehicle separation is smaller than the suitable vehicle separation. In addition, this apparatus sets the suitable vehicle separation as "a separation such that there is not a collision in the case when the driven vehicle decelerates at a prescribed deceleration after a time lag $\tau$ after the start of deceleration of the preceding vehicle at a prescribed deceleration". Namely, on the assumption that the driven vehicle decelerates after the start of deceleration of the preceding vehicle, an alarm is generated when it is predicted that the vehicle separation when the two vehicles are closest is zero or becomes a certain margin (margin distance).

However, in the above-described conventional apparatus, since an alarm is generated when it is predicted that the vehicle separation when they are closest to each other is 0 or a certain margin distance, the vehicle separation of 0 or of a certain margin distance is permitted. Accordingly, there is the problem that the vehicle separation becomes inadequate in the case in which the preceding vehicle performs abrupt deceleration.

DISCLOSURE OF THE INVENTION

An object of the present invention is to provide a collision preventing apparatus which generates a warning or braking force at a more appropriate time so as to maintain a more appropriate vehicle separation between a driven vehicle and a preceding vehicle. One of its features is that a collision preventing apparatus has preceding vehicle running condition detecting means for detecting the running condition of a preceding vehicle, driven vehicle running condition detecting means for detecting the running condition of a driven vehicle, vehicle separation detecting means for detecting the vehicle separation between the driven vehicle and the preceding vehicle, closest approach distance predicting means for predicting the closest approach distance between the driven vehicle and the preceding vehicle based on the detected running condition of the preceding vehicle, the detecting running condition of the driven vehicle, and the detected vehicle separation, suitable vehicle separation determining means for determining a suitable vehicle separation (in future) corresponding to a vehicle separation between the preceding vehicle and the driven vehicle which is predicted for the future, and collision preventing means for generating a warning or braking force when the predicted closest approach distance is smaller than the determined suitable vehicle separation.

With this arrangement, the closest vehicle separation between the driven vehicle and the preceding vehicle is predicted by the closest approach distance predicting means based on the detected running condition of the preceding vehicle, the detected running condition of the driven vehicle, and the detected vehicle separation. Further, a suitable vehicle separation corresponding to the vehicle separation predicted for the future between the preceding vehicle and the driven vehicle is determined by the suitable vehicle separation determining means. Then, a warning or braking force is generated by the collision preventing means when the predicted closest approach distance is smaller than the determined suitable vehicle separation. Accordingly, the actual closest approach distance will be able to be maintained at the suitable vehicle separation by braking force due to braking operation by the driver in response to the generated warning or by an automatically generated braking force. In other words, a warning or braking force is generated in advance so that the actual closest approach distance in the future will be at least the suitable vehicle separation. Therefore, when the driven vehicle most closely approaches the preceding vehicle, a suitable vehicle separation with respect to the preceding vehicle can be guaranteed.

In this case, the suitable vehicle separation determining means is preferably configured (constituted) so as to predict the speed of the driven vehicle when the distance between the preceding vehicle and the driven vehicle becomes the closest approach distance as the speed at the time of closest approach, and so as to determine the suitable vehicle separation based on the predicted speed at the time of closest approach.

With this arrangement, the closest approach distance of both vehicles is predicted based on the detected running condition of the preceding vehicle such as, for instance, the speed of the preceding vehicle, the deceleration, or the like, the running condition of the driven vehicle such as, for instance, the speed of the driven vehicle or the like, and the detected vehicle separation. In addition, the speed of the driven vehicle when the driven vehicle most closely approaches the preceding vehicle is predicted, and the suitable vehicle separation is determined based on the predicted speed of the driven vehicle at the time of closest approach (the closest approach speed). Then, a warning or braking force is generated when the predicted closest approach distance is smaller than the determined suitable vehicle separation.

In the prediction of the closest approach, the driven vehicle most closely approaches the preceding vehicle at the time when the speeds of the driven vehicle and the preceding vehicle have become equal to each other (namely, at the time when the driven vehicle is running at the speed at the time of closest approach), and at this time of closest approach, the driven vehicle is following the preceding vehicle at the same speed at the time of closest approach. In general, a driver maintains the vehicle separation when following the preceding vehicle at a distance corresponding to the running speed at that time. Accordingly, as in the above arrangement, if a warning or braking force is generated in advance so that the predicted vehicle separation at the time of closest approach becomes the suitable vehicle separation which is determined based on the predicted speed at the time of closest approach, the vehicle separation when the driven vehicle completes decelerating with the deceleration of the preceding vehicle (namely, at the time of closest approach)

becomes a suitable vehicle separation corresponding to the speed at that time (the speed at the time of closest approach), and a safe vehicle separation can be guaranteed.

In this case, the suitable vehicle separation determining means is preferably configured so as to determine the suitable vehicle separation based on the product of the predicted speed at the time of closest approach and a previously set length of time.

The previously set time can be that referred to in this specification as the "headway time". The headway time is the value of the vehicle separation maintained by the driver between the preceding vehicle and the driven vehicle divided by the speed of the driven vehicle when the driven vehicle is following the preceding vehicle at approximately the same speed as the preceding vehicle. According to experiments, as long as the driver is the same, the headway time does not greatly vary over the various speed of the driven vehicle. Accordingly, as described above, if the suitable vehicle separation is determined based on the product of the speed at the time of closest approach and the headway time which is selected for each driver, after deceleration of the driven vehicle due to braking force generated by a braking operation performed in response to a warning or due to a generated braking force accompanying deceleration of the preceding vehicle, the vehicle separation between the driven vehicle and the preceding vehicle may become a safe distance matching the feelings of each driver. In addition, even if the previously set time is a constant time, due to the above-described feature, the vehicle separation between the driven vehicle and the preceding vehicle after deceleration of the driven vehicle may become a safe distance corresponding to the speed at the time of closest approach.

Similarly, the suitable vehicle separation determining means is preferably configured so as to determine the suitable vehicle separation based on the product of the predicted speed at the time of closest approach and a previously set length of time plus a prescribed margin vehicle separation.

With this arrangement, a distance which is the product of the predicted speed at the time of closest approach and a previously set time plus a margin vehicle separation is made a suitable vehicle separation. Therefore, even in a situation such as when the predicted speed at the time of closest approach is 0, i.e., in a situation in which the preceding vehicle stops first and then the driven vehicle stops, it is ensured that the distance between the preceding vehicle and the driven vehicle will be the margin vehicle separation. Thus, the driven vehicle can be safely stopped.

Furthermore, preferably such a collision preventing apparatus further includes target deceleration calculating means for calculating a target deceleration necessary to guarantee the suitable vehicle separation. In addition, it is preferable that the preceding vehicle running condition detecting means include preceding vehicle speed detecting means for detecting the speed of the preceding vehicle as a running condition of the preceding vehicle and preceding vehicle deceleration detecting means for detecting the deceleration of the preceding vehicle as a running condition of the preceding vehicle, the driven vehicle running condition detecting means includes driven vehicle speed detecting means for detecting the speed of the driven vehicle as a running condition of the driven vehicle and driven vehicle deceleration detecting means for detecting the deceleration of the driven vehicle as a running condition of the driven vehicle. It is also preferable that the closest approach distance predicting means be configured so as to predict the closest approach distance based on the detected speed of the preceding vehicle, the detected deceleration of the preceding vehicle, the detected speed of the driven vehicle, and the detected vehicle separation, and the collision preventing means includes braking force generating means for generating braking force so as to make the detected deceleration of the driven vehicle equal to the calculated target deceleration when the predicted closest approach distance becomes smaller than the determined suitable vehicle separation.

In this case, the closest approach distance predicting means is preferably configured so as to predict the closest approach distance on the assumption that the preceding vehicle decelerates at a deceleration detected by the preceding vehicle deceleration detecting means and that the driven vehicle decelerates at a prescribed assumed deceleration after running at a speed detected by the driven vehicle speed detecting means for a prescribed idle running time.

With this arrangement, the closest approach distance is predicted based on the detected speed of the preceding vehicle, the detected deceleration of the preceding vehicle, the detected speed of the driven vehicle, and the detected vehicle separation. Braking force is generated when the predicted closest approach distance becomes smaller than a suitable vehicle separation. At this time, a target deceleration necessary to guarantee the suitable vehicle separation is calculated by the target deceleration calculating means, and the braking force is generated so that the calculated target deceleration and the detected deceleration become equal to each other. As a result, a suitable vehicle separation is guaranteed when the preceding vehicle is moving, and the driven vehicle can be stopped while guaranteeing a suitable vehicle separation when the preceding vehicle stops.

In this case, the target deceleration calculating means is preferably configured so as to hold the calculated target deceleration when the vehicle separation becomes less than or equal to the vehicle separation recognition limit of the vehicle separation detecting means.

With this arrangement, a situation can be avoided in which the generation of braking force is stopped when the vehicle separation falls to or below the vehicle separation recognition limit of the vehicle separation detecting means even though the braking force is still necessary in fact.

Furthermore, the target deceleration calculating means is preferably configured so as to determine whether the preceding vehicle is moving when the predicted closest approach distance becomes larger than the determined suitable vehicle separation after braking force is generated by the braking force generating means, and so that if it is determined that the preceding vehicle is moving, then the target deceleration is maintained at a prescribed deceleration until the detected vehicle separation becomes a prescribed vehicle separation.

With this arrangement, after generation of braking force by the braking force generating means, even when the predicted closest approach distance has become larger than the determined suitable vehicle separation, if the preceding vehicle is moving, deceleration at a prescribed deceleration continues, so that a prescribed safe vehicle separation is guaranteed. In addition, by making the prescribed deceleration a relatively small deceleration, the deceleration can initially be made large and then subsequently changed to a smaller value. Therefore, desirable deceleration can be achieved.

In addition, the target deceleration calculating means is preferably configured so as to determine whether the calculated target deceleration is unstable, and so that if it is determined that the calculated target deceleration is unstable, then a different stable value is set as the target deceleration.

With this arrangement, when it is determined that the resulting target deceleration is unstable, for example, as a result of calculation involving dividing by a small value, a different and stable value is set as the target deceleration, and therefore, stable braking force control can be achieved. A different, stable value in this case is preferably the assumed deceleration of the driven vehicle (assumed deceleration) which is used when the closest approach distance predicting means determines the closest approach distance. With this arrangement, the braking force can be stably calculated, and braking with high precision can be realized.

Furthermore, such a collision preventing apparatus preferably has driven vehicle stopped state determining means for determining whether the driven vehicle is stopped, and stopped state braking force maintaining means for maintaining the braking force at a prescribed value when it is determined by the driven vehicle stopped stated determining means that the driven vehicle is stopped when the braking force is being generated by the braking force generating means in the case when the predicted closest approach distance occurs when the driven vehicle is stopped.

The situation in which the braking force being generated by the braking force generating means in the case when the predicted closest approach distance occurs when the driven vehicle is stopped means that it is demanded that the driven vehicle stop. However, when the driven vehicle is stopped, the generation of braking force by the braking force generating means is also stopped. In contrast, with the above configuration, the braking force is maintained at a prescribed value when it is determined that the driven vehicle is stopped, and as a result, the driven vehicle can be stopped with certainty.

In addition, such a collision preventing apparatus preferably has brake operation determining means for determining whether the brake apparatus of the driven vehicle is being operated by the driver, and braking force maintaining cancelling means for cancelling the maintaining of the braking force by the stopped state braking force maintaining means when it is determined that the brake apparatus is being operated. In this case, the brake operation determining means may be a switch which detects operation of the brake pedal, or it maybe configured so as to determine whether the brake apparatus is operating based on whether the hydraulic pressure of the brake master cylinder of the driven vehicle is larger than a prescribed hydraulic pressure.

Such a structure is employed because it is no longer necessary to maintain the braking force by the stopped state braking force maintaining means when it is determined that the brake apparatus is being operated by the driver.

Also, such a collision preventing apparatus preferably has driven vehicle stopped state determining means for determining whether the driven vehicle is stopped, and engine stopping means for stopping the engine of the driven vehicle when it is determined by the driven vehicle stopped state determining means that the driven vehicle is stopped when the braking force is generated by the braking force generating means in the case when the predicted closest approach distance occurs when the driven vehicle is stopped.

With this arrangement, when the predicted closest approach distance occurs when the driven vehicle stops, the driven vehicle is stopped by the braking force generated by the braking force generating means, and then the engine is stopped, so the driven vehicle can be maintained in a stopped state with certainty.

Another feature of this invention is that a collision preventing apparatus for a vehicle comprises preceding vehicle running condition detecting means for detecting the running condition of a preceding vehicle, driven vehicle running condition detecting means for detecting the running condition of a driven vehicle, vehicle separation detecting means for detecting the vehicle separation between the driven vehicle and the preceding vehicle, closest approach distance predicting means for predicting the closest approach distance of the driven vehicle and the preceding vehicle based on the detected running condition of the preceding vehicle, the detecting running condition of the driven vehicle, the detected vehicle separation, and an assumed deceleration of the driven vehicle, and collision preventing means for generating a warning or braking force when the predicted closest approach distance is smaller than a prescribed suitable vehicle separation, wherein the closest approach distance predicting means predicts the closest approach distance with the assumed deceleration being a deceleration smaller than the maximum deceleration determined by the road surface coefficient of friction of the road surface on which the driven vehicle is running.

With this arrangement, the closest approach distance between the driven vehicle and the preceding vehicle is predicted based on the detected running condition such as the speed, the deceleration, or the like of the preceding vehicle, the detected running condition such as the detected speed or the like of the driven vehicle, the detected vehicle separation, and the assumed deceleration of the driven vehicle, and a warning or braking force is generated when the predicted closest approach distance is smaller than a prescribed suitable vehicle separation. Furthermore, the closest approach distance is predicted on the assumption that the driven vehicle decelerates at the deceleration (assumed deceleration) which is smaller than the maximum deceleration (the maximum deceleration which can be performed by the driven vehicle) determined by the road surface coefficient of friction of the road surface on which the driven vehicle is running. Accordingly, even when the preceding vehicle begins to decelerate at a larger deceleration, a margin remains for the driven vehicle to increase its deceleration, so the driver, for example, can increase the deceleration of the driven vehicle.

In this case, the closest approach distance predicting means is preferably configured so as to obtain the assumed deceleration by multiplying the product of the coefficient of friction of the road surface on which the driven vehicle is running and the acceleration of gravity by a coefficient smaller than 1.

With this arrangement, an assumed deceleration which is smaller than the maximum deceleration obtained from the road surface on which the driven vehicle is running can be obtained easily and with certainty.

Another feature of this invention is that a collision preventing apparatus comprises preceding vehicle speed detecting means for detecting the speed of a preceding vehicle, preceding vehicle deceleration detecting means for detecting the deceleration of the preceding vehicle, driven vehicle speed detecting means for detecting the speed of a driven vehicle, vehicle separation detecting means for detecting the vehicle separation between the driven vehicle and the preceding vehicle, first closest approach distance predicting means for predicting a first closest approach distance between the driven vehicle and the preceding vehicle based on the detected speed of the preceding vehicle, the detected deceleration of the preceding vehicle, the detected speed of the driven vehicle, and the detected vehicle separation on the assumption that the preceding vehicle decelerates at the detected deceleration of the preceding vehicle and that the driven vehicle decelerates at a prescribed assumed deceleration after running at the detected speed of the driven vehicle for a prescribed idle running time, second closest approach distance predicting means for predicting a second closest approach distance based on the detected speed of the preceding vehicle, the detected deceleration of the preceding vehicle, the detected speed of the driven vehicle, and the detected vehicle separation on the assumption that the preceding vehicle begins to decelerate at a maximum deceleration determined by the road surface coefficient of friction and the driven vehicle begins to decelerate at the maximum deceleration after a prescribed length of time from the starting point of the deceleration of the preceding vehicle at a maximum deceleration by the time when the driven vehicle most closely approaches the preceding vehicle on the assumption that the first closest approach distance predicting means uses, and collision preventing means for generating a warning or braking force when the predicted first closest approach distance is smaller than a first suitable vehicle separation or the predicted second closest approach distance is smaller than a second suitable vehicle separation.

With this arrangement, a first closest approach distance between the driven vehicle and the preceding vehicle is predicted by the first closest approach distance predicting means based on the detected speed of the preceding vehicle, the detected deceleration of the preceding vehicle, the detected speed of the driven vehicle, and the detected vehicle separation on the assumption that the preceding vehicle decelerates at the detected deceleration of the preceding vehicle and that the driven vehicle decelerates at a prescribed assumed deceleration after running at the detected speed of the driven vehicle for a prescribed idle running time.

In addition, a second closest approach distance is predicted by the second closest approach distance predicting means based on the detected speed of the preceding vehicle, the detected deceleration of the preceding vehicle, the detected speed of the driven vehicle, and the detected vehicle separation on the assumption that the preceding vehicle begins to decelerate at a maximum deceleration determined by the road surface coefficient of friction and the driven vehicle begins to decelerate at the maximum deceleration after a prescribed length of time from the starting point of the deceleration of the preceding vehicle at a maximum deceleration by the time when the driven vehicle most closely approaches the preceding vehicle on the assumption that the first closest approach distance predicting means uses.

Then, a warning or braking force is generated by the collision preventing means when the predicted first closest approach distance is smaller than a first suitable vehicle separation or the predicted second closest approach distance is smaller than a second suitable vehicle separation. Accordingly, a warning or braking force is generated at a suitable timing in preparation for the situation where the preceding vehicle begins to decelerate at a deceleration larger than the initially detected deceleration. Therefore, a situation in which the driven vehicle approaches extremely close to the preceding vehicle is avoided in advance. It is preferable that the second suitable vehicle separation be less than or equal to the first suitable vehicle separation. For example, the second suitable vehicle separation may be a so-called margin vehicle separation which should be guaranteed between the preceding vehicle and the driven vehicle when the both vehicle stop.

Another feature of this invention is that a collision preventing apparatus comprises preceding vehicle running condition detecting means for detecting the running condition of a preceding vehicle, driven vehicle running condition detecting means for detecting the running condition of a driven vehicle, vehicle separation detecting means for detecting the vehicle separation between the driven vehicle and the preceding vehicle, closest approach distance predicting means for predicting the closest approach distance of the driven vehicle and the preceding vehicle based on the detected running condition of the preceding vehicle, the detecting running condition of the driven vehicle, the detected vehicle separation, and an assumed deceleration which is assumed for the driven vehicle, and collision preventing means for generating a warning or braking force when the predicted closest approach distance is smaller than a prescribed suitable vehicle separation and for (also) generating a warning or braking force when the actual vehicle separation detected by the vehicle separation detecting means is smaller than a prescribed distance. Furthermore, in this case, it is preferable that the driven vehicle running condition detecting means be configured so as to detect at least the speed of the driven vehicle, and that the collision preventing means set the product of the detected speed of the driven vehicle and a previously set prescribed length of time plus a prescribed margin vehicle separation as the prescribed distance.

With this arrangement, the closest approach distance between the driven vehicle and the preceding vehicle is predicted based on the detected running condition of the preceding vehicle such as the speed of the preceding vehicle, the deceleration, or the like, the detected running condition of the driven vehicle such as the speed of the driven vehicle or the like, the detected vehicle separation, and the assumed deceleration of the driven vehicle. Further, a warning or braking force is generated when the predicted closest approach distance is smaller than a prescribed suitable vehicle separation. In addition, even when the predicted closest approach distance is not smaller than the prescribed suitable vehicle separation, a warning or braking force is (also) generated when the actual vehicle separation detected by the vehicle separation detecting means is smaller than a prescribed distance (such as a distance equal to the value that the product of the detected speed of the driven vehicle and a previously set prescribed length of time plus a prescribed margin vehicle separation). Accordingly, even in a case such as when a vehicle which overtook the driven vehicle from behind cuts just in front of the driven vehicle by changing lanes, a warning or braking force is generated. Thus, a safe vehicle separation can be maintained.

Another feature of this invention is that a collision preventing apparatus comprises preceding vehicle running condition detecting means for detecting the running condition of a preceding vehicle, driven vehicle running condition detecting means for detecting the running condition of a driven vehicle, vehicle separation detecting means for detecting the vehicle separation between the driven vehicle and the preceding vehicle, closest approach distance predicting means for predicting the closest approach distance between the driven vehicle and the preceding vehicle based on the detected running condition of the preceding vehicle, the detecting running condition of the driven vehicle, the detected vehicle separation, and an assumed deceleration which is assumed for the driven vehicle, suitable vehicle separation determining means for predicting the speed of the driven vehicle when the distance between the preceding vehicle and the driven vehicle becomes the closest approach distance as the speed at the time of closest approach and for determining a suitable vehicle separation based on the predicted speed at the time of closest approach, and collision preventing means for generating a warning or braking force when the predicted closest approach distance is smaller than the suitable vehicle separation determined by the suitable vehicle separation determining means, and for stopping the generation of the warning or the braking force when the predicted closest approach distance has become larger than the suitable separation determined by the suitable vehicle separation determining means by a prescribed distance after the generation of the warning or the braking force.

With this arrangement, the closest approach distance between the driven vehicle and the preceding vehicle is predicted based on the detected running condition of the preceding vehicle such as the speed of the preceding vehicle, the deceleration, or the like, the detected running condition of the driven vehicle such as the speed of the driven vehicle or the like, the detected vehicle separation, and the assumed deceleration of the driven vehicle. Further, the speed of the driven vehicle when the driven vehicle most closely approaches the preceding vehicle is predicted, and a suitable vehicle separation is determined based on the predicted speed of the driven vehicle at the time of closest approach (speed at the time of closest approach). Then, a warning or braking force is generated when the predicted closest approach distance is smaller than the determined suitable vehicle separation. In addition, after generation of the warning or the braking force, generation of the warning or the braking force is stopped when the predicted closest approach distance becomes larger than the suitable vehicle separation determined by the suitable vehicle separation determining means by a prescribed distance. Accordingly, since it becomes unlikely for the warning or the braking force to be generated immediately after generation of the warning or the braking force is stopped, frequent generation of the warning or the braking force can be avoided.

Another feature of this invention is that a collision preventing apparatus comprises preceding vehicle speed detecting means for detecting the speed of a preceding vehicle, preceding vehicle deceleration detecting means for detecting the deceleration of the preceding vehicle, driven vehicle speed detecting means for detecting the speed of a driven vehicle, vehicle separation detecting means for detecting the vehicle separation between the driven vehicle and the preceding vehicle, first collision preventing means for predicting a first closest approach distance between the driven vehicle and the preceding vehicle and a first speed at the time of closest approach on the assumption that the preceding vehicle decelerates at the detected deceleration and that the driven vehicle decelerates at a first assumed deceleration after running for a first idle running time at the detected speed and for generating a warning or braking force when the predicted first closest approach distance is smaller than a first suitable vehicle separation determined based on the product of the predicted first speed at the time of closest approach and a previously set first length of time, second collision preventing means for predicting a second closest approach distance between the driven vehicle and the preceding vehicle and a second speed at the time of closest approach on the assumption that the preceding vehicle decelerates at the detected deceleration and that the driven vehicle decelerates at a second assumed deceleration greater than the first assumed deceleration after running at the detected speed for a second idle running time less than the first idle running time and for generating a warning or braking force when the predicted second closest approach distance is smaller than a second suitable vehicle separation determined based on the product of the predicted second speed at the time of closest approach and a previously set second length of time which is less than the first length of time, and preventive measure continuing means for continuing the generation of a warning or braking force by the second collision preventing means until a situation is achieved where the warning or the braking force is no longer generated by the first collision preventing means when a warning or braking force has been generated by the second collision preventing means.

With this arrangement, a first closest approach distance between the driven vehicle and the preceding vehicle and a first speed at the time of closest approach are predicted by the first collision preventing means on the assumption that the preceding vehicle decelerates at the detected deceleration and that the driven vehicle decelerates at a first assumed deceleration after running for a first idle running time at the detected speed. A warning or braking force is generated when the predicted first closest approach distance is smaller than a first suitable vehicle separation determined based on the product of the predicted first speed at the time of closest approach and a previously set first length of time.

In addition, a second closest approach distance between the driven vehicle and the preceding vehicle and a second speed at the time of closest approach are predicted by the second collision preventing means on the assumption that the preceding vehicle decelerates at the detected deceleration and that the driven vehicle decelerates at a second assumed deceleration greater than the first assumed deceleration after running at the detected speed for a second idle running time less than the first idle running time. A warning or braking force is generated when the predicted second closest approach distance is smaller than a second suitable vehicle separation determined based on the product of the predicted second speed at the time of closest approach and a previously set second length of time which is less than the first length of time. As a result, the second collision preventing means generates a warning or braking force at a later timing than the first collision preventing means.

Besides, the generation of the warning or the braking force by the second collision preventing means is continued by the preventive measure continuing means until a state is obtained in which the warning or the braking force is not generated by the first collision preventing means. Since the first collision preventing means is configured to generate a warning or braking force at an earlier timing than the second collision preventing means, a vehicle separation which is at least a safe distance is guaranteed if the state is realized in which the warning or the braking force is not generated by the first collision preventing means. Accordingly, in the above arrangement, the generation of a warning or braking force by the second collision preventing means is continued until such a state is realized.

In this case, it is preferable that the collision preventing apparatus preferably comprise brake operation determining means for determining whether a brake apparatus of the driven vehicle is being operated by the driver, and is preferable that the first collision preventing means be configured so as to predict the first closest approach distance with changing the first idle running time to a longer time (i.e., lengthen the first idle running time) when it is determined by the brake operation determining means that the brake is not being operated than when it is determined that the brake is being operated. Then, it is preferable that the preventive measure continuing means be configured such that the generation of the warning or the braking force by the second collision preventing means is made to continue until a state is realized in which the warning or the braking force is not generated even if the first collision preventing means predicts the first closest approach distance based on the first idle running time which is changed to the longer time.

With this arrangement, when the brake is in a non-operating state, the first idle running time is made longer than when the brake is in an operating state, for instance, by a length of time corresponding to the time that is required to change a position of the driver's foot from on the accelerator pedal to on the brake pedal. The first closest approach distance is predicted using the extended first idle running time, and the necessity for generating a warning or braking force is determined. In addition, the generation of the warning or the braking force by the second collision preventing means is continued by the preventive measure continuing means until a state is realized in which the warning or the braking force is not generated even when the first closest approach distance is predicted based on the first idle running time which is extended by the first collision preventing means.

A warning or braking force is generated earlier by the first collision preventing means than by the second collision preventing means. In addition, the first collision preventing means generates a warning or braking force even earlier when the brake is in a non-operating state in which the idle running time is extended than when the brake is in an operating state. Thus, since it can be said that a safer vehicle separation is guaranteed when the brake is in a non-operating state and the first collision preventing means is not generating a warning or braking force, generation of a warning or braking force by the second collision preventing means is stopped at the time when such a state are obtained.

Another feature of this invention is that a collision preventing apparatus comprises preceding vehicle speed detecting means for detecting the speed of a preceding vehicle, preceding vehicle deceleration detecting means for detecting the deceleration of the preceding vehicle, driven vehicle speed detecting means for detecting the speed of a driven vehicle, vehicle separation detecting means for detecting the vehicle separation between the driven vehicle and the preceding vehicle, brake operation determining means for determining whether the brake apparatus of the driven vehicle is being operated by the driver, collision preventing means for predicting a closest approach distance between the driven vehicle and the preceding vehicle based on the detected speed of the preceding vehicle, the detected deceleration of the preceding vehicle, the detected speed of the driven vehicle, and the detected vehicle separation on the assumption that the preceding vehicle decelerates at the detected deceleration and that the driven vehicle decelerates at a prescribed assumed deceleration after running for a prescribed idle running time at the detected speed and for generating a warning or braking force when the predicted closest approach distance is smaller than a prescribed suitable vehicle separation, and idle running time changing means for changing the prescribed idle running time to a longer time when it is determined by the brake operation determining means that the brake is not being operated than when it is determined that the brake is being operated.

With this arrangement, the closest approach distance between the driven vehicle and the preceding vehicle is predicted on the assumption that the preceding vehicle decelerates at the detected deceleration and that the driven vehicle decelerates at a prescribed assumed deceleration after running for a prescribed idle running time at the detected speed, and a warning or braking force is generated when the predicted closest approach distance is smaller than a prescribed suitable vehicle separation. In addition, the prescribed idle running time is changed to a longer period of time when it is determined by the brake operation determining means that the brake is not being operated than when it is determined that the brake is being operated. Accordingly, a warning or braking force can be generated at a more suitable timing taking the length of time for a driver to change the position of the driver's foot from on the accelerator pedal or the like to on the brake pedal into consideration.

Another feature of this invention is that a collision preventing apparatus comprises preceding vehicle speed detecting means for detecting the speed of a preceding vehicle, preceding vehicle deceleration detecting means for detecting the deceleration of the preceding vehicle, driven vehicle speed detecting means for detecting the speed of a driven vehicle, vehicle separation detecting means for detecting the vehicle separation between the driven vehicle and the preceding vehicle, parameter storing means for storing a plurality of sets of parameters which determine an idle running time, an assumed vehicle deceleration of a driven vehicle, and a suitable vehicle separation to output one of the plurality of stored sets of parameters in response to operation from the outside, and collision preventing means for predicting a closest approach distance between the driven vehicle and the preceding vehicle based on the detected speed of the preceding vehicle, the detected deceleration of the preceding vehicle, the detected speed of the driven vehicle, and the detected vehicle separation on the assumption that the preceding vehicle decelerates at the detected deceleration and that the driven vehicle decelerates at an assumed deceleration determined based on the output parameters after running at the detected speed for a prescribed idle running time determined based on the output parameters and for generating a warning or braking force when the predicted closest approach distance is smaller than a suitable vehicle separation determined based on the output parameters.

With this arrangement, a plurality of sets of parameters which determine an idle running time, an assumed deceleration of a driven vehicle, and a suitable vehicle separation are stored in a parameter storing means, and one of the plurality of stored sets of parameters is output in response to an operation from the outside. Then, a closest approach distance between the driven vehicle and the preceding vehicle is predicted on the assumption that the preceding vehicle decelerates at the detected deceleration and that the driven vehicle decelerates at the assumed deceleration of the driven vehicle determined based on the output parameters after running at the detected speed for a prescribed idle running time determined based on the output parameters, and a warning or braking force is generated when the predicted closest approach distance is smaller than a suitable vehicle separation determined based on the output parameters.

The idle running time includes the time for changing the position of driver's foot from on the accelerator pedal or the like to on the brake pedal. The time for changing the position of driver's foot differs from one driver to another. In general, there is a strong tendency that a driver who takes a long time to change a position of his or her foot decelerates at a relatively small deceleration and maintain a large vehicle separation when driving. By employing a configuration in which a plurality of sets of parameters which determine an idle running time, a driven vehicle assumed deceleration, and a suitable vehicle separation are stored and in which they can be selected by an operation from the outside such as by a dial switch or the like, a warning and braking force can be generated at a timing which matches the driving characteristics of each driver.

In this case, the suitable vehicle separation is preferably determined by the product of the speed at the time of closest approach predicted on the above assumptions and a previously set length of time, and the parameter which determines the suitable vehicle separation is preferably the previously set length of time. By this arrangement, the above-described headway time can be the parameter for determining the suitable vehicle separation, and therefore, a warning or braking force can be generated at a timing which matches the characteristics of each driver.

BEST MODE FOR CARRYING OUT THE INVENTION

Figure 1:
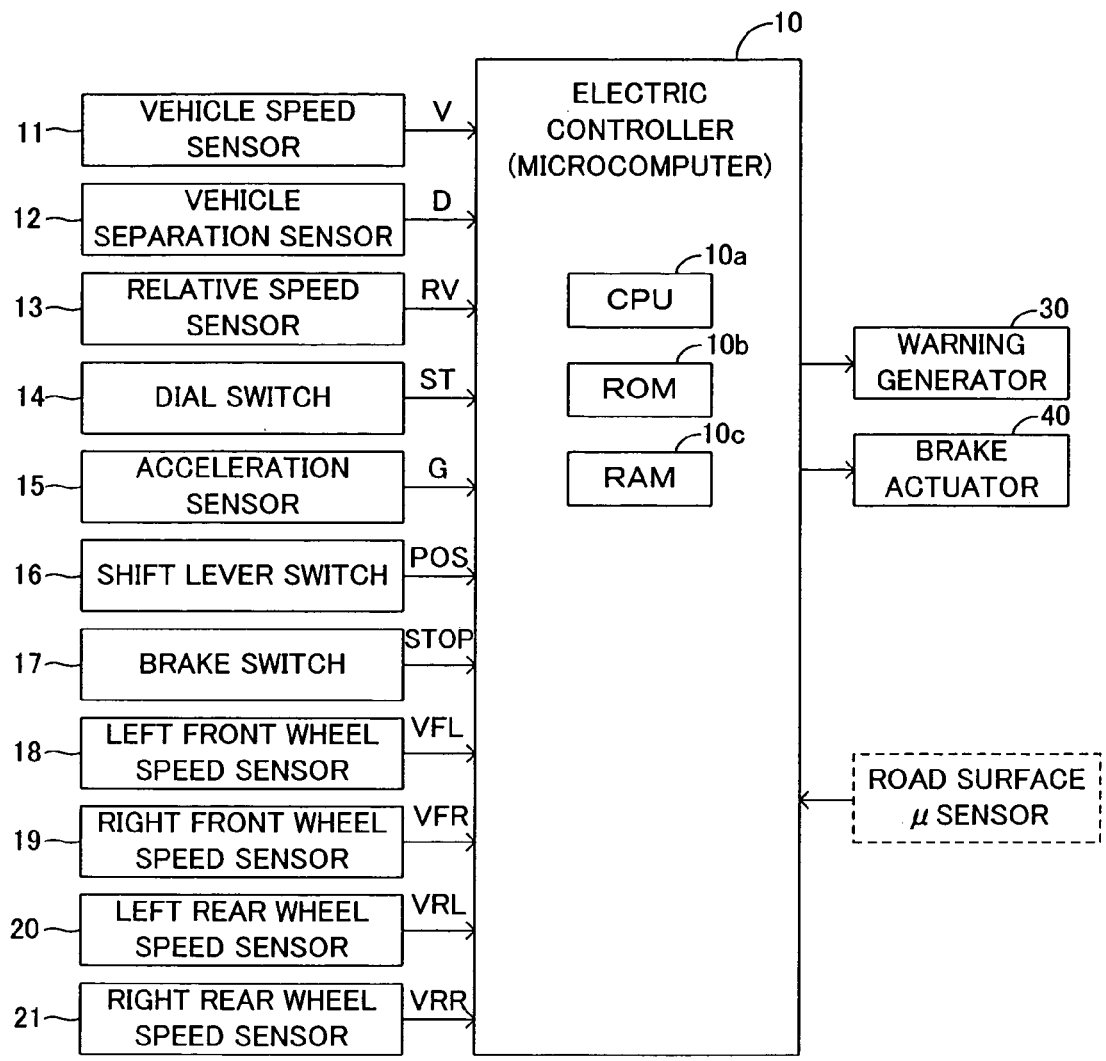
FIG. 1 is a system diagram of one embodiment of a collision preventing apparatus for a vehicle according to the present invention.

Below, one embodiment of a collision preventing apparatus for a vehicle according to the present invention will be described while referring to the drawings. FIG. 1 schematically shows the structure of a collision preventing apparatus according to this embodiment. This collision preventing apparatus has an electric controller 10 mounted on a vehicle. The electric controller 10 comprises a microcomputer which includes a CPU 10a, a ROM 10b, a RAM 10c, and the like that are connected with each other by an unillustrated bus. The CPU 10a executes a program described below and stored in the ROM 10b while utilizing a temporary storage function of the RAM 10c.

The electric controller 10 is connected to a vehicle speed sensor 11, an obstacle sensor serving as a vehicle separation sensor 12, a relative speed sensor 13, a dial switch 14, an acceleration sensor 15, a shift lever switch 16, a brake switch 17, a left front wheel speed sensor 18, a right front wheel speed sensor 19, a left rear wheel speed sensor 20, and a right rear wheel speed sensor 21. The CPU 10a receives the signals from these sensors and switches. In addition, the electric controller 10 is connected to a warning apparatus 30 and a brake actuator 40, and the CPU 10a supplies prescribed signals thereto.

The vehicle speed sensor 11 senses the speed of the driven vehicle (the vehicle being driven) and outputs the speed V of the driven vehicle (the driven vehicle speed). The vehicle separation sensor 12 includes laser radar, and it measures the distance (vehicle separation) between the driven vehicle and the preceding vehicle (the vehicle positioned in front of the driven vehicle, also referred to the vehicle in front) and it outputs the vehicle separation D. Notably, the vehicle separation sensor may be a sensor which measures the vehicle separation D using milliwave radar, or it may be a sensor which measures the vehicle separation D using a stereo image recognition method.

The relative speed sensor 13 constitutes a portion of a preceding vehicle running condition detecting means which detects the running condition of the preceding vehicle. It is a Doppler sensor using milliwaves, and it measures and outputs the relative speed RV between the driven vehicle and the preceding vehicle. The dial switch 14 can be switched by the driver to selectively take one of seven positions. It outputs a selected position signal ST corresponding to each position to which it is operated. The dial switch 14 forms a portion of a parameter storing means which stores a plurality of sets of parameters, which are the idle running time $\tau$ which is a parameter (referred to below as a parameter) which determines the idle running time $\tau$, $\mu$ which is a parameter which determines the assumed deceleration $\mu \cdot g$ of the driven vehicle, and the headway time Td which is a parameter which determines the suitable vehicle separation Dt. These parameters will be described below.

The acceleration sensor 15 is of the semiconductor type. It senses the acceleration acting on the driven vehicle in the fore and aft direction and outputs an acceleration signal G. The shift lever switch 16 detects the shift lever position (parking position P, reverse position R, drive position D, etc.) of an unillustrated automatic transmission of the driven vehicle and outputs a signal POS corresponding to the detected shift lever position. The brake switch 17 determines (detects) whether the brake pedal of the driven vehicle, which is omitted from the drawings, is in an operating or nonoperating state, and it outputs a signal STOP which has a value of 1 when the pedal is being operated and a value of 0 when it is not being operated. It forms a portion of a brake operation determining means which determines whether the brake apparatus is being operated by the driver.

The left front wheel speed sensor 18 and the right front wheel speed sensor 19 detect and output the wheel speed VFL of the left front wheel (a non-driven wheel) and the wheel speed VFR of the right front wheel (a non-driven wheel), respectively. Similarly, the left rear wheel speed sensor 20 and the right rear wheel speed sensor 21 detect and output the wheel speed VRL of the left rear wheel (a driven wheel) and the wheel speed VRR of the right rear wheel (a driven wheel), respectively.

The warning apparatus 30 includes an unillustrated display and a warning sound generating apparatus. In response to instructions from the CPU 10a of the electric controller 10, the apparatus 30 displays necessary information and generates necessary warning sound. The brake actuator 40 controls the braking hydraulic pressure (brake hydraulic pressure) of an unillustrated brake apparatus independently of the braking hydraulic pressure of the brake master cylinder which is increased and decreased by the operation of the brake pedal, to vary the braking force generated by the hydraulic brakes of the left and right front wheels and of left and right rear wheels. When the brake apparatus is an electric powered brake in which braking force is generated by the torque generated by an electric motor, the brake actuator 40 may correspond to the electric motor.

Next, the operating principle of the collision preventing apparatus configured in the above manner will be explained. The object of this collision preventing apparatus is to guarantee a safe distance between the driven vehicle and the preceding vehicle. Based on the conditions and the like of the preceding vehicle and the driven vehicle, it carries out (generates) a first warning, then it urges braking operation by the driver by carrying out (generating) a second warning, and it carries out intervention braking in which it automatically operates the braking apparatus if braking operation is not carried out even after the second warning is generated. Even in the case in which the driver performs braking operation due to the first or second warning, when the braking force is inadequate with respect to a target deceleration GT, it increases the braking force (it carries out assisting of braking operation (i.e., it carries out so-called brake assist operation.)).

As the first warning, this collision preventing apparatus generates a relatively gentle warning sound (for example, a warning sound with a normal volume which is intermittently generated) from the warning sound generating apparatus of the warning apparatus 30. As the second warning, a warning sound is generated from the warning sound generator of the warning apparatus 30 which draws the attention of the driver even more than the first warning (such as a warning sound with a normal volume which is continuously generated), and a mark which draws the driver's attention is displayed on the display of the warning apparatus. At the time of intervention braking, a warning similar to the second warning is carried out, but the volume of the warning sound is increased.

Figure 2:
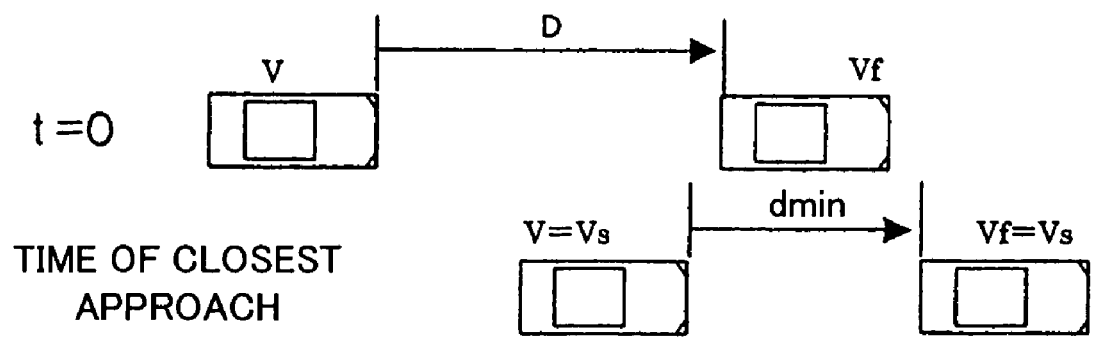
FIG. 2 is a schematic diagram showing the condition of the driven vehicle and the preceding vehicle at the present time, and the condition of the driven vehicle and the preceding vehicle at the time of closest approach (at the time when the driven vehicle approaches the preceding vehicle most closely).

In this embodiment, the closest approach distance dmin (the distance when the driven vehicle most closely approaches the preceding vehicle) shown in FIG. 2 is predicted by calculations based on the condition of the preceding vehicle, the condition of the driven vehicle, and the like, and the first warning, the second warning, and intervention braking are performed when it is determined that the closest vehicle separation dmin cannot guarantee a prescribed suitable vehicle separation Dt (i.e., dmin<Dt). In addition, it is determined whether to perform any of the first warning, the second warning, or intervention braking by varying the parameters used to obtain the closest approach distance dmin (the parameters being the idle running time $\tau$ and the driven vehicle assumed deceleration $\mu \cdot g$ (g is the acceleration due to gravity), as described below), and by varying the parameter for determining the suitable vehicle separation Dt (the parameter being the headway time Td described below). Here, the method of determining the closest approach distance dmin will be described, firstly.

(Closest Approach Distance dmin)

It is assumed that the speed of the preceding vehicle at the present time (t=0) is Vf, that the preceding vehicle will decelerate (or accelerate) with maintaining constant the deceleration $\mu f \cdot g$ which is detected at the present time, and that the driven vehicle will decelerate at a constant deceleration (assumed deceleration of the driven vehicle) of $\mu \cdot g$ after running at the present speed V for an idle running time $\tau$ from the present time. The closest approach distance dmin is determined using these assumptions above and the actual vehicle separation D (the distance between the preceding vehicle and the driven vehicle) at the present time. In order to predict (determine) the closest approach distance dmin, it is necessary to consider the four cases of (1) the case in which the preceding vehicle first stops and then the driven vehicle stops, (2) the case in which the preceding vehicle is stopped from the beginning, (3) the case in which the driven vehicle most closely approaches the preceding vehicle which is moving after the elapse of the idle running time $\tau$, and (4) the case in which the driven vehicle most closely approaches the preceding vehicle before the elapse of the idle running time $\tau$. More concretely, the closest approach distance dmin is determined as described below.

Prior to considering each of the above cases, the basic equations to be used below will be set forth. The time (stopping time) t required for a vehicle with an initial speed V0 to stop at a constant deceleration $\alpha$ is expressed by the following Equation 1.

$$t = V0/\alpha \qquad \text{Equation 1}$$

The distance D0 which a vehicle travels with an initial speed V0 and a deceleration a is expressed by the following Equation 2.

$$D0 = V0 \cdot t - \alpha \cdot t^2/2 \qquad \text{Equation 2}$$

Accordingly, if the stopping time t in the above Equation 1 is substituted into the above Equation 2, the distance DL required for a vehicle with an initial speed V0 and a deceleration $\alpha$ to stop is found by the following Equation 3.

$$DL = V0^2/(2 \cdot \alpha) \qquad \text{Equation 3}$$

Figure 3:
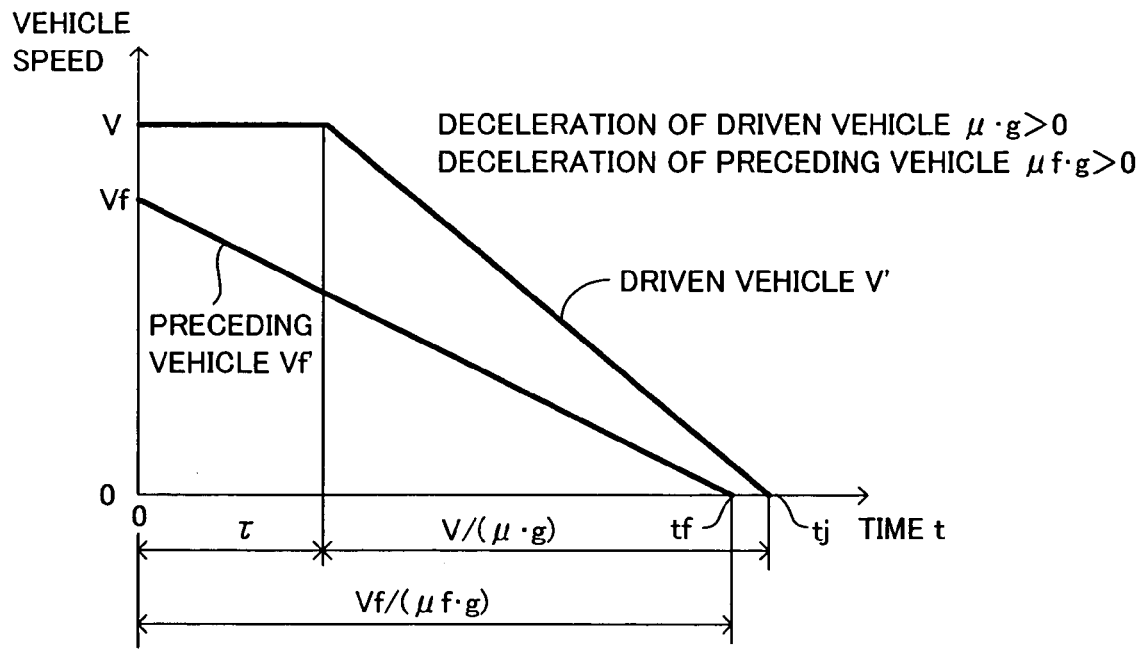
FIG. 3 is a figure showing the change in vehicle speed with respect to time for the preceding vehicle and the driven vehicle in a case where the preceding vehicle first stops and then the driven vehicle stops.
Figure 4:
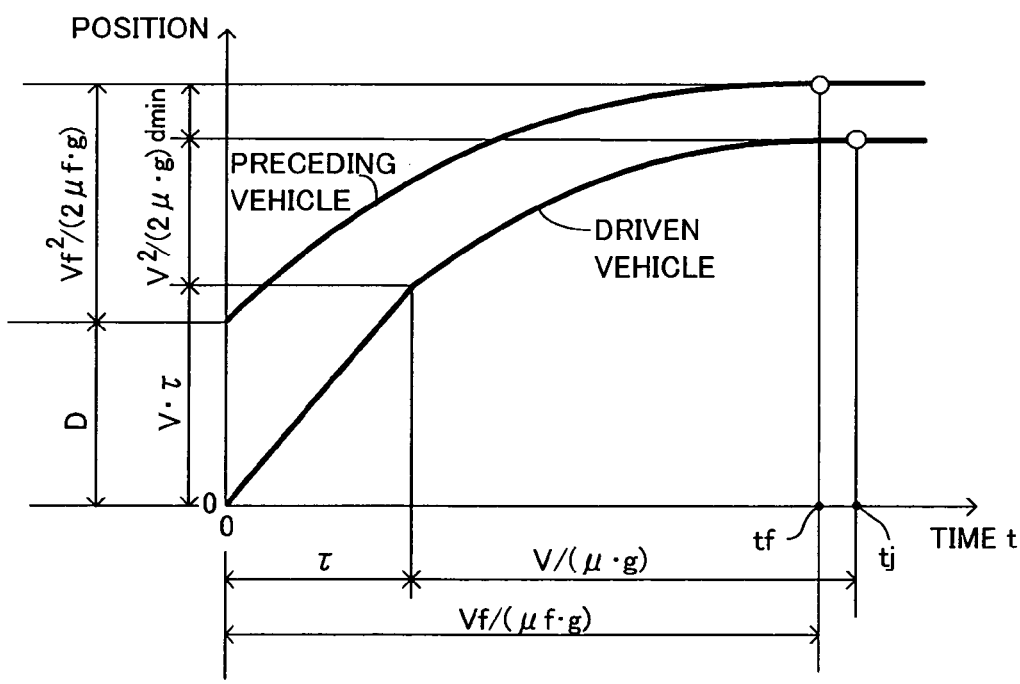
FIG. 4 is a figure showing the change in position with respect to time for the preceding vehicle and the driven vehicle in the case of FIG. 3.

(1) The Case in which the Preceding Vehicle First Stops and then the Driven Vehicle Stops FIG. 3 shows the changes in speed with respect to time of the preceding vehicle and the driven vehicle for the case in which the preceding vehicle first stops and then the driven vehicle stops. FIG. 4 shows the changes in position with respect to time of the preceding vehicle and the driven vehicle for the same case. As is apparent from the above Equation 1, the time tf until the preceding vehicle stops is expressed by the following Equation 4.

$$tf = Vf/(\mu f \cdot g) \qquad \text{Equation 4}$$

Accordingly, as is clear from the above Equation 2 and FIG. 4, the position Df at which the preceding vehicle stops is expressed by the following Equation 5, using the position of the driven vehicle at the present time as a reference.

$$Df = D + Vf^2/(2 \cdot \mu f \cdot g) \qquad \text{Equation 5}$$

On the other hand, as is clear from the above Equation 1 and FIG. 4, the time tj until the driven vehicle stops is expressed by the following Equation 6.

$$tj = \tau + V/(\mu \cdot g) \qquad \text{Equation 6}$$

Furthermore, as is clear from the above Equation 3 and FIG. 4, the position Dj at which the driven vehicle stops is expressed by the following Equation 7.

$$Dj = V \cdot \tau + V^2/(2 \cdot \mu \cdot g) \qquad \text{Equation 7}$$

Accordingly, from the above Equation 5 and the above Equation 7, the closest approach distance dmin (=Df−Dj) when the driven vehicle stops is expressed by the following Equation 8.

$$d\text{min} = \{D + Vf^2/(2 \cdot \mu f \cdot g)\} - \{V \cdot \tau + V^2/(2 \cdot \mu \cdot g)\} \qquad \text{Equation 8}$$

The condition in which Equation 8 is applicable (the condition in which the closest approach distance dmin should be calculated with using Equation 8, referred to below simply as "condition of applicability") is that the time tf until the preceding vehicle stops is less than or equal to the time tj until the driven vehicle stops. Therefore, based on the above Equation 4 and the above Equation 6, the condition in which Equation 8 is applicable is expressed by the following Equation 9.

$$Vf \leq \mu f \cdot g \cdot \{\tau + V/(\mu \cdot g)\} \qquad \text{Equation 9}$$

In addition, when considering that the preceding vehicle is decelerating and when considering necessity to treat a vehicle having a speed with an absolute value of less than a prescribed speed Vf0 (Vf0>0) as a vehicle which stops because of the sensing ability of the relative speed sensor 13, the conditions of applicability expressed by the following Equations 10 and 11 are added for the above-described Equation 8. It is noted that the speed at the time of closest approach Vs is 0.

$$\mu f \geq 0 \qquad \text{Equation 10}$$

$$Vf \geq Vf0 \qquad \text{Equation 11}$$

(2) The Case in which the Preceding Vehicle is Initially Stopped (the Case in which the Driven Vehicle is Approaching a Stationary Object)

In this case, the position Df of the preceding vehicle is the vehicle separation D at the present time. Accordingly, from this fact and from the stop position Dj of the driven vehicle shown by the above Equation 7, the following Equation 12 is obtained. The condition of applicability in this case is expressed by the following Equation 13 for the similar reason why the above-described Equation 11 is obtained. The speed at the time of closest approach speed Vs is 0.

$$d\text{min} = D - \{V \cdot \tau + V^2/(2 \cdot \mu \cdot g)\} \qquad \text{Equation 12}$$

$$|Vf| < Vf0 \qquad \text{Equation 13}$$

Figure 5:
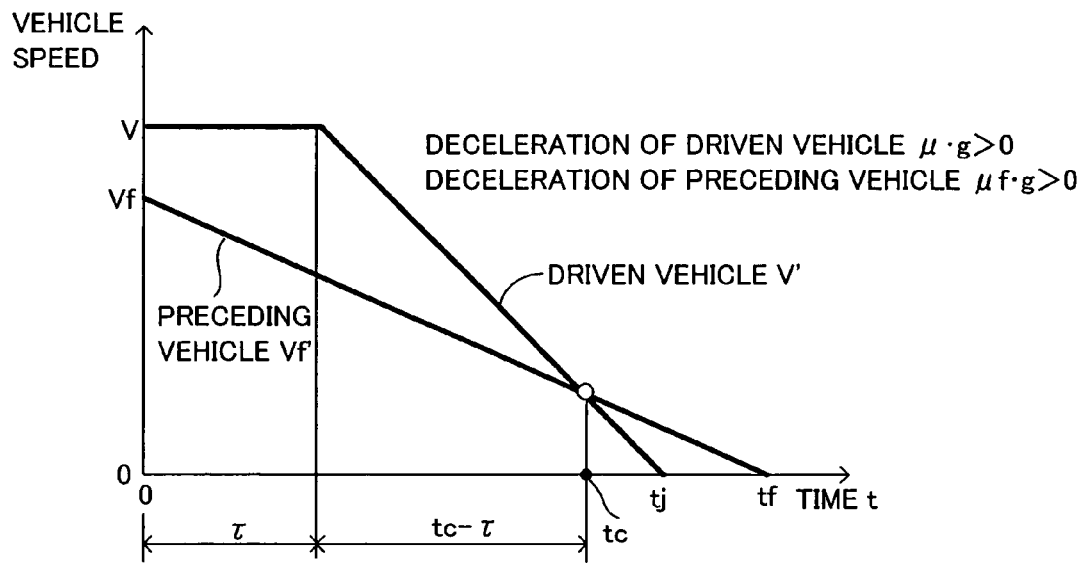
FIG. 5 is a figure showing the change in speed with respect to time for the driven vehicle and the preceding vehicle in the case where the driven vehicle, after an idle running time of the driven vehicle, most closely approaches the preceding vehicle while the preceding vehicle is running with decelerating.
Figure 6:
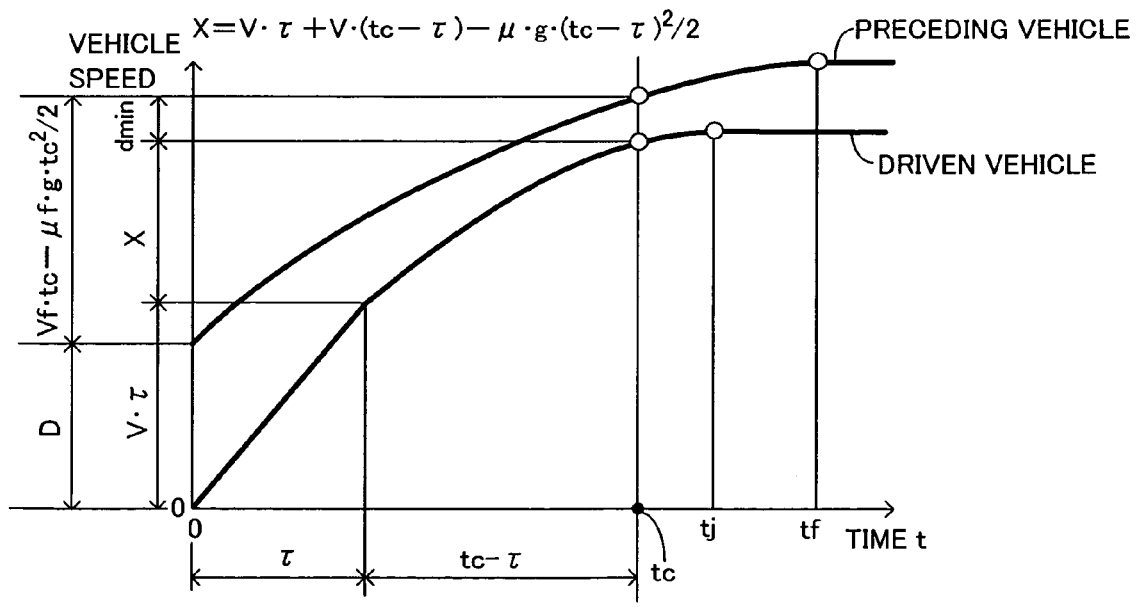
FIG. 6 is a figure showing the change in position with respect to time for the driven vehicle and the preceding vehicle in the case of FIG. 5.
Figure 7:
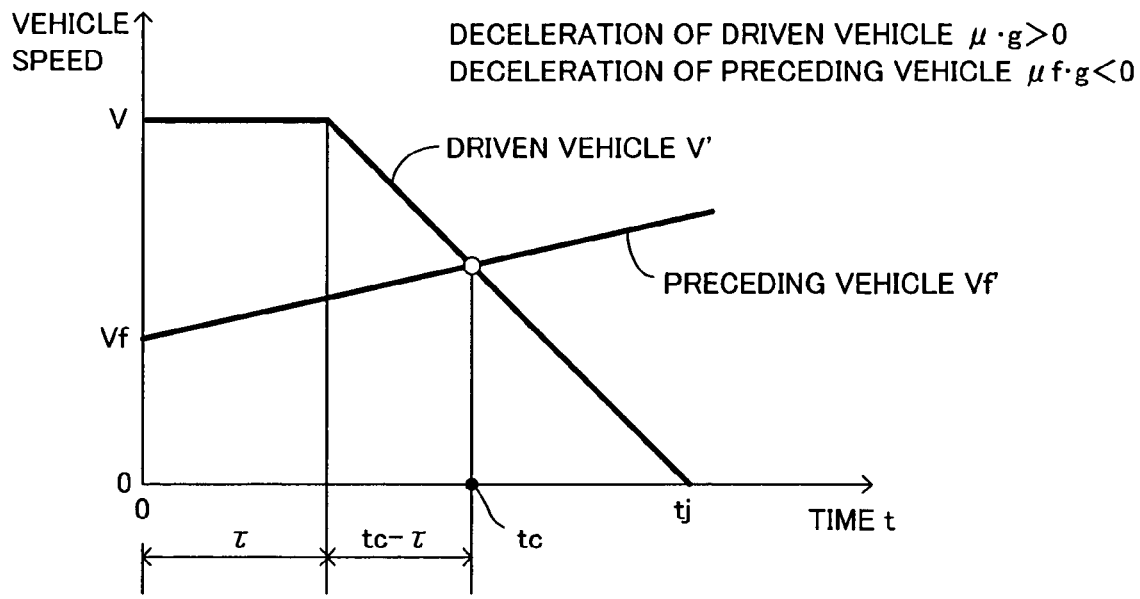
FIG. 7 is a figure showing the change in speed with respect to time for the driven vehicle and the preceding vehicle in the case where the driven vehicle, after an idle running time of the driven vehicle, most closely approaches the preceding vehicle while the preceding vehicle is running with accelerating.
Figure 8:
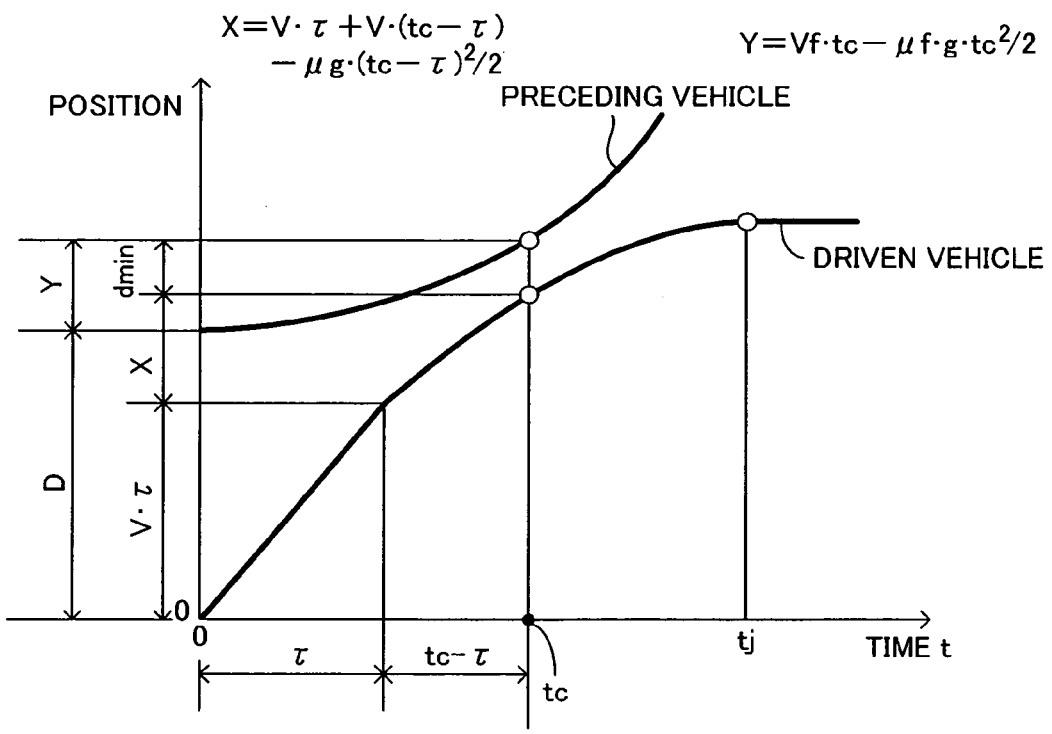
FIG. 8 is a view showing the change in position with respect to time for the driven vehicle and the preceding vehicle in the case of FIG. 7.

(3) The Case in which the Driven Vehicle most Closely Approaches the Preceding Vehicle which is Moving after the Elapse of the Idle Running Time $\tau$ FIG. 5 shows the changes in speed with respect to time of the driven vehicle and the preceding vehicle for the case in which the driven vehicle most closely approaches the preceding vehicle which is decelerating at a deceleration $\mu f \cdot g$ ($\mu f \cdot g > 0$) after an idle running time of the driven vehicle has elapsed. FIG. 6 shows the changes in position with respect to time of the driven vehicle and the preceding vehicle for this case. Furthermore, FIG. 7 shows the changes in speed with respect to time of the driven vehicle and the preceding vehicle for this case in which the driven vehicle most closely approaches the preceding vehicle while the preceding vehicle is decelerating at a deceleration $\mu f \cdot g$ ($\mu f \cdot g < 0$), i.e., when it is accelerating, and FIG. 8 shows the changes in position with respect to time of the driven vehicle and the preceding vehicle for the same case in FIG. 7.

For either of these cases (i.e., regardless of whether the deceleration μf·g is positive or negative), the driven vehicle approaches the preceding vehicle most closely when the speed V' of the driven vehicle and the speed Vf' of the preceding vehicle become the same speed Vs. If the time at which the speed of both vehicles becomes equal to speed Vs is tc, it is apparent that, from FIG. 5 and FIG. 7, the speed V' of the driven vehicle and the speed Vf of the preceding vehicle at the time tc are expressed by the following Equation 14 and Equation 15.

$$V'=V-\mu \cdot g \cdot (tc-\tau) \quad \text{Equation 14}$$

$$Vf'=Vf-\mu f \cdot g \cdot tc \quad \text{Equation 15}$$

As the right side of the above Equation 14 is equal to the right side of the above Equation 15, the time tc required for the speed of both vehicles to become the same speed Vs is expressed by the following Equation 16.

$$tc=(V-Vf+\mu \cdot g \cdot \tau)/(\mu \cdot g-\mu f \cdot g) \quad \text{Equation 16}$$

On the other hand, as is clear from the above Equation 2, FIG. 4, and FIG. 6, the position Df of the preceding vehicle after time tc (i.e., when the time tc has elapsed) is expressed by the following Equation 17.

$$Df=D+Vf \cdot tc-\mu f \cdot g \cdot tc^2/2 \quad \text{Equation 17}$$

In addition, from the above Equation 2, FIG. 5, and FIG. 7, the position Dj of the driven vehicle after time tc (i.e., when the time tc has elapsed) is expressed by the following Equation 18.

$$Dj=V \cdot \tau+V(tc-\tau)-\mu \cdot g \cdot (tc-\tau)^2/2 \quad \text{Equation 18}$$

Accordingly, from Equations 16–18, the closest approach distance dmin is expressed by the following Equation 19.

$$d\min=D-[(V+\mu \cdot g \cdot \tau-Vf)^2/\{2(\mu-\mu f) \cdot g\}-\mu \cdot g \cdot \tau^2/2] \quad \text{Equation 19}$$

At this time, from the above Equation 15 (or the above Equation 14) and the above Equation 16, the speed Vs at the time of closest approach is expressed by the following Equation 20.

$$Vs=(\mu f \cdot V-\mu \cdot Vf+\mu \cdot \mu f \cdot g \cdot \tau)/(\mu f-\mu) \quad \text{Equation 20}$$

In addition, the conditions expressed by the following Equation 21 are added to the conditions of applicability of the above Equation 19 and the above Equation 20.

$$\tau<tc<tj \quad \text{Equation 21}$$

Therefore, when the above Equation 16 and the above Equation 6 are applied to the above Equation 21, the following Equation 22 and Equation 23 are obtained.

$$Vf<\mu f \cdot g \cdot \tau+V \quad \text{Equation 22}$$

$$Vf>\mu f \cdot g \cdot \{\tau+V/(\mu \cdot g)\} \quad \text{Equation 23}$$

Note that it is clear that the equation 23 is satisfied in the case in which the preceding vehicle is accelerating (μf·g<0). Further, the conditions of the above Equation 11 (Vf≧Vf0) are added to the conditions of applicability of the above Equation 19 and the above Equation 20.

Figure 9:
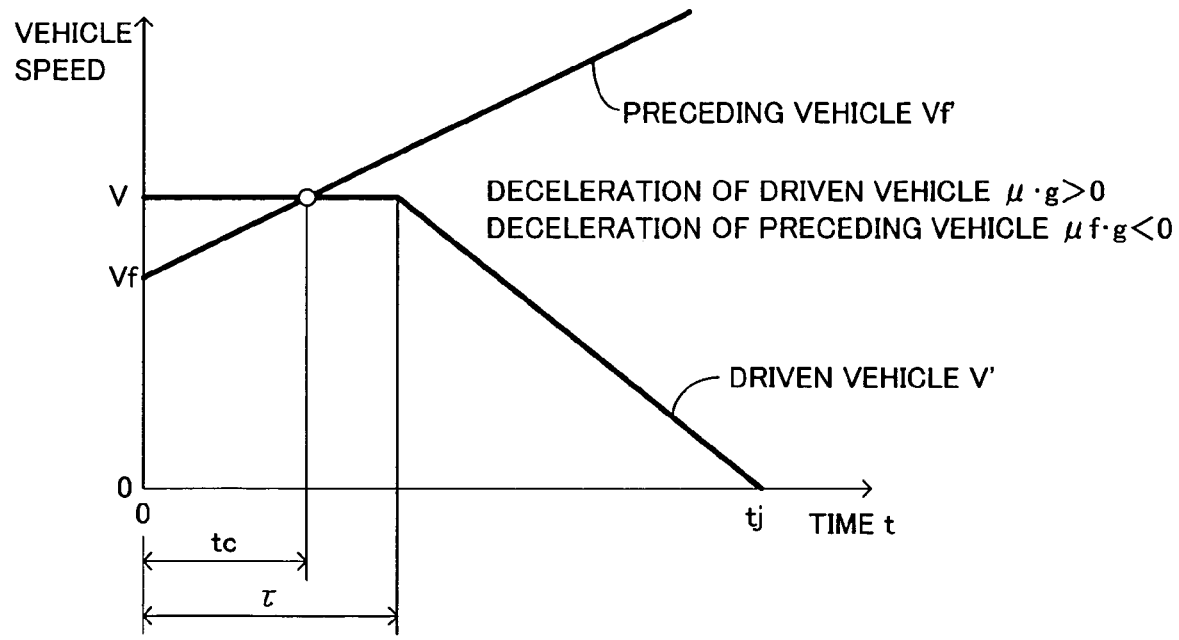
FIG. 9 is a figure showing the change in vehicle speed with respect to time for the driven vehicle and the preceding vehicle in the case where the driven vehicle most closely approaches the preceding vehicle before the idle running time of the driven vehicle has elapsed.
Figure 10:
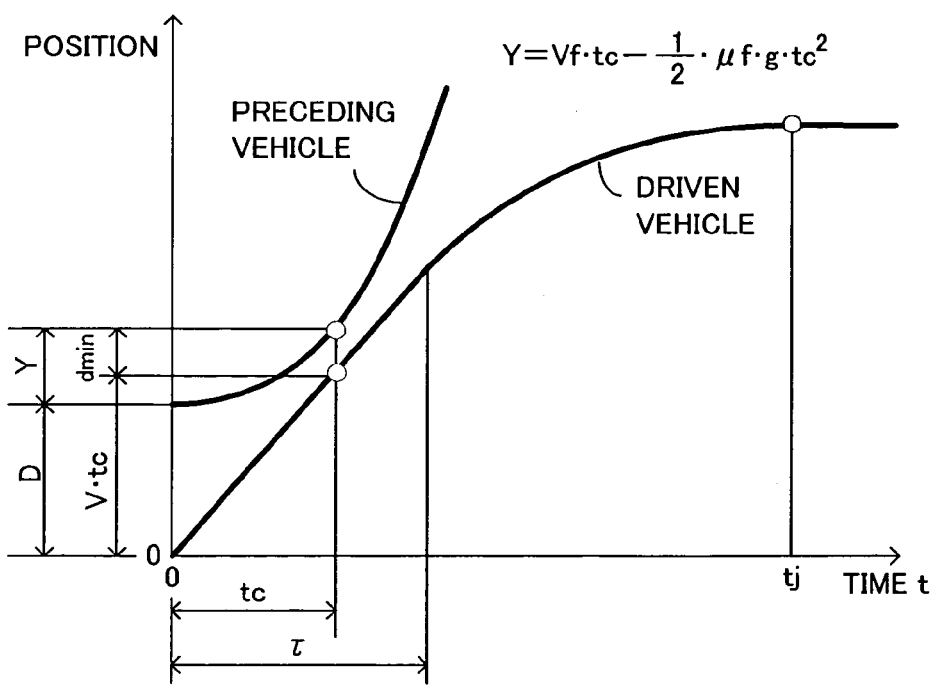
FIG. 10 is a figure showing the change in position with respect to time for the driven vehicle and the preceding vehicle in the case of FIG. 9.

(4) The Case in which the Driven Vehicle most Closely Approaches the Preceding Vehicle before the Idle Running τ has Elapsed FIG. 9 shows the changes in speed with respect to time of the driven vehicle and the preceding vehicle for the case in which the driven vehicle most closely approaches the preceding vehicle before the elapse of idle running time τ, and FIG. 10 shows the changes in position with respect to time of the driven vehicle and the preceding vehicle for the same case. In this case as well, the driven vehicle most closely approaches the preceding vehicle when the speed V' of the driven vehicle and the speed Vf' of the preceding vehicle become the same speed Vs. Assuming that the time at which the speeds of both vehicles become the equal speed Vs is tc, the following Equation 24 is established since the speed V' of the driven vehicle is a fixed speed V, with taking the speed of the preceding vehicle into consideration.

$$V=Vf-\mu f \cdot g \cdot tc \quad \text{Equation 24}$$

On the other hand, as is clear from the above Equation 2 and FIG. 10, the position Df of the preceding vehicle after the elapse of time tc is expressed by the following Equation 25.

$$Df=D+Vf \cdot tc-(\mu f \cdot g \cdot tc^2)/2 \quad \text{Equation 25}$$

In addition, from FIG. 10, the position Dj of the driven vehicle after time tc is expressed by the following Equation 26.

$$Dj=V \cdot tc \quad \text{Equation 26}$$

Accordingly, from Equations 24–26, when the variable tc is canceled, the closest approach distance dmin is expressed by the following Equation 27.

$$d\min=D-(V-Vf)^2/\{-2 \cdot (\mu f \cdot g)\} \quad \text{Equation 27}$$

Note that, as shown by the following Equation 28, the speed Vs at the time of closest approach is apparently equal to the speed V of the driven vehicle.

$$Vs=V \quad \text{Equation 28}$$

The conditions of applicability of the above Equation 27 and Equation 28 are that time tc has elapsed before the elapse of the idle running time τ (tc≦τ), and therefore, the following Equation 29 is the conditions of applicability of the above Equation 27 and Equation 28. Further, since it is necessary that the speed Vf of the preceding vehicle at the present time has exceeded the sensing resolution Vf0 of the relative speed sensor, the speed Vf of the preceding vehicle at the present time is smaller than the speed V of the driven vehicle, and the preceding vehicle is accelerating, the following Equations 30–32 are obtained as the conditions of applicability of the above Equation 27 and Equation 28.

$$Vf \geq \mu f \cdot g \cdot \tau+V \quad \text{Equation 29}$$

$$Vf \leq Vf0 \quad \text{Equation 30}$$

$$Vf<V \quad \text{Equation 31}$$

$$\mu f<0 \quad \text{Equation 32}$$

Figure 11:
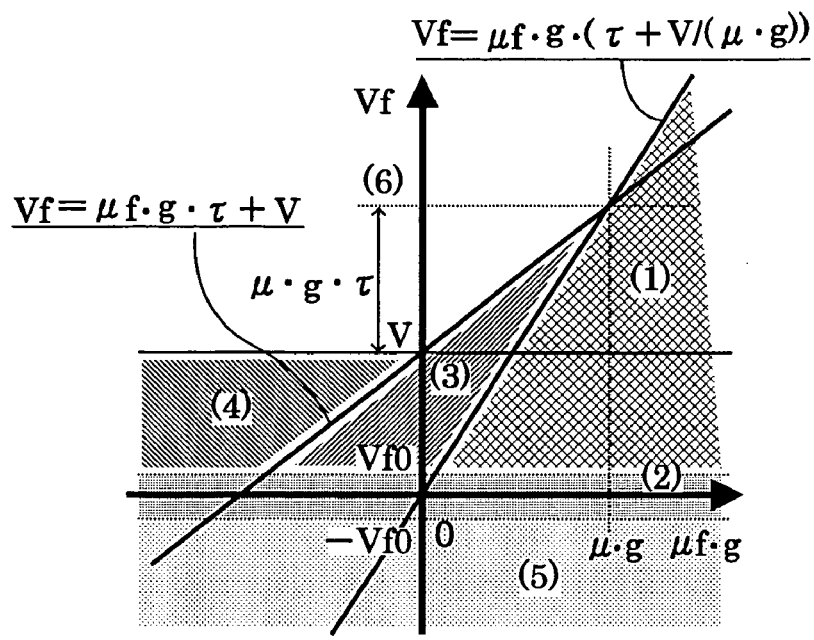
FIG. 11 is a figure showing the regions which represent conditions for calculating the closest approach distance, wherein the horizontal axis is the deceleration $\mu f \cdot g$ of the preceding vehicle and the vertical axis is the speed Vf of the preceding vehicle.

The above are summarized in the following Table 1. FIG. 11 shows the regions for each of the above-described cases (1)–(4), in which the horizontal axis is the deceleration μf·g of the preceding vehicle and the vertical axis is the speed Vf of the preceding vehicle.

TABLE 1

| Situation | Conditions of applicability | Region | dmin: closest approach distance<br>Vs: speed at time of closest approach |
|---|---|---|---|
| Rear end collision after preceding vehicle stops | $Vf \geq Vf0$ [Km/h]<br>$\mu f \geq 0$<br>$Vf \leq \mu f \cdot g \cdot (\tau + V/(\mu \cdot g))$ | (1) | $dmin = \{D + Vf^2/(2 \mu f \cdot g)\} - \{V \cdot \tau + V^2/(2\mu \cdot g)\}$<br>$Vs = 0$ |
| Rear end collision with stationary object<br>Rear end collision with preceding vehicle which is moving | $|Vf| < Vf0$ [Km/h] | (2) | $dmin = D - \{V \cdot \tau + V^2/(2\mu \cdot g)\}$<br>$Vs = 0$ |
| Approach after idle running time | $Vf \geq Vf0$ [Km/h]<br>$Vf < \mu f \cdot g \cdot \tau + V$<br>$Vf > \mu f \cdot g \cdot (\tau + V/(\mu \cdot g))$ | (3) | $dmin = D - \{(V + \mu \cdot g \cdot \tau - Vf)^2/(2 \cdot (\mu - \mu f)g) - \mu \cdot g \cdot \tau^2/2\}$<br>$Vs = (\mu f \cdot V - \mu \cdot Vf + \mu \cdot \mu f \cdot g \cdot \tau)/(\mu f - \mu)$ |
| Approach during idle running time | $Vf \geq Vf0$ [Km/h]<br>$\mu f < 0, Vf < V$<br>$Vf \geq \mu f \cdot g \cdot \tau + V$ | (4) | $dmin = D - \{(V - Vf)^2/(-2 \mu f \cdot g)\}$<br>$Vs = V$ |

Here, the above-described idle running time τ and the assumed deceleration of the driven vehicle $\mu \cdot g$ will be explained. As stated earlier, in this embodiment, first, the first warning is carried out to encourage braking operation by the driver, then the second warning is carried out to further encourage braking operation by the driver, and when braking operation is not carried out even as a result of the second warning, intervention braking is carried out in which the braking apparatus is automatically operated.

(Idle Running Time τ)

Considering the above, the idle running time τ for the first warning (the first idle running time) is set based on the case in which braking operation is carried out with the most tense timing during the normal driving operation by the driver. The idle running time τ for the second warning (the second idle running time) is set based on the case in which braking operation is carried out with the most tense timing during emergency driving operation by the driver. The idle running time τ for intervention braking (the second or third idle running time) is set based on the premise that an automatic braking operation which is not depending upon braking operation by the driver is carried out.

More specifically, the idle running time τ includes at least the sum (τ1) of the time for the sensors 11–21 and the electric controller 10 shown in FIG. 1 to recognize the conditions and the like of the preceding vehicle and the driven vehicle (particularly the deceleration $\mu f \cdot g$ of the preceding vehicle), and the calculation processing time necessary to determine the need for the first or second warning or intervention braking, and the time (τ2) from when the electric controller 10 generates an instruction signal to the brake actuator 40 to generate braking force until the brake hydraulic pressure actually rises and braking force is generated.

In this embodiment, the idle running time τ for the first warning and the second warning is the sum of the above-described τ1 and τ2 in the case in which the brake pedal is being operated (when the value of the brake switch signal STOP is 1).

τ1 is a time which is always necessary even when the brake pedal is being operated. In other words, due to reasons such as recognition lag by the sensor system or calculation lag by the microcomputer system making up the electric controller 10, the conditions and the like of the preceding vehicle and the driven vehicle (the speed Vf of the preceding vehicle, the deceleration $\mu f \cdot g$ of the preceding vehicle, the speed V of the driven vehicle, the deceleration $\mu \cdot g$ of the driven vehicle, the vehicle separation D, and the like) which are recognized by the microcomputers at the present time (t=0) are actually the values at a prescribed lag time earlier. Accordingly, in order to determine the need for a warning or intervention braking, it is necessary to predict the future at a point in time in the past by the prescribed lag time, and as the driven vehicle is traveling during a time period corresponding to the lag time (in actuality, it has already run without braking), this time period is set as τ1.

Figure 12:
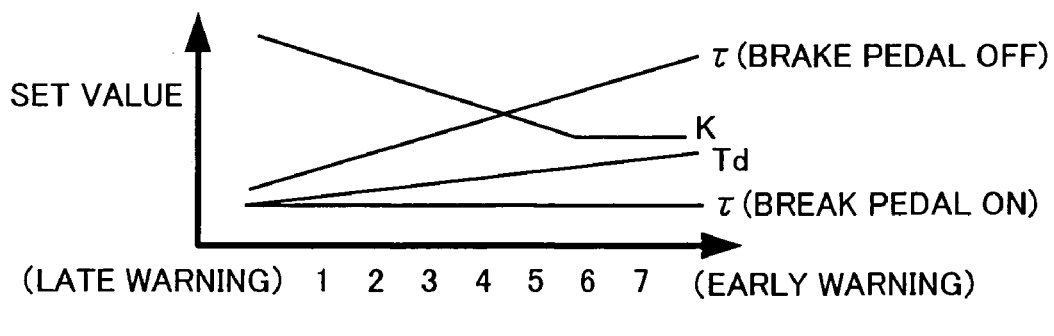
FIG. 12 is a figure showing the amplitudes of parameters which can be selected by the dial switch shown in FIG. 1.

On the other hand, the idle running time τ for the first warning when the brake pedal is not being operated can be selected by the dial switch 14 to be a value larger than the sum of the above-described τ1 and τ2 by the length of time until the driver begins operation of the brake pedal (see FIG. 12). The idle running time τ for the second warning when the brake pedal is not being operated is made a prescribed fixed value (a constant) equal to the length of time until the start of brake pedal operation by the driver added to the sum of the above τ1 and τ2. The idle running time τ for intervention braking is the sum of the above τ1 and τ2.

(Assumed Deceleration $\mu \cdot g$ of the Driven Vehicle)

As described above, the first warning is a warning which initially urges the driver to perform braking operation, so it is necessary for it to be generated with a timing such that as a result of the warning, safe deceleration can be performed if the driver carries out normal braking operation. Therefore, the assumed deceleration $\mu \cdot g$ of the driven vehicle for the first warning can be selected by the dial switch 14 to be a relatively large value among decelerations which are performed by the driver during normal driving operation. A relatively large value is used because if the assumed deceleration $\mu \cdot g$ of the driven vehicle is too small, the warning is generated early, and the driver may find the warning to be annoying. Note that, as shown in FIG. 12, a coefficient K is actually selected by the dial switch 14, and the assumed deceleration $\mu \cdot g$ of the driven vehicle is determined by multiplying it (K) by the actual road surface coefficient of friction $\mu max$ which is found by a method to be described below. Namely, the assumed deceleration $\mu \cdot g$ of the driven vehicle is found by the following Equation 33.

$$\mu \cdot g = K \cdot \mu max \cdot g \qquad \text{Equation 33}$$

In contrast, the second warning is a warning which strongly urges the driver to perform braking operation, and it is generated with a timing such that if braking operation is not carried out as a result of the second warning, intervention braking must be immediately performed. Accordingly, the assumed deceleration $\mu \cdot g$ of the driven vehicle for the second warning is a value equal to the assumed deceleration $\mu \cdot g$ of the driven vehicle for intervention braking, and it is made a larger deceleration than the assumed deceleration $\mu \cdot g$ of the driven vehicle for the first warning (namely, it is a larger deceleration than that for normal braking operation by the driver). Namely, the coefficients K for the second warning and for intervention braking are a value equal to each other of less than 1 (such as 0.6), and they are set to a value larger than the coefficient K for the first warning.

As is clear from the above Equation 33, the largest deceleration is obtained when the coefficient K is 1. In contrast, in this embodiment, the coefficient K for the second warning and intervention braking is made a value smaller than 1. This is so that when the deceleration of the preceding vehicle increases, some margin is left to further increase the deceleration of the driven vehicle by braking operation and the like by the driver.

The value of the above-described coefficient K may be such as to vary with the road surface coefficient of friction $\mu$max so as, for example, to increase as the road surface coefficient of friction $\mu$max decreases. Even when driving on a slippery road surface (a road surface having a small road surface coefficient of friction $\mu$max), the driver normally performs braking operation with the same feeling as when driving on a normal road surface, so that deceleration on a slippery road surface is close to the deceleration at the time of braking on a normal road surface. Therefore, the coefficient K for a slippery road surface should be larger than the coefficient K for a normal road surface. Accordingly, as described above, by making the coefficient K for the first and second warning and intervention braking larger as the road surface coefficient of friction $\mu$max becomes smaller, the first warning, the second warning, and intervention braking can be carried out so as to agree with actual driving.

The first warning is preferably not generated insofar as the driver is performing normal driving operation. On the other hand, it is preferred that the first warning be generated as early as possible. According to experimental results, the length of time for a driver to change a position of his foot from on the accelerator pedal to on the brake pedal, which is part of the idle running time $\tau$, differs depending upon the driver. A driver who takes a long time to switch his foot (position of his foot) generally carries out braking with a small deceleration, and maintains a relatively large headway (headway time Td). Therefore, in this embodiment, as described above, the headway time Td, the idle running time $\tau$, and the coefficient K (and accordingly the assumed deceleration $\mu \cdot g$) for the first warning can be varied by the dial switch 14, and the timing of the first warning can be made to match the characteristic of each driver (see FIG. 12).

The structure may be such as to detect the length of time for the driver to change his foot position from on the accelerator pedal to on the brake pedal during normal driving and to automatically vary the idle running time $\tau$, the headway time Td, and the coefficient K based on the detected time to change his foot position. The structure may also be such that the minimum value of the detected time to change the foot position and the maximum value of the detected deceleration are learned, the headway time Td, the idle running time $\tau$, and the coefficient K are automatically varied based on this learned result. Furthermore, the structure may be such that the idle running time $\tau$ is learned as being longer when a cruise control apparatus is operating than when it is not operating, or such that the coefficient K is increased as the road surface coefficient of friction $\mu$max decreases.

(Suitable Vehicle Separation Dt)

Next, the suitable vehicle separation Dt will be described. As stated above, the first warning, the second warning, and intervention braking are performed when the closest approach distance dmin which is determined from the above Equation 8, Equation 12, Equation 19, and Equation 27 is smaller than the suitable vehicle separation Dt (dmin<Dt). Therefore, in a state in which the preceding vehicle is being followed, the suitable vehicle separation Dt is selected based on the concept that even in the case in which the preceding vehicle decelerates by braking, safety can be guaranteed (stopping can be safely performed) by the equivalent (similar) braking after a prescribed reaction time. In other words, the suitable vehicle separation is selected to be a distance necessary for the driven vehicle to stop while leaving a prescribed distance from the preceding vehicle, in the case in which the driven vehicle is following the preceding vehicle at approximately the same speed, if the driven vehicle begins decelerating at a deceleration which is equal to the deceleration of the preceding vehicle after the elapse of a prescribed length of time from the point at which the preceding vehicle starts to decelerate at a prescribed deceleration. Specifically, it is given by Equation 34 shown below. This Equation 34 is an equation which is inferred from the equation (d0=D−Vs·$\tau$), which is obtained by setting the speed Vf of the preceding vehicle and the speed V of the driven vehicle equal to Vs in Equation 8, by making the deceleration $\mu$f·g of the preceding vehicle and the assumed deceleration $\mu \cdot g$ of the driven vehicle the same value, and by setting the closest approach distance dmin equal to d0.

$$Dt = Td \cdot Vs + d0 \qquad \text{Equation 34}$$

In the above Equation 34, Td is the headway time, and when the driven vehicle follows the preceding vehicle at (approximately) the same speed as the preceding vehicle, it is a value obtained by dividing the vehicle separation between the driven vehicle and the preceding vehicle which the driver normally maintains by the speed V of the driven vehicle at that time. According to experiments, the vehicle separation which the driver maintains when following varies in accordance with the vehicle speed at that time, but the headway time Td obtained by dividing the vehicle separation by the vehicle speed does not vary much as long as the same driver is concerned (it is approximately constant). Accordingly, in this embodiment, in order to guarantee a suitable vehicle separation (a distance similar to the vehicle separation which the driver maintains during normal driving) even if the speed at the time of closest approach Vs varies, the concept of headway time Td was introduced. Thus, the value Td·Vs in Equation 34 is sometimes called the headway (headway distance).

In this embodiment, the first warning, then the second warning, and finally intervention braking are carried out. Accordingly, the headway time Td for the first warning (the first time Td) is set to be largest, the headway time Td for the second warning (the second time Td) is set to be next largest, and the headway time Td for intervention braking (the third time Td) is set to be the smallest. As shown in FIG. 12, the headway time Td for the first warning can be varied by operation of the dial switch 14 to agree with differences among drivers. Specifically, the headway time Td for the second warning is set to be a fixed value less than or equal to the minimum value of the headway time Td for the first warning, and the headway time Td for intervention braking is set to be a fixed value less than or equal to the headway time Td for the second warning. The suitable vehicle separation which is determined by the headway time Td for the first warning may also be referred to as the first suitable vehicle separation, the suitable vehicle separation which is determined by the headway time Td for the second warning may also be referred to as the second suitable vehicle separation, and the suitable vehicle separation which is determined by the headway time Td for intervention braking may also be referred to as the second suitable vehicle separation or the third suitable vehicle separation.

The value d0 in Equation 34 is the distance for guaranteeing a fixed stopping distance, which is called the margin vehicle separation (for example, the distance which should exist between the preceding vehicle and the driven vehicle when the driven vehicle is stopped with respect to a preceding vehicle which has stopped). In this embodiment, the value d0 is set to a prescribed fixed value (such as 1.5 meters). The margin vehicle separation d0 is determined taking into consideration the detecting error of the plurality of sensors.

In this manner, it is determined whether to carry out the first warning or the second warning (and intervention braking) for avoiding a rear end collision. Furthermore, in this embodiment, a first warning is carried out with respect to a front end collision, and a first warning, a second warning, and intervention braking are carried out to maintain a vehicle separation with respect to a vehicle which cuts in front during movement. These will be explained below.

(5) Front End Collision

In a front end collision, the closest approach distance dmin and the speed at the time of closest approach Vs are set by the below-described Equation 35 and Equation 36, and the above-described first warning, second warning, and intervention braking are carried out. The conditions of applicability are as set forth in Equation 37. In this case, the headway time Td is made either a constant or a variable based on the time for lane changing by steering operation of the driven vehicle. The idle running timer and the coefficient K can be same values as for the above-described first warning.

$$dmin=D \qquad \text{Equation 35}$$

$$Vs=V-Vf \qquad \text{Equation 36}$$

$$Vf<-Vf0 \qquad \text{Equation 37}$$

(6) Countermeasures against a Vehicle which Cuts in Front

Figure 13:
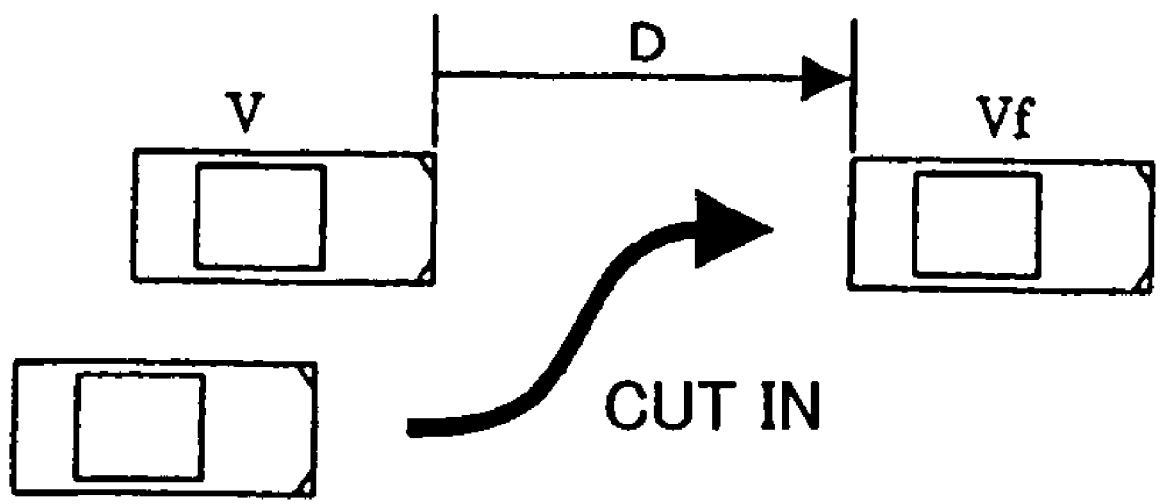
FIG. 13 is a schematic diagram schematically showing the case in which a vehicle has overtaken the driven vehicle cuts in front of the driven vehicle.

As shown in FIG. 13, there are cases in which a vehicle which has overtaken the driven vehicle or the like cuts in front of the driven vehicle. In such cases, if any of the conditions explained with respect to the above (1)–(4) is established, the first warning, the second warning, or intervention braking is determined to be carried out in the above-described manner. However, in the case in which none of the conditions described above with respect to (1)–(4) is established, even if the vehicle separation D is small, the above-described warning or intervention braking is not carried out. Therefore, in this embodiment, when the conditions of the above-described (1)–(4) are not satisfied (see region (6) in FIG. 11), the closest approach distance dmin and the speed at the time of closest approach Vs are set as shown by the following Equation 38 and Equation 39, and the first warning, the second warning, and intervention braking are carried out when the closest approach distance dmin becomes smaller than the suitable vehicle separation Dt. In this case, the headway time Td, the idle running time $\tau$, and the coefficient K can have the same values as for the above-described first warning, second warning, and intervention braking.

$$dmin=D \qquad \text{Equation 38}$$

$$Vs=V \qquad \text{Equation 39}$$

The countermeasures against a front end collision and a vehicle cutting in front which are described above can be summarized as shown below in Table 2. The regions for a front end collision and for countermeasures against a vehicle cutting in front are the portions shown by (5) and (6), respectively, in FIG. 11.

TABLE 2

| Situation | Conditions of applicability | Region | dmin: closest approach distance<br>Vs: speed at time of closest approach |
|---|---|---|---|
| Front end collision | Vf < -Vf0 | (5) | dmin = D<br>Vs = V - Vf<br>Td is the time to change lanes by steering |
| Countermeasures against a vehicle which cuts in front | Other than other conditions of applicability | (6) | dmin = D<br>Vs = V |

(Target Deceleration GT)

Next, a method of obtaining the target deceleration GT used for the first warning, brake assist control for the second warning, and intervention braking will be explained. The target deceleration must also be determined for the above-described cases (1)–(4).

(1) The Case in which the Preceding Vehicle First Stops and then the Driven Vehicle Stops In this case, the speed Vs at the time of closest approach is 0, so the following Equation 40 is obtained from the above Equation 34.

$$Dt=d0 \qquad \text{Equation 40}$$

If the target deceleration GT for obtaining this suitable vehicle separation Dt is assumed to be $\mu r \cdot g$, the following Equation 41 is established from the above Equation 8, and if this is solved for $\mu r \cdot g$, which is the target deceleration GT, the following Equation 42 is obtained.

$$d0=\{D+Vf^2/(2 \cdot \mu f \cdot g)\}-\{V \cdot \tau+V^2/(2 \cdot \mu r \cdot g)\} \qquad \text{Equation 41}$$

$$\mu r \cdot g=\mu f \cdot g \cdot V^2/\{Vf^2+2 \cdot \mu f \cdot g(D-V \cdot \tau-d0)\} \qquad \text{Equation 42}$$

The idle running time $\tau$ on the right side of Equation 42 is made to be equal to the above-described $\tau 1$ taking into considering only the time lag for recognition and processing.

(2) The Case in which the Preceding Vehicle is Initially Stopped (the Case of a Stationary Object)

In this case as well, the speed Vs at the time of closest approach is 0, so the above Equation 40 is established. Accordingly, from the above Equation 40 and the above Equation 12, the following Equation 43 is obtained. If Equation 43 is solved for $\mu r \cdot g$, which is the target deceleration GT, the following Equation 44 is obtained.

$$d0 = D - \{V \cdot \tau + V^2/(2 \cdot \mu r \cdot g)\} \qquad \text{Equation 43}$$

$$\mu r \cdot g = V^2/2(D - V \cdot \tau - d0) \qquad \text{Equation 44}$$

The idle running time $\tau$ on the right side of Equation 44 is made equal to the above-described $\tau 1$ taking into consideration only the lag time for recognition and processing.

(3) The Case in which the Driven Vehicle most Closely Approaches the Preceding Vehicle which is Moving In this case, the speed Vs at the time of closest approach is given by the above Equation 20. Accordingly, from the above Equation 34, the suitable vehicle separation Dt is given by the following Equation 45.

$$Dt = Td \cdot \{(\mu f \cdot V - \mu \cdot Vf + \mu \cdot \mu f \cdot g \cdot \tau)/(\mu f - \mu)\} + d0 \qquad \text{Equation 45}$$

Accordingly, when $\mu \cdot g$ in Equation 19 is replaced with $\mu r \cdot g$, which is the target deceleration GT, and a resultant equation and the right side of Equation 45 are solved for $\mu r \cdot g$, the following Equation 46 is obtained. The idle running time $\tau$ is made equal to just the lag time $\tau 1$ for processing and recognition by the sensors and the electric controller, and the headway time Td is made equal to a value (set by the dial switch 14) that is used to determine whether to perform the first warning.

$$\mu r \cdot g = (\mu f \cdot g \cdot (D - V \cdot Td - d0) + (Vf - V)^2/2)/B \qquad \text{Equation 46}$$

In Equation 46, the value B is given by the following Equation 47.

$$B = D - (Vf - \mu f \cdot g \cdot \tau) \cdot Td + (Vf - V) \cdot \tau - (\mu f \cdot g \cdot \tau^2)/2 - d0 \qquad \text{Equation 47}$$

becomes inaccurate (unstable). Therefore, in this embodiment, the value $\mu r \cdot g$ shown by Equation 46 is used as the target deceleration GT only in the case in which the above value B is at least a prescribed value B0 (such as 2 meters) and $\mu r \cdot g$ given by the above Equation 46 is larger than the assumed deceleration of the driven vehicle $\mu \cdot g$ (=K·$\mu$max·g) which is used to determine whether to perform the first warning, the second warning, and intervention braking, respectively. And in other cases, the assumed deceleration of the driven vehicle $\mu \cdot g$ (=K·$\mu$max·g) is used as the target deceleration GT. As a result, since the target deceleration GT does not become smaller than the assumed deceleration of the driven vehicle $\mu \cdot g$, it is possible to avoid collisions with certainty.

(4) The Case in which the Driven Vehicle most Closely Approaches the Preceding Vehicle before the Idle Running Time $\tau$ has Elapsed.

In this case, there is the fear of a rear end collision with the preceding vehicle before the idle running time $\tau$ has elapsed, so the value $\mu r \cdot g$ of the target deceleration GT is found from the following Equation 48. Coefficient K is a value which is used when determining whether to carry out the first warning, the second warning, and intervention braking, respectively.

$$\mu r \cdot g = K \cdot \mu \text{max} \cdot g \qquad \text{Equation 48}$$

The above can be summarized as shown in the following Table 3.

TABLE 3

| Situation | Region | Equation for calculating the target deceleration GT ($\mu r g$) | Notes |
|---|---|---|---|
| Rear end collision after preceding vehicle stops | (1) | $\mu r \cdot g = \mu f \cdot g \cdot V^2/(Vf^2 + 2 \cdot \mu f \cdot g(D - V \cdot \tau - d0))$ | $\tau = \tau 1$: only processing delay for recognition/determination |
| Rear end collision with stationary object Rear end collision with preceding vehicle which is moving | (2) | $\mu r \cdot g = V^2/(2(D - V \cdot \tau - d0))$ | $\tau = \tau 1$: only processing delay for recognition/determination |
| Approach after idle running time | (3) | $B = D - (Vf - \mu f \cdot g \cdot \tau)Td + (Vf - V)\tau - (\mu f \cdot g \cdot \tau^2/2 - d0,$ $\mu r 1 \cdot g = (\mu f \cdot g(D - V \cdot Td - d0) + (Vf - V)^2/2)/B$ $\mu r 2 \cdot g = K \cdot \mu \text{max} \cdot g$ if $(B \geq 2m \ \& \ \mu r 1 \cdot g \geq \mu r 2 \cdot g)$ $\mu r \cdot g = \mu r 1 \cdot g$ else $\mu r \cdot g = \mu r 2 \cdot g$ | $\tau = \tau 1$: only processing delay for recognition/determination Td = uses value of Td selected by dial switch for first warning: for guarantee the vehicle separation for the first warning |
| Approach during idle running time | (4) | $\mu r \cdot g = K \cdot \mu \text{max} \cdot g$ | K is the value used when determining whether to perform the first warning, second warning, and intervention braking, respectively |
| Countermeasures against a vehicle which cuts in front | — | $\mu r \cdot g = K \cdot \mu \text{max} \cdot g$ | K is the value used when determining whether to perform the first warning, second warning, and intervention braking, respectively |

The value B in the above Equation 46 is a value which decreases as the driven vehicle approaches the preceding vehicle. As a result, measurement errors in the speed Vf of and the deceleration $\mu f$ of the preceding vehicle due to noise and the like greatly influence the value $\mu r \cdot g$ of the target deceleration GT, and there are cases in which this value $\mu r \cdot g$ (5) Front End Collision In this case, intervention braking is not carried out, so the target deceleration GT is 0.

(6) Countermeasure against a Vehicle which Cuts in Front

In this case, the target deceleration GT is determined by the above Equation 48. Note that, the coefficient K is the value which is used when determining whether to carry out the first warning, the second warning, and intervention braking, respectively.

Next, the operation of the electric controller 10 will be explained. In order to carry out the first warning, the second warning, intervention braking, and the like based on the above principles, the CPU 10a of the electric controller 10 executes a program shown by the flow charts in FIGS. 14–23.

Figure 14:
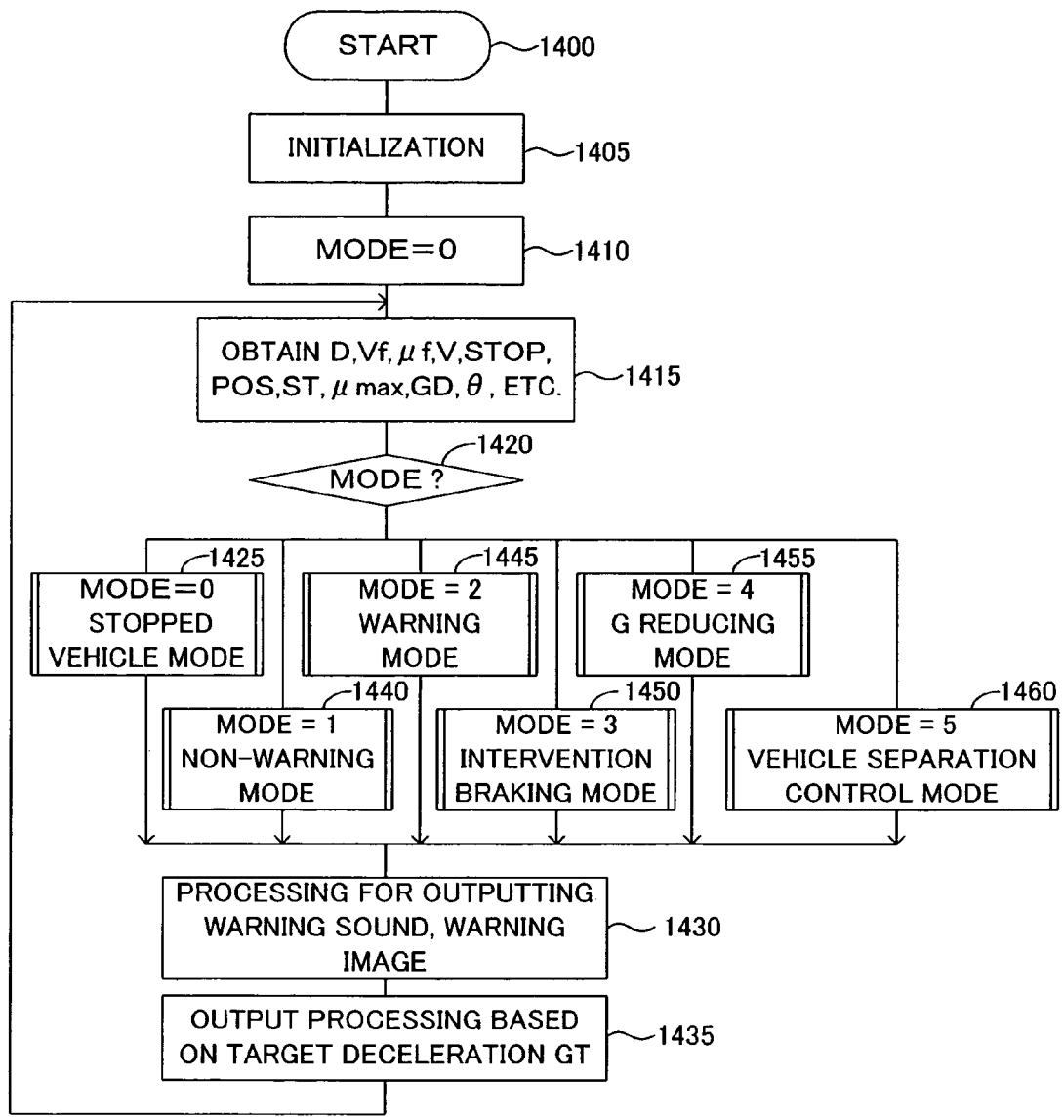
FIG. 14 is a flow chart showing a main routine executed by the CPU shown in FIG. 1.

First, with the driven vehicle in a stopped state, when the power supply of the electric controller 10 is turned on by changing the ignition switch to an on state, the CPU 10a begins the execution of a main routine shown in FIG. 14 from Step 1400. In subsequent Step 1405, it carries out initializing processing of various flags and the like, and it proceeds to Step 1410 and sets the value of the state variable MODE to 0. Next, the CPU 10a proceeds to Step 1415 in which it obtains signals from various sensors and switches 11–21 and performs prescribed calculations to obtain the vehicle separation D, the speed Vf of the preceding vehicle, the deceleration μf·g of the preceding vehicle, the speed V of the driven vehicle, the deceleration μr·g of the driven vehicle, the brake switch signal STOP, the shift lever position signal POS, the dial switch selected position signal ST, the road surface coefficient of friction μmax, the actual deceleration GD, the road surface slope θ, and the like. The speed Vf of the preceding vehicle and the deceleration μf·g of the preceding vehicle and the like indicate the running condition of the preceding vehicle. The speed V of the driven vehicle, the deceleration μr·g of the driven vehicle, the brake switch signal STOP, the shift lever position signal POS, and the like indicate the running condition of the driven vehicle.

The speed Vf of the preceding vehicle is found by adding the speed V of the driven vehicle to the output signal RV of the relative speed sensor 13. The deceleration μf·g of the preceding vehicle is the value found by subtracting from the speed Vf of the preceding vehicle the speed Vfold of the preceding vehicle a prescribed length of time earlier and dividing this by the prescribed length of time. The deceleration μr·g of the driven vehicle is found based on a value obtained by subtracting from the speed V of the driven vehicle the speed Vold of the driven vehicle a prescribed length of time earlier and dividing this by the prescribed length of time.

The road surface coefficient of friction μmax can be found, for example, as described in Japanese Published Unexamined Patent Application Hei 11-78843 based on a prescribed oscillation component of the wheel speed obtained based on the signals from the wheel sensors 18–21. As described in Japanese Published Unexamined Patent Application 11-91539, the road surface coefficient of friction μmax may be found based on the attenuation characteristics of the response component of the wheel speed at the time of a step change in braking force. Ultrasonic waves, milliwaves, or the like may be directed at the road surface in front and the road surface coefficient of friction μmax may be estimated based on the back scattering of waves. The actual deceleration GD may be determined based on the acceleration signal G output from the acceleration sensor 15. The road surface slope θ (the slope angle) is found by the following Equation 49.

$$G = dV/dt + g \cdot \sin\theta = (-\mu r \cdot g) + g \cdot \sin\theta \qquad \text{Equation 49}$$

Next, the CPU 10a proceeds to Step 1420. In Step 1420, it investigates the value of the state variable MODE, and it proceeds to a mode (a subroutine) corresponding to the value of the state variable MODE. At this stage, the value of the state variable MODE is set to 0, so the CPU 10a proceeds to Step 1425 and it begins the execution of the subroutine for MODE-0 (vehicle stopping mode) shown in FIG. 15 from Step 1500.

(MODE-0 . . . Vehicle Stopping Mode)

Upon entering MODE-0, the CPU 10a proceeds to Step 1505, and it determines whether the speed V of the driven vehicle is larger than a prescribed speed (here, 4 kilometers per hour) and if the signal POS of the shift lever switch 16 is neither the park position P nor the reverse position R to thereby determine whether the driven vehicle is moving. At the present stage, the vehicle is stopped, so the speed V of the driven vehicle is less than or equal to the prescribed speed, or the shift position is the park position P or the reverse position R. Accordingly, in Step 1505, the CPU 10a makes a determination of "No" and proceeds to Step 1510, and in Step 1510 it makes a sound and an image "None". Then, in Step 1515, the CPU 10a sets the target deceleration GT to 0 and proceeds to Step 1595, and it returns to Step 1430 of the flow chart in FIG. 14 by way of Step 1595.

In Step 1430, the CPU 10a performs processing for outputting a warning sound and a warning image by use of the warning apparatus 30. In this case, the warning sound and the warning image were set to "None" in Step 1510 of FIG. 15, so the warning apparatus 30 does not generate a warning sound or display a warning image by the execution of Step 1430.

Next, the CPU 10a proceeds to Step 1435, and it carries out output processing based on the target deceleration GT (=μr·g). Specifically, the CPU 10a compares the actual deceleration GD obtained from the acceleration sensor 15 with the target deceleration GT, and when the absolute value of the actual deceleration GD is smaller than the absolute value of the target deceleration GT, an instruction signal for increasing the braking oil pressure is output to the brake actuator 40, and the braking force is increased. When the absolute value of the actual deceleration GD is larger than the absolute value of the target deceleration GT, an instruction signal for decreasing the braking hydraulic pressure is output to the brake actuator 40, and the braking force is decreased. However, when the actual acceleration GD is larger than the target deceleration GT and the driver is operating the brake pedal, a decrease in the braking force by an instruction signal to the brake actuator 40 is not carried out.

The acceleration sensor 15 senses the acceleration in the fore and aft direction of the vehicle, so when the driven vehicle is running on a sloping surface, the influence thereof appears in the output. Accordingly, in this case, the target deceleration GT (=μr·g) is corrected based on the following Equation 50.

$$\mu r \cdot g = (\mu r(\text{before correction}) + \sin\theta) \cdot g \qquad \text{Equation 50}$$

Figure 15:
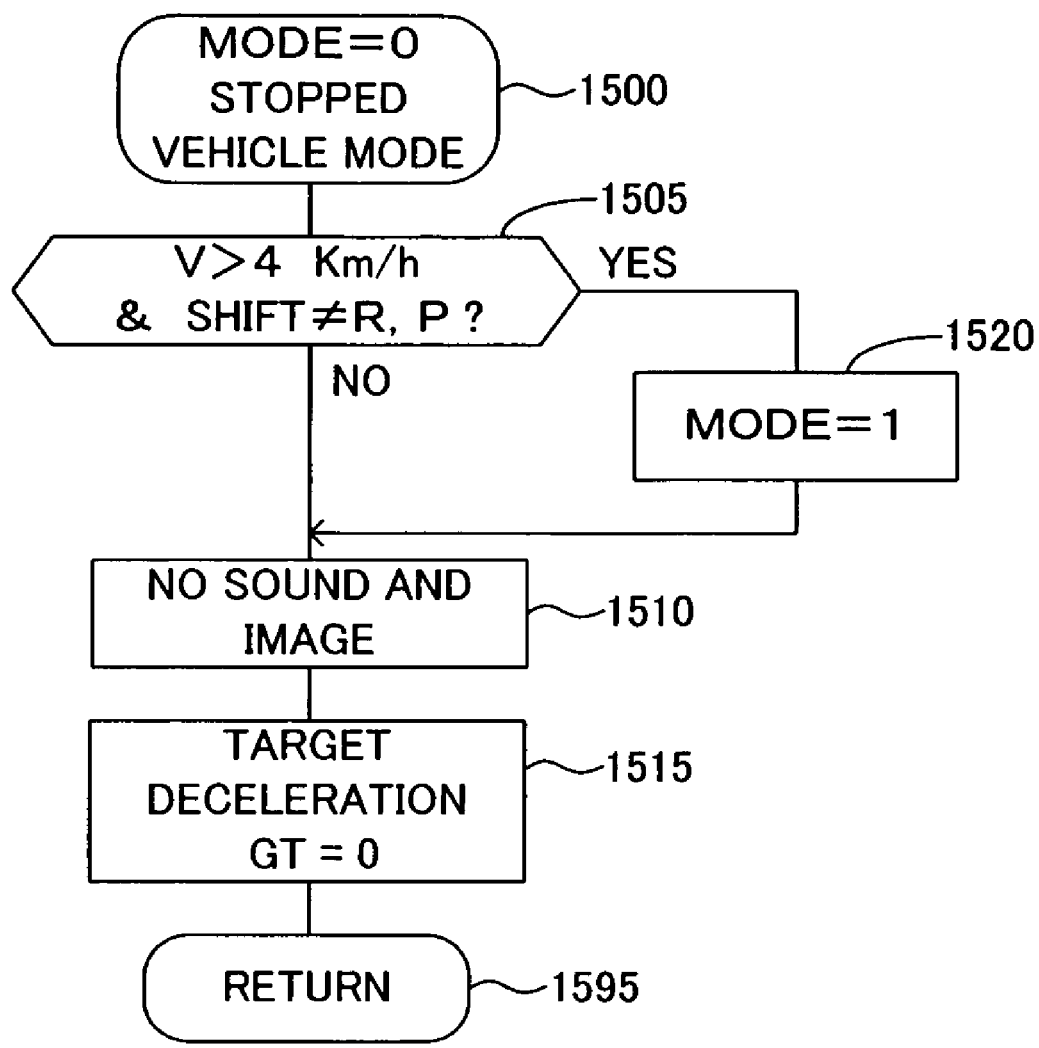
FIG. 15 is a flow chart showing a vehicle stopping mode routine executed by the CPU shown in FIG. 1.

At the present stage, the target deceleration GT was set to 0 in Step 1515 of above-described FIG. 15, so the output of an instruction signal to the brake actuator 40 is not carried out by the execution of Step 1435. Then, the CPU 10a returns to Step 1415. Subsequently, as long as the vehicle is stopped (as long as the condition continues that a determination of "No" is made in Step 1505 of FIG. 15), the CPU 10a repeatedly executes the above-described processing.

Next, the case will be described in which the driven vehicle has started moving. In this case, the speed reaches the prescribed speed (4 kilometers per hour), or the shift lever position is a position other than the park position P or the reverse position R (such as the drive position D). Therefore, when the CPU 10*a* has proceeded to Step 1505 of FIG. 15 by way of Step 1425 of FIG. 14, it makes a determination of "Yes" in Step 1505 to proceed to Step 1520, and it sets the value of the state variable MODE to 1.

Then, the CPU 10*a* returns to Step 1430 of FIG. 14 by way of Steps 1510, 1515, and 1595, and it performs the processing of Step 1430 and Step 1435. In this case, in Steps 1510 and 1515, the sound and the image were set to "None" and the target deceleration GT were set to 0. Therefore, even if the processing of Steps 1430 and 1435 is carried out, a warning sound and image are not generated, and an instruction signal is not sent to the brake actuator 40.

(MODE-1 . . . Non-Warning Mode)

Next, the CPU 10*a* performs the processing of Step 1415 of FIG. 14, and it investigates the value of the state variable MODE in Step 1420. In this case, the value of the state variable MODE is set to 1, so the CPU 10*a* proceeds to Step 1440, and it begins the processing of the subroutine for MODE-1 (non-warning mode) shown in FIG. 16 from Step 1600.

Namely, the CPU 10*a* proceeds to Step 1605, and it determines whether the speed V of the driven vehicle is larger than a prescribed speed (here 4 kilometers per hour) and if the signal POS from the shift lever switch 16 is neither the park position P nor the reverse position R, whereby it is determined whether the driven vehicle is moving. At this stage, since the vehicle is moving, the CPU 10*a* makes a determination of "Yes" in Step 1605 and proceeds to Step 1610. In Step 1610, it begins the processing of warning-intervention instruction issuance subroutine shown in FIG. 17 from Step 1700.

Then, the CPU 10*a* proceeds to Step 1705, and in Step 1705 it sets the parameters for intervention braking. Specifically, the idle running time $\tau$ is set to the above-described idle running time $\tau$ for intervention braking, the assumed deceleration of the driven vehicle $\mu \cdot g$ is set to the assumed deceleration of the driven vehicle for intervention braking $\mu \cdot g$ (=K·$\mu$max·g), and the headway time Td is set to the above-described headway time for intervention braking Td.

Next, the CPU 10*a* proceeds to Step 1710. In Step 1710, it commences processing of the warning determining subroutine shown in FIG. 18 from Step 1800, it proceeds to Step 1805 to determine whether the speed Vf of the preceding vehicle is smaller than the above-described prescribed speed Vf0 with its sign reversed (such as −6 kilometers per hour). At this time, if the speed Vf of the preceding vehicle is smaller than a speed equal tot he prescribed speed Vf0 with its sign reversed, the above Equation 37 is established, so the CPU 10*a* makes a determination of "Yes" in the above Step 1805, it proceeds to Step 1810 to set the closest approach distance dmin and the speed at the time of closest approach Vs according to the above Equation 35 and the above Equation 36, and it proceeds to Step 1815. As a result, the preparation is carried out for warning determination for a front end collision described above in (5).

At the time of the determination in the above Step 1805, when the speed Vf of the preceding vehicle is greater than or equal to a speed equal to the prescribed speed Vf0 with its sign reversed, the CPU 10*a* makes a determination of "No" in Step 1805, it proceeds to Step 1820 to determine whether the speed Vf of the preceding vehicle is smaller than the above-described prescribed speed Vf0 (such as +6 kilometers per hour).

At this time, if the speed Vf of the preceding vehicle is smaller than the prescribed speed Vf0, the above Equation 13 is established (see Step 1805). In this case, the CPU 10*a* proceeds to Step 1825, it sets the value of the closest approach distance dmin according to the above Equation 12, it makes the speed at the time of closest approach Vs equal to 0, and it proceeds to Step 1815. As a result, the preparation for warning determination for the case in which the preceding vehicle is initially stopped as described above in (2) is carried out.

At the time of determination in the above Step 1820, if the speed Vf of the preceding vehicle is greater than or equal to the prescribed speed Vf0, the CPU 10*a* makes a determination of "No" in Step 1820, it proceeds to Step 1830, and it determines whether the condition at the present time satisfies the above Equation 9 and Equation 10.

At this time, if the above Equation 9 and Equation 10 are satisfied, all of the above Equations 9–11 are satisfied (see Step 1820), the CPU 10*a* makes a determination of "Yes" in Step 1830 and proceeds to Step 1835 to set the value of the closest approach distance dmin according to the above Equation 8 and to make the speed at the time of closest approach Vs equal to 0, and it proceeds to Step 1815. As a result, the preparation for warning determination for the case described above in (1) in which the preceding vehicle first stops and then the driven vehicle stops is carried out.

At the time of determination in the above Step 1830, in the case in which the above Equation 9 or Equation 10 is not satisfied, the CPU 10*a* makes a determination of "No" in Step 1830, it proceeds to Step 1840, and it determines whether the condition at the present time satisfies the above Equation 22.

At this time, if the above Equation 22 is satisfied, it is determined in Step 1830 that the above Equation 23 is satisfied, and it is determined in Step 1820 that the conditions of the above Equation 11 are satisfied (Vf≧Vf0). Therefore, all of the conditions of applicability of the above Equation 19 and the above Equation 20 (the above Equation 22, Equation 23, and Equation 11) are satisfied (in the case in which $\mu$f<0, the above Equation 23 is established). Accordingly, the CPU 10*a* proceeds from Step 1840 to Step 1845, it sets the value of the closest approach distance dmin according to the above Equation 19, it sets the speed at the time of closest approach Vs according to the above Equation 20, and it proceeds to Step 1815. As a result, the preparation for warning determination is carried out for the case described above in (3) in which the driven vehicle most closely approaches the preceding vehicle which is moving after elapse of the idle running time $\tau$.

At the time of the determination in Step 1840, in the case in which the conditions at the present time do not satisfy the above Equation 22, the CPU 10*a* makes a determination of "No" in Step 1840 and proceeds to Step 1850. In Step 1850, it determines whether the conditions at the present time satisfy the above Equation 31 and the above Equation 32.

At this time, if the above Equation 31 and Equation 32 are satisfied, the CPU 10*a* makes a determination of "Yes" in Step 1850 and proceeds to Step 1855. In this case, it was determined in Step 1840 that Equation 29 is satisfied and in Step 1820 that Equation 30 is satisfied, so the conditions of applicability of the above Equations 29–32 are satisfied. Accordingly, in Step 1855, the CPU 10*a* sets the value of the closest approach distance dmin according to Equation 27, it sets the speed Vs at the time of closest approach according to Equation 28, and it proceeds to Step 1815. As a result, the preparation for warning determination is carried out for the case described above in (4) in which the driven vehicle most closely approaches the preceding vehicle before the elapse of the idle running time $\tau$.

At the time of the determination in Step 1850, in the case in which the conditions at the present time do not satisfy either of Equation 31 or Equation 32, the CPU 10*a* proceeds to Step 1860, it sets the value of the closest approach distance dmin to the vehicle separation D at the present time, it sets the value of the speed at the time of closest approach Vs (the vehicle speed at the time of closest approach) to the speed V of the driven vehicle, and it proceeds to Step 1815. As a result, the preparation for warning determination is carried out for the case described above in (6) for countermeasures against a vehicle cutting in front.

In Step 1815, the CPU 10*a* determines whether the closest approach distance dmin has become smaller than the suitable vehicle separation Dt (dmin<Dt). At the present time, in Step 1705 of FIG. 17, each parameter was set to the parameter for intervention braking, so the determination in Step 1815 becomes a determination of whether to carry out intervention braking. In the case in which the closest approach distance dmin is smaller than the suitable vehicle separation Dt (dmin<Dt), the CPU 10*a* makes a determination of "Yes" in Step 1815, it proceeds to Step 1870 and sets the value of a instruction issuance permission flag F to 1, and it returns to Step 1710 of FIG. 17 by way of Step 1895. In the case in which the closest approach distance dmin is greater than or equal to the suitable vehicle separation Dt (dmin≧Dt), the CPU 10*a* makes a determination of "No" in Step 1815 and proceeds to Step 1875. After it sets the value of the instruction issuance permission flag F to 0 in Step 1875, it returns to Step 1710 by way of Step 1895.

When the CPU 10*a* returns to Step 1710, it checks the value of the instruction issuance permission flag F. If the value of this flag F is 1, it proceeds to Step 1715, it establishes a condition in which intervention braking is permitted, and it proceeds to Step 1795. On the other hand, if the value of the instruction issuance permission flag F is 0, it proceeds from Step 1710 to Step 1720, and in Step 1720 it sets parameters for the second warning. Namely, the idle running time τ is set to the idle running time τ for the second warning, the assumed deceleration of the driven vehicle $\mu \cdot g$ is set to the assumed deceleration of the driven vehicle for the second warning $\mu \cdot g$, and the headway time Td is set to the above headway time for the second warning Td.

Figure 18:
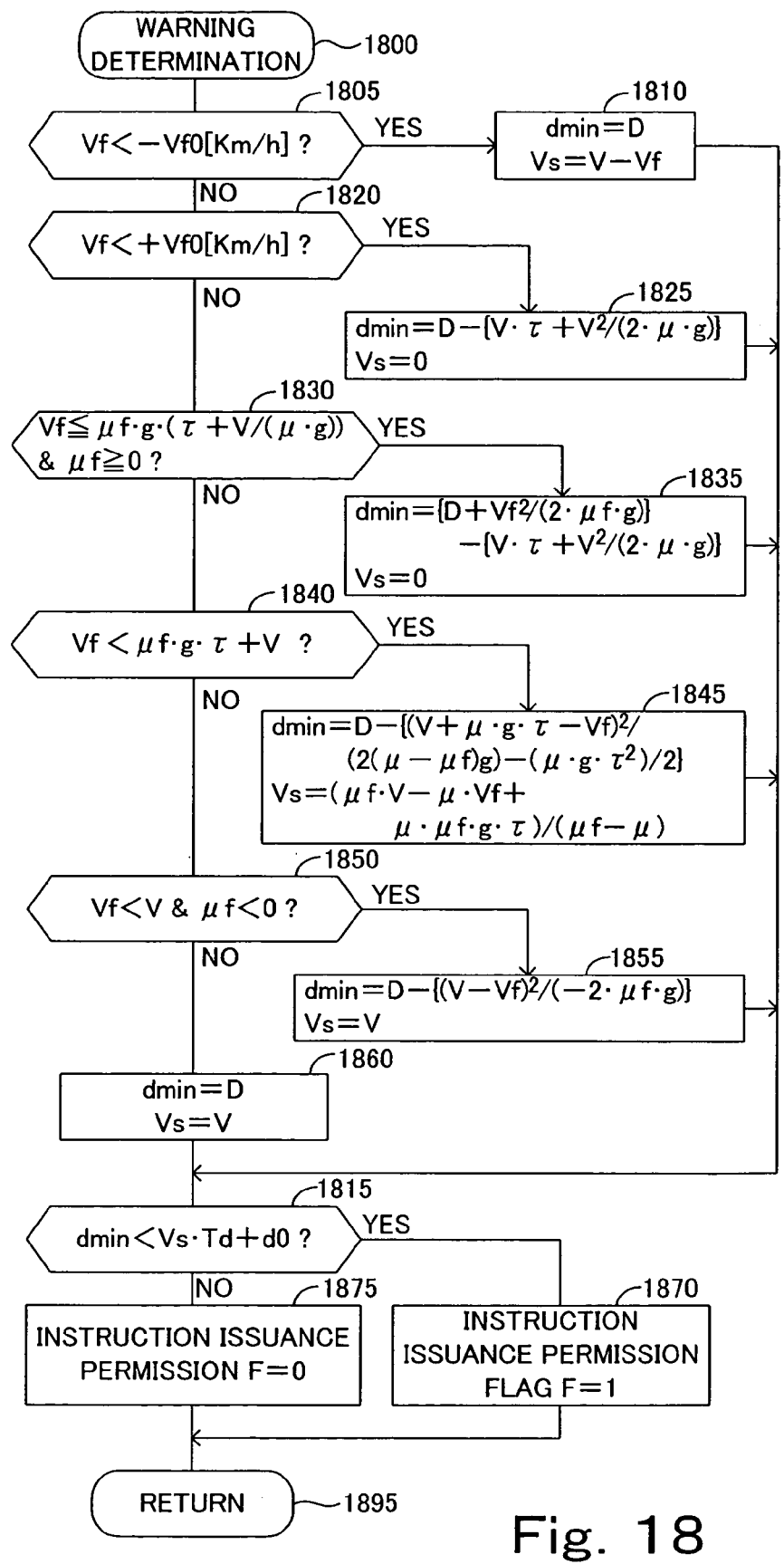
FIG. 18 is a flow chart showing a warning determining subroutine which is executed by the CPU shown in FIG. 1.

Then, the CPU 10*a* proceeds to Step 1725, and in the same manner as in the above Step 1710, it performs processing of the warning determining subroutine shown in FIG. 18. As a result, since each parameter has been set to the value for the second warning in Step 1720 at the present time, it is determined whether to carry out the second warning. When the second warning should be carried out, the value of the instruction issuance permission flag F is set to 1 in Step 1870, and when it should not be carried out, the value of the instruction issuance permission flag F is set to 0 in Step 1875.

Figure 17:
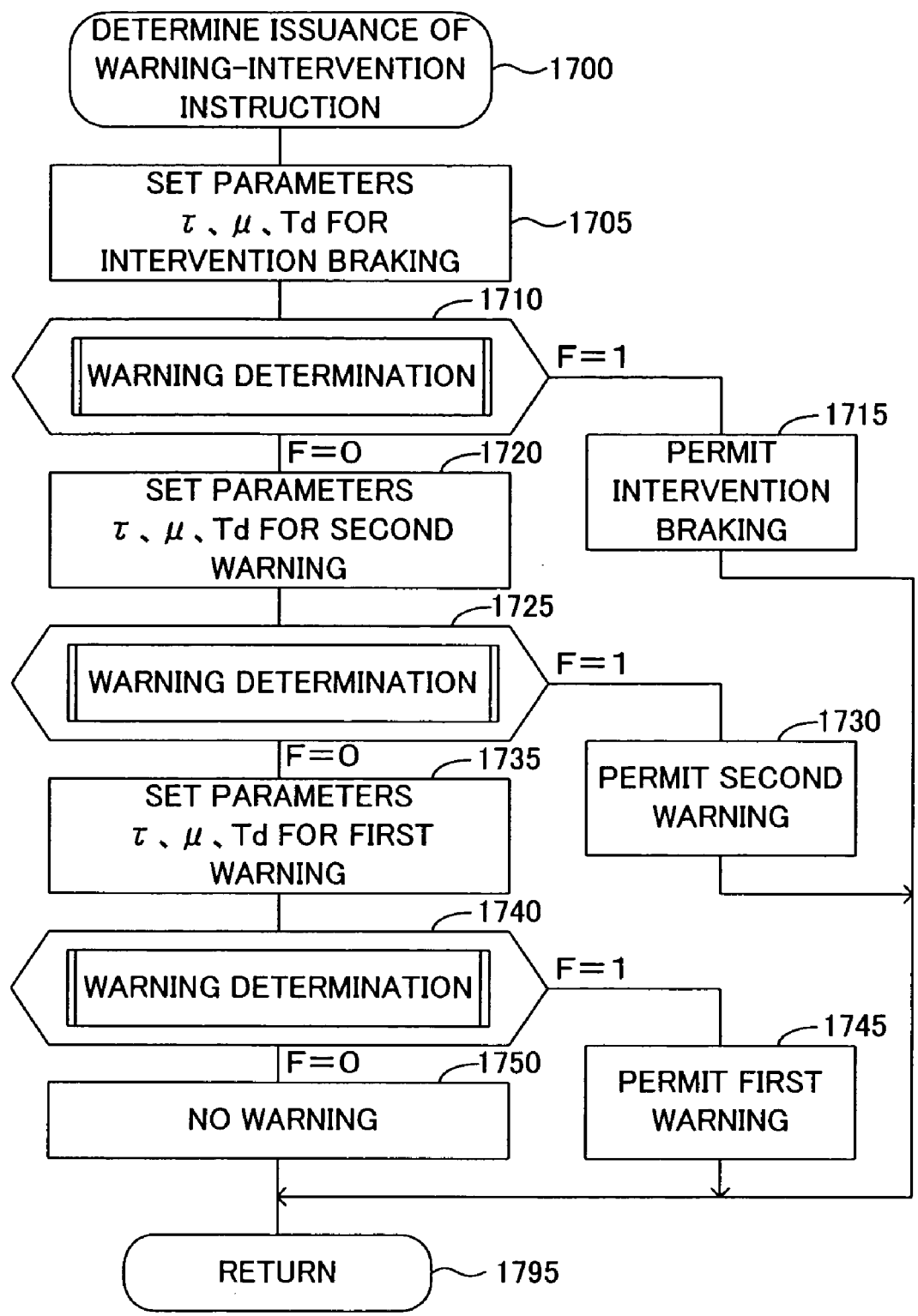
FIG. 17 is a flow chart showing a warning-intervention instruction issuance determining subroutine which is executed by the CPU shown in FIG. 1.

As a result, when the CPU 10*a* has returned to Step 1725 of FIG. 17 by way of Step 1895, if the value of the instruction issuance permission flag F is 1, the CPU 10*a* proceeds to Step 1730 where a condition in which the second warning is permitted is established, and it proceeds to Step 1795. On the other hand, if the value of the instruction issuance permission flag F is 0, the CPU 10*a* proceeds to Step 1735, and in Step 1735 the parameters for the first warning are set. Namely, based on the selected position signal ST from the dial switch 14 and parameters selected from the table shown in FIG. 12, the CPU 10*a* sets the idle running time τ to an idle running time for the first warning (first idle running time) τ for an off state of the brake (when the signal STOP from the brake switch 17 is 0 and the brake apparatus is in a non-operating state), it sets the assumed deceleration of the driven vehicle $\mu \cdot g$ to the above-described assumed deceleration of the driven vehicle for the first warning (the first assumed deceleration for the driven vehicle) $\mu \cdot g$, and it sets the headway time Td to the headway time for the first warning (the first headway time) Td.

Then, the CPU 10*a* proceeds to Step 1740, and in the same manner as in the above Step 1710, it performs processing of the warning determining subroutine shown in FIG. 18. As a result, since each parameter has been set in Step 1735 to the value for the first warning at the present time, it is determined whether to perform the first warning. When the first warning should be carried out, the value of the instruction issuance permission flag F is set to 1 in Step 1870, and when it should not be performed, the value of the instruction issuance permission flag F is set to 0 in Step 1875.

As a result, when the CPU 10*a* returns to Step 1740 of FIG. 17 by way of Step 1895, if the value of the instruction issuance permission flag F is 1, it proceeds to Step 1745 and a state is established in which the first warning is permitted. On the other hand, if the value of the instruction issuance permission flag F is 0, it proceeds to Step 1750. In Step 1750 a state is established in which the warning is "None", and the CPU 10*a* proceeds to Step 1795.

Figure 16:
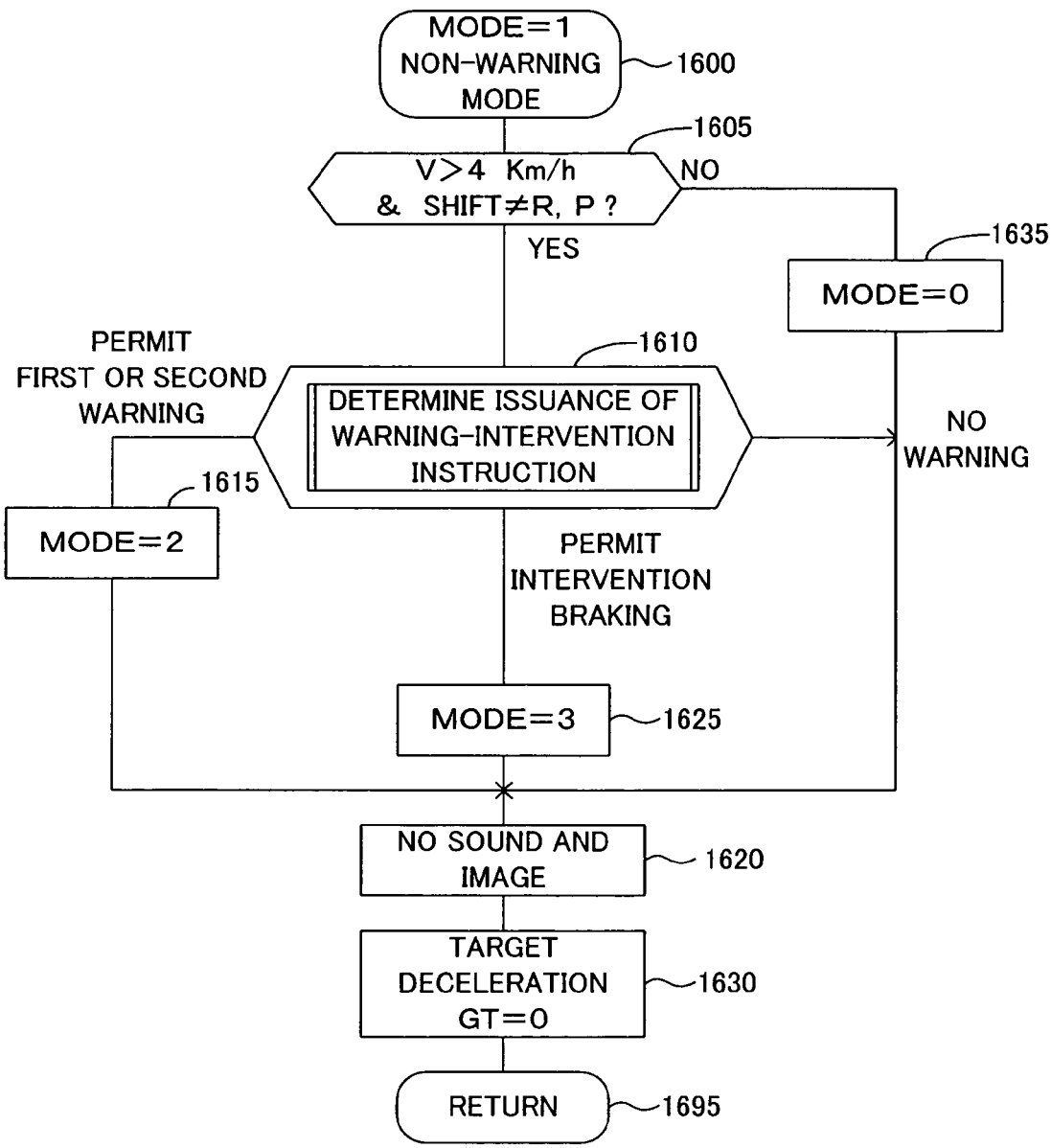
FIG. 16 is a flow chart showing a non-warning mode routine executed by the CPU shown in FIG. 1.

Upon proceeding to Step 1795, the CPU 10*a* returns to Step 1610 shown in FIG. 16. In Step 1610, it investigates the results of the execution of the warning-intervention instruction issuance determining subroutine. In the case in which the result is a state which permits the first warning or the second warning, it proceeds to Step 1615 and sets the value of the state variable MODE to 2, and it proceeds to Step 1620. If the result is a state which permits intervention braking, the CPU 10*a* proceeds to Step 1625 to set the value of the state variable MODE to 3, and it proceeds to Step 1620. When the result is a state which makes the warning "None", the CPU 10*a* proceeds to Step 1620.

On the other hand, in the case in which the driven vehicle has returned to a stopped state, the speed V of the driven vehicle becomes less than or equal to the prescribed speed (here, four kilometers per hour), or the signal POS of the shift lever switch 16 is the park position P or the reverse position R. Therefore, in Step 1605, the CPU 10*a* makes a determination of "No" and proceeds to Step 1635, then it proceeds to Step 1620. As a result, when the shift lever position is the park position P or the reverse position R, the first warning, the second warning, and intervention braking are not carried out.

In Step 1620, the CPU 10*a* makes the sound and the image "None" and it proceeds to Step 1630 and sets the target deceleration GT to 0, after which it returns to Step 1430 of the flow chart of FIG. 14 by way of Step 1695.

In Step 1430, the CPU 10*a* carries out processing for outputting the warning sound and the warning image by use of the warning apparatus 30. In this case as well, the warning sound and image have been set to "None" in Step 1620 of FIG. 16, so the generation of a warning sound and display of a warning image are not performed by the warning apparatus 30 by the execution of Step 1430. In addition, the CPU 10*a* proceeds to Step 1435 and carries out output processing based on the target deceleration GT. However, since the target deceleration GT was set to 0 in Step 1630 of FIG. 16, an instruction signal is not output to the brake actuator 40 by the execution of Step 1435.

Subsequently, the CPU 10*a* returns to Step 1415 and obtains (updates) each of the above data, and in Step 1420 it investigates the value of the state variable MODE. At this time, if the result of Step 1610 in FIG. 16 is a state in which there is no warning, the value of the state variable MODE is maintained at 1, so the CPU 10*a* proceeds to Step 1440 and executes the above-described MODE-1 subroutine.

Figure 19:
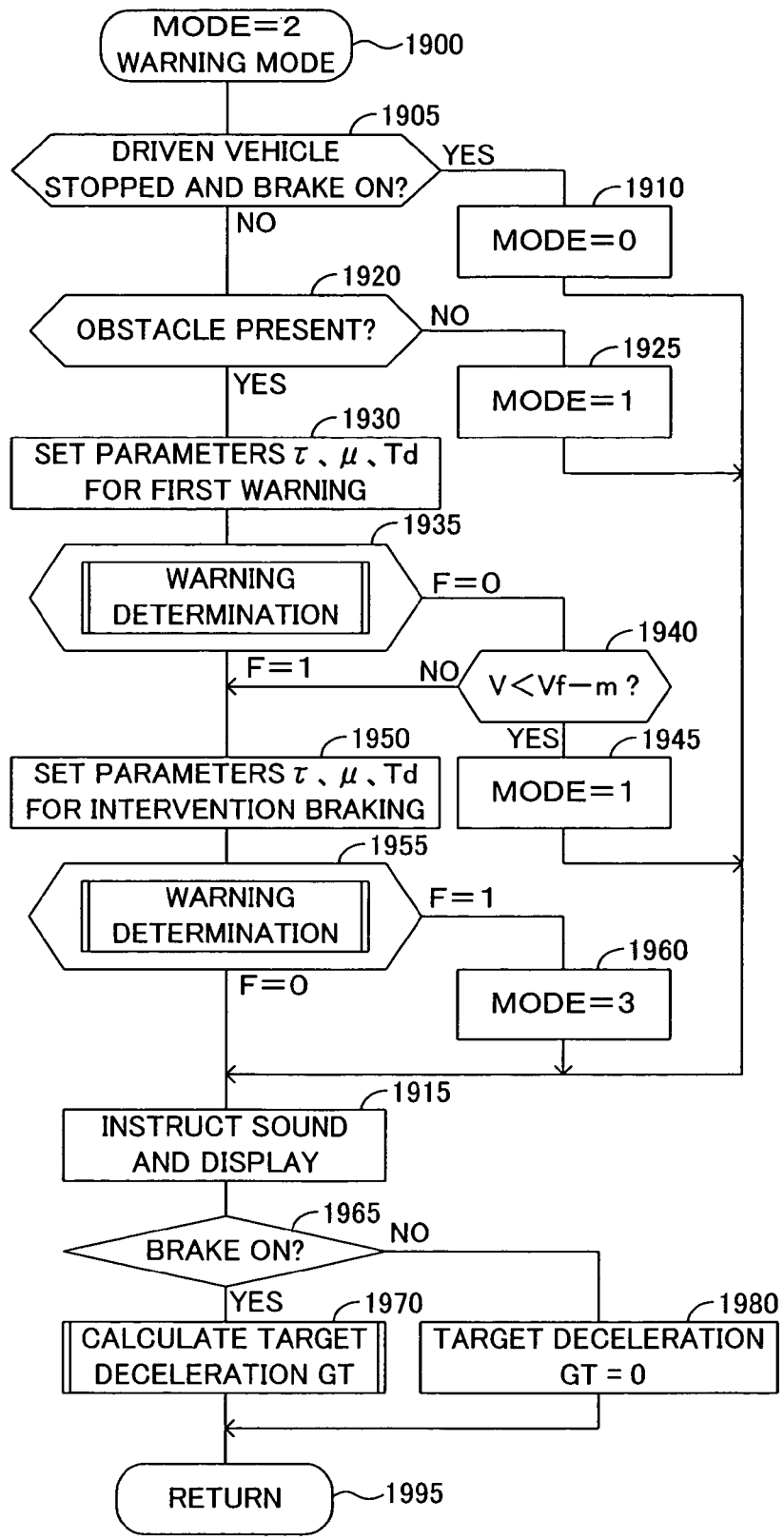
FIG. 19 is a flow chart showing a warning mode routine which is executed by the CPU shown in FIG. 1.

On the other hand, in the case in which the value of the state variable MODE was changed to 2 in Step 1615 of FIG. 16, the CPU 10*a* proceeds to Step 1445 and begins the processing of MODE-2 (warning mode) subroutine shown in FIG. 19 from Step 1900. Furthermore, in the case in which the value of the state variable MODE was changed to 3 in Step 1625 of FIG. 16, the CPU 10*a* proceeds to Step 1450 and begins the processing of the MODE-3 (intervention braking mode) subroutine shown in FIG. 21 from Step 2100.

(MODE-2 . . . Warning Mode)

Now, the explanation will be continued for the case in which it is determined in Step 1725 or Step 1740 of FIG. 17 that the second warning or the first warning must be performed, the value of the state variable MODE is thereby set to 2 in Step 1615 of FIG. 16, and the CPU 10*a* proceeds from Step 1420 to Step 1445 of FIG. 14. As described above, the CPU 10*a* begins processing of the MODE-2 (warning mode) subroutine shown in FIG. 19 from Step 1900, it proceeds to Step 1905, and it determines whether the driven vehicle is stopped (V=0) and whether a state occurs in which the brake pedal is being operated and braking force is being generated based on whether the value of the brake switch signal STOP is 1.

In the case in which the driven vehicle is stopped and the brake pedal is being operated, the CPU 10*a* makes a determination of "Yes" in Step 1905 and proceeds to Step 1910. In Step 1910, it makes the value of the state variable MODE equal to 0 and then proceeds to Step 1915. As a result, the processing by the CPU 10*a* moves to MODE-0 (vehicle stopping mode) at the time of executing the main routine shown in FIG. 14.

On the other hand, in the case in which the driven vehicle is not stopped or the brake pedal is not being operated, the CPU 10*a* makes a determination of "No" in Step 1905 and proceeds to Step 1920. In Step 1920, it is determined whether an obstacle is still present based on whether there are reflected waves of milliwave radar generated by the vehicle separation sensor 12. Then, if there are no reflected waves from the milliwave radar at this stage, the CPU 10*a* makes a determination of "No" in Step 1920 and proceeds to Step 1925, it sets the value of the state variable MODE equal to 1, and it proceeds to Step 1915.

Furthermore, if an obstacle is still present, the CPU 10*a* makes a determination of "Yes" in Step 1920 and proceeds to Step 1930, and it sets parameters for the first warning in the same manner as in the above Step 1735 (FIG. 17). Then, the CPU 10*a* proceeds to Step 1935 and performs processing of a warning determining subroutine of FIG. 18. Namely, it is determined by Step 1930 and Step 1935 whether a state occurs for performing the first warning. In other words, in these steps, it is determined whether a sufficiently safe vehicle separation is maintained. In this case, the idle running time τ uses the value for an off state of the brake (for when the brake apparatus is not operating).

As a result, if it is not a state for carrying out the first warning, the value of the instruction issuance permission flag F is set to 0 in Step 1875 of FIG. 18. Thus, the CPU 10*a* proceeds from Step 1935 to Step 1940, and in Step 1940 it determines whether the speed V of the driven vehicle is smaller than a speed which is smaller than the speed Vf of the preceding vehicle by a value m (such as 5 kilometers per hour). This is in order to ascertain that the speed V of the driven vehicle is a sufficiently smaller value than the speed Vf of the preceding vehicle, and therefore, the situation is safe even if MODE-2 (warning mode) is completed. If the speed V of the driven vehicle is smaller than a speed equal to the speed Vf of the preceding vehicle minus the speed m, the CPU 10*a* makes a determination of "Yes" in Step 1940 and proceeds to Step 1945. In Step 1945, it sets the value of the state variable MODE to 1, and then it proceeds to Step 1915. Step 1940 is provided because of the following reason. If the speed V of the driven vehicle becomes smaller than a speed equal to the speed Vf of the preceding vehicle minus the speed m, it is possible to avoid with certainty the situation in which the CPU 10*a* proceeds to Step 1945 to thereby end the MODE-2 warning mode and enter the MODE-1 non-warning mode, and then carries out the first warning again immediately after the entry to the MODE-1 non-warning mode.

It should be noted that, in the above Step 1930, the margin vehicle separation d0 is preferably increased by a prescribed value d0α (>0) and the value d0+d0α is used as d0 in Step 1815 of FIG. 18. This also makes it possible to avoid with certainty the situation in which the CPU 10*a* proceeds to Step 1945 to thereby end the MODE-2 warning mode and enter the MODE-1 non-warning mode and then carries out the first warning immediately after the entry to the MODE-1 non-warning mode.

On the other hand, in the case in which the first warning should be performed, the value of the instruction issuance permission flag F is set to 1 in Step 1870 of FIG. 18, so the CPU 10*a* proceeds from Step 1935 to Step 1950. In Step 1950, in the same manner as in the above Step 1705, the parameters for intervention braking are set. In addition, if the speed V of the driven vehicle is not smaller than a speed equal to the speed Vf of the preceding vehicle minus the speed m, the CPU 10*a* makes a determination of "No" in the above Step 1940 and proceeds to the above Step 1950 and sets the parameters for intervention braking.

Next, the CPU 10*a* proceeds to Step 1955 and performs processing of the warning determining subroutine of FIG. 18. Namely, in Step 1950 and Step 1955 it is determined whether a state occurs for performing intervention braking. In the case in which a state for performing intervention braking occurs, the value of the instruction issuance permission flag F is set to 1 in Step 1870 of FIG. 18, so the CPU 10*a* proceeds from the above Step 1955 to Step 1960 and sets the value of the state variable MODE to 3, and then it proceeds to Step 1915. On the other hand, if a state for performing intervention braking does not occur, the value of the instruction issuance permission flag F is set to zero in Step 1875 of FIG. 18, so the CPU 10*a* proceeds from the above Step 1955 directly to Step 1915.

In Step 1915, when beginning the processing of the MODE-2 (warning mode) subroutine, depending on whether the first warning was authorized (Step 1745 of FIG. 17) or the second warning was authorized (Step 1730 of FIG. 17), the CPU 10*a* instructs an output of a warning sound and image for carrying out a corresponding warning. Then, the CPU 10*a* proceeds to Step 1965. In Step 1965, it is determined whether a state occurs in which the brake pedal is being operated and braking force is being generated based on whether the value of the brake signal STOP is 1.

Figure 20:
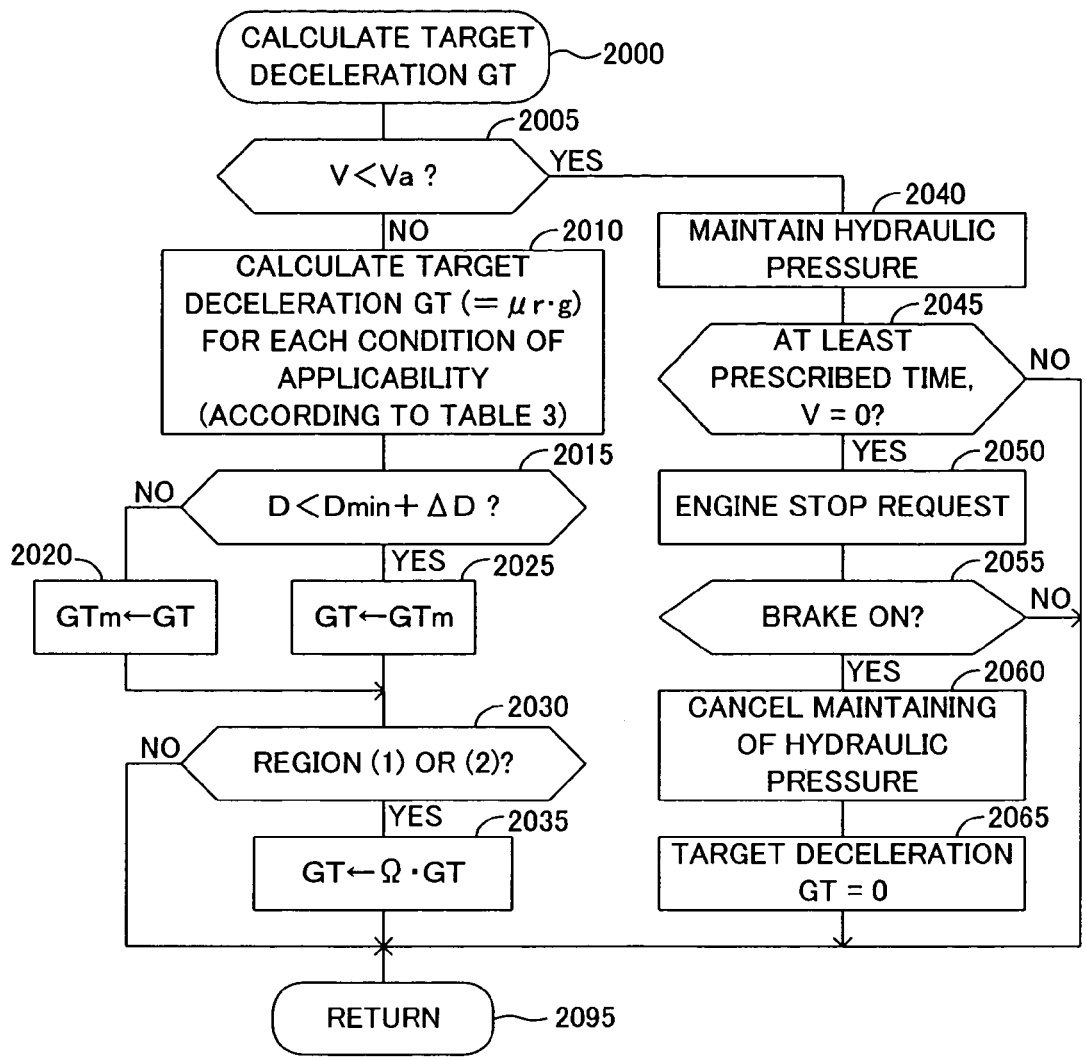
FIG. 20 is a flow chart showing a subroutine which is executed by the CPU shown in FIG. 1 for calculating a target deceleration.

If the brake pedal is being operated, the CPU 10*a* makes a determination of "Yes" in Step 1965 and proceeds to Step 1970. In order to perform brake assist control to increase the braking force in the case in which the braking force is inadequate even though the driver has performed a braking operation in response to the first or the second warning, the target deceleration GT calculating subroutine shown in FIG. 20 is executed to find the target deceleration GT, and then Step 1430 of FIG. 14 is returned to by way of Step 1995.

As a result, in Step 1430, the CPU 10a has the warning apparatus 30 generate a warning sound or an image corresponding to the first warning or the second warning instructed in Step 1915 of FIG. 19. Then, the CPU 10a proceeds to Step 1435 and carries out processing based on the target deceleration GT, and it outputs a control signal for controlling the braking hydraulic pressure to the brake actuator 40 so that the absolute value of the actual deceleration GD will be equal to the absolute value of the target deceleration GT.

On the other hand, at the time of the determination in Step 1965 of FIG. 19, in the case in which the brake pedal is not being operated, the CPU 10a makes a determination of "No" in Step 1965 and proceeds to Step 1980. In Step 1980, it sets the value of the target deceleration GT to 0, and then it returns to Step 1430 of FIG. 14 by way of Step 1995.

As a result, in Step 1430, the CPU 10a makes the warning apparatus 30 generate a warning sound or an image instructed in Step 1915 of FIG. 19, and the driver is urged to perform braking operation. However, in the processing of the subsequent Step 1435, since the target deceleration GT was set to 0 in Step 1980 of FIG. 19, no command signal is output to the brake actuator 40.

In the above manner, in MODE-2 (warning mode), depending upon the conditions of the driven vehicle and the preceding vehicle, the CPU 10a proceeds to MODE-0 (vehicle stopping mode), MODE-1 (non-warning mode), or MODE-3 (intervention braking mode), and when a state is continuing in which the first warning or the second warning should be carried out, processing is carried out for achieving necessary warning and brake assist control by Steps 1915, 1970, 1980, and the like.

(Calculation of Target Deceleration GT)

Next, the contents of processing of a subroutine for calculating the target deceleration GT shown in FIG. 20 which is carried out in Step 1970 of the above FIG. 19 will be explained. The CPU 10a begins the subroutine from Step 2000, it proceeds to Step 2005, and it determines whether the speed V of the driven vehicle is smaller than a prescribed low speed Va (a speed indicating that the driven vehicle is about to stop) In general, the target deceleration GT is calculated in a state in which the driven vehicle requires braking force, so the speed V of the driven vehicle is larger than the prescribed low speed Va. Accordingly, the CPU 10a makes a determination of "No" in Step 2005 and proceeds to Step 2010.

In Step 2010, the CPU 10a calculates the target deceleration GT according to the above Table 3. Namely, it determines into which region of FIG. 11 the conditions of the preceding vehicle and the driven vehicle lie at the time of carrying out Step 2010 (determined by the conditions of applicability shown in Table 1 and Table 2), and it calculates the target deceleration GT ($=\mu r \cdot g$) using an equation corresponding to the region.

Then, the CPU 10a proceeds to Step 2015, and it determines whether the vehicle separation D found by the vehicle separation sensor 12 (the distance towards an obstacle in front) is smaller than the recognition limit Dmin in distance of the vehicle separation sensor 12 increased by a prescribed distance $\Delta D$ (Dmin+$\Delta D$). Normally, since the vehicle separation D which is found by the vehicle separation sensor 12 is larger than the recognition limit Dmin of the vehicle separation sensor 12 plus the prescribed distance $\Delta D$ (Dmin+$\Delta D$), the CPU 10a makes a determination of "No" in Step 2015 and proceeds to Step 2020. In Step 2020 it stores the target deceleration GT found in the above Step 2010 as the value GTm. On the other hand, when the vehicle separation D found by the vehicle separation sensor 12 is smaller than the recognition limit Dmin of the vehicle separation sensor 12 plus the prescribed distance $\Delta D$ (Dmin+$\Delta D$) (D<Dmin+$\Delta D$), the CPU 10a makes a determination of "Yes" in Step 2015 and proceeds to Step 2025, and the CPU 10a uses, as the target deceleration GT for this time, the target deceleration which was stored as the value GTm in Step 2020 the previous time the main routine was executed. As a result, when the vehicle separation D is smaller than the recognition limit Dmin of the vehicle separation sensor 12 increased by the prescribed distance $\Delta D$ (Dmin+$\Delta D$) (namely, when the vehicle separation D is less than or equal to the recognition limit of the vehicle separation sensor 12), the target deceleration GT which was determined immediately before is maintained (held).

Figure 24:
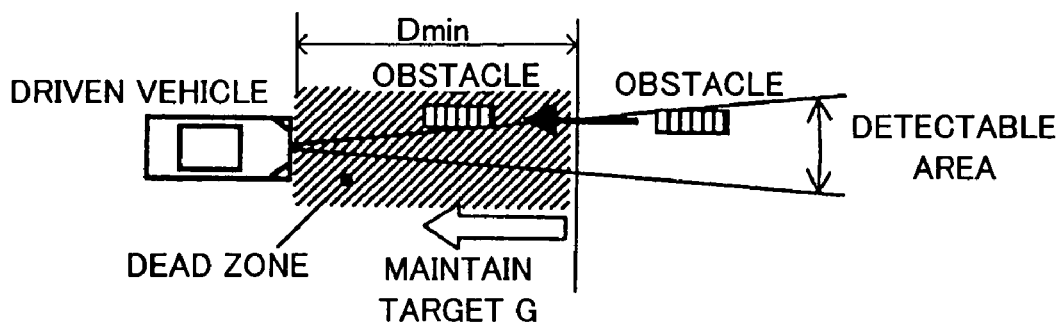
FIG. 24 is a figure schematically showing the detectable area (detection area) of the vehicle separation sensor and the recognition limit.

As shown in FIG. 24, if an obstacle to which the distance is being measured by the vehicle separation sensor 12 approaches to within the recognition limit Dmin of the sensor, due to limits on the angle of the field of view of the sensor, it falls outside the detectable area, and the point to which the sensor measures the distance shifts to another object to farther away, or it switches to measuring the distance to another reflection point on another portion of the same object. Thus, the measured vehicle separation D suddenly changes. Therefore, this is a step which is provided in order to prevent a resulting sudden change in the target deceleration GT. As a result, even in the case in which the object of interest can no longer be detected, the target deceleration GT is maintained, and appropriate braking can be carried out.

It should be noted that for the same reasons as given above, in order to prevent the first warning or the second warning from being canceled in spite of their being actually necessary, when the vehicle separation D is smaller than the recognition limit Dmin of the vehicle separation sensor 12 increased by a prescribed distance $\Delta D$ (Dmin+$\Delta D$), the structure is preferably such as to maintain the first or the second warning which is generated at that time.

Again referring to FIG. 20, the CPU 10a proceeds to Step 2030, and in Step 2030 it determines whether the current operating region is the region shown by (1) or (2) in FIG. 11 (Table 1). Then, when the current operating region is region (1) or (2), the CPU 10a makes a determination of "Yes" in Step 2030 and proceeds to Step 2035 where it corrects the target deceleration GT by increasing it by multiplying the target deceleration GT found at that time by a coefficient $\Omega$ (such as $\Omega=1.05$), and then it proceeds to Step 2095.

Figure 25A:
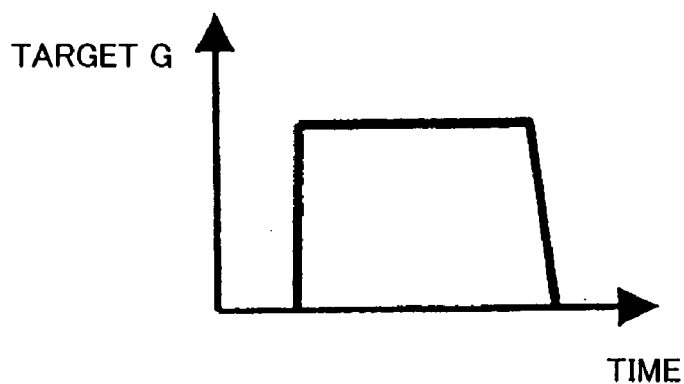
FIG. 25A is a figure showing the change with respect to time of the calculated target deceleration.
Figure 25B:
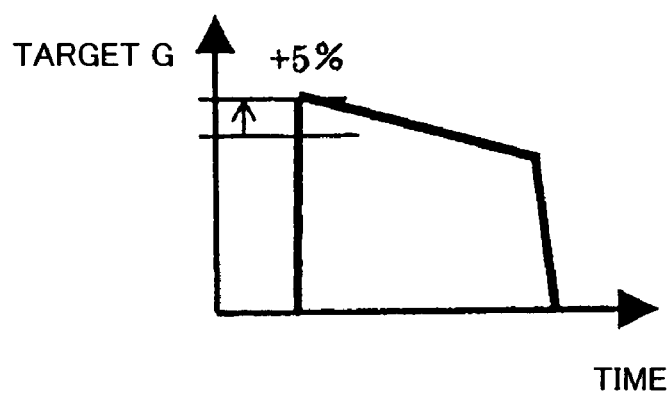
FIG. 25B is a figure showing the change with respect to time of the target deceleration for the case in which the calculated target deceleration is made increased immediately after the start of intervention braking.

The corrective increase by the coefficient $\Omega$ is performed with the object of changing the target deceleration GT from the state shown in FIG. 25(A) to the state shown in FIG. 25(B) and of lowering the speed V of the driven vehicle at an earlier time such as by making the actual deceleration of the driven vehicle a large value, such as immediately after the start of intervention braking and as a result to smoothly decrease the target deceleration GT which is subsequently determined, thereby improving the brake feeling during intervention braking for stopping.

If the current operating region is not region (1) or (2), the CPU 10a makes a determination of "No" in Step 2030 and proceeds directly to Step 2095.

If the speed V of the driven vehicle has sufficiently decreased due to braking and has become smaller than the prescribed speed Va, when the CPU 10a proceeds to Step 2005, it makes a determination of "Yes" in Step 2005 and proceeds to Step 2040, and in Step 2040 it generates an instruction for maintaining the braking hydraulic pressure at that time. As a result, when the processing of Step 1435 of FIG. 14 is carried out, the braking hydraulic pressure is maintained at a constant value.

The maintaining of the braking hydraulic pressure is a function which is added in order to prevent the driven vehicle from moving due to the idling torque (the drive torque of a vehicle which is generated when the engine of the vehicle is idling and which is transmitted to the drive wheels through the torque converter of the vehicle) when, as in the intervention braking in region (1) or (2) shown in FIG. 11 (Table 1), intervention braking is performed in order to stop the driven vehicle, and then the braking force due to intervention braking is canceled when the driven vehicle has stopped (or just before it stops).

After carrying out the processing of Step 2040, the CPU 10a proceeds to Step 2045. In Step 2045, it determines whether a state in which the speed V of the driven vehicle is 0 has continued for at least a prescribed length of time. If the state in which the speed V of the driven vehicle is 0 has continued for at least the prescribed length of time, the CPU 10a makes a determination of "Yes" in Step 2045 and it outputs an engine stop request to an unillustrated engine control computer which is connected to the electric control apparatus 10. As a result, the engine is automatically stopped. It is noted that it is also possible for Step 2045 and Step 2050 to be omitted.

Then, the CPU 10a proceeds to Step 2055 and determines whether a state occurs in which the brake pedal is being operated and braking force is being generated (a state in which the brake apparatus is being operated) based on whether the value of the brake switch signal STOP is 1. When the brake pedal is being operated, a determination of "Yes" is made in Step 2055, and the CPU 10a proceeds to Step 2060. In Step 2060, an instruction is made to cancel the hydraulic pressure maintenance in the above Step 2040. This is because when the driver is operating the brake pedal and braking force is already being generated, it is no longer necessary to generate braking force by the brake actuator 40.

The determination in Step 2055 may be carried out based on whether the hydraulic pressure generated by the brake master cylinder connected to the brake actuator 40 is at least a prescribed pressure.

Then, the CPU 10a proceeds to Step 2065. In Step 2065, it sets the value of the target deceleration GT to 0, and it proceeds to Step 2095. When it is determined in the above Step 2055 that the brake pedal is not being operated, the CPU 10a proceeds to Step 2095 directly without canceling hydraulic pressure maintenance.

(MODE-3 . . . Intervention Braking Mode)

Next, the case will be explained in which the value of the state variable MODE is set to 3 in Step 1625 of FIG. 16 and Step 1960 of FIG. 19. In this case, the CPU 10a proceeds from Step 1420 of FIG. 14 to Step 1450, and it begins the processing of the MODE-3 (intervention braking mode) subroutine shown in FIG. 21 from Step 2100. Next, the CPU 10a proceeds to Step 2105 and determines whether a state occurs in which the driven vehicle is stopped (V=0) and the brake pedal is being operated and braking force is being generated based on whether the value of the brake switch signal STOP is 1.

When the driven vehicle is stopped and the brake pedal is being operated, the CPU 10a makes a determination of "Yes" in Step 2105 and proceeds to Step 2110. In Step 2110, it sets the value of the state variable MODE to 0 and then proceeds to Step 2115. As a result, the CPU 10a will processes MODE-0 (vehicle stopping mode) when it executes the main routine next time.

On the other hand, when the driven vehicle is not stopped or the brake pedal is not being operated, the CPU 10a makes a determination of "No" in Step 2105 and proceeds to Step 2120. In Step 2120, it determines whether an obstacle is still present based on whether there are reflected waves of the milliwave radar generated by the vehicle separation sensor 12. If there are not reflected waves of the milliwave radar at this stage, the CPU 10a makes a determination of "No" in Step 2120 and proceeds to Step 2125. In Step 2125, it sets the value of the state variable MODE to 4, and it proceeds to Step 2115.

If an obstacle is still present, the CPU 10a makes a determination of "Yes" in Step 2120, it proceeds to Step 2130, and it sets the parameters for intervention braking in the same manner as in the above Step 1705 (FIG. 17). Then, the CPU 10a proceeds to Step 2135 and performs processing of the warning determining subroutine of FIG. 18. Namely, in Step 2130 and Step 2135, it determines whether a state for performing intervention braking continues.

As a result, if a state for performing intervention braking ends, the value of the instruction issuance permission flag F is set to 0 in Step 1875 of FIG. 18. Therefore, the CPU 10a proceeds from Step 2135 to Step 2140. In Step 2140, it determines whether an object present in front of the driven vehicle is a stationary object by determining whether the speed Vf of the preceding vehicle is larger than the above-described prescribed speed Vf0. When the speed Vf of the preceding vehicle is larger than the above-described prescribed speed Vf0 (the case of a non-stationary object), the CPU 10a makes a determination of "Yes" in Step 2140 and proceeds to Step 2145. In Step 2145, it sets the value of the state variable MODE to 5, and then it proceeds to Step 2115. Due to the determination of a nonstationary object in Step 2140, vehicle separation control (MODE-5) is carried out during intervention braking with respect to the preceding vehicle which is moving (running).

On the other hand, when a state in which intervention braking should be performed continues, the value of the instruction issuance permission flag F is set to 1 in Step 1870 of FIG. 18. Therefore, the CPU 10a proceeds from Step 2135 to Step 2115. In addition, when it is determined in the above Step 2140 that the speed Vf of the preceding vehicle is smaller than the prescribed speed Vf0, the CPU 10a proceeds to Step 2115.

In Step 2115, the CPU 10a generates an instruction for outputting a warning sound and image for carrying out a warning corresponding to intervention braking. Then, the CPU 10a proceeds to Step 2150, it performs the subroutine for calculating the target deceleration GT shown in FIG. 20 to determine the target deceleration GT corresponding to intervention braking, and then it returns to Step 1430 of FIG. 14 by way of Step 2195.

Figure 21:
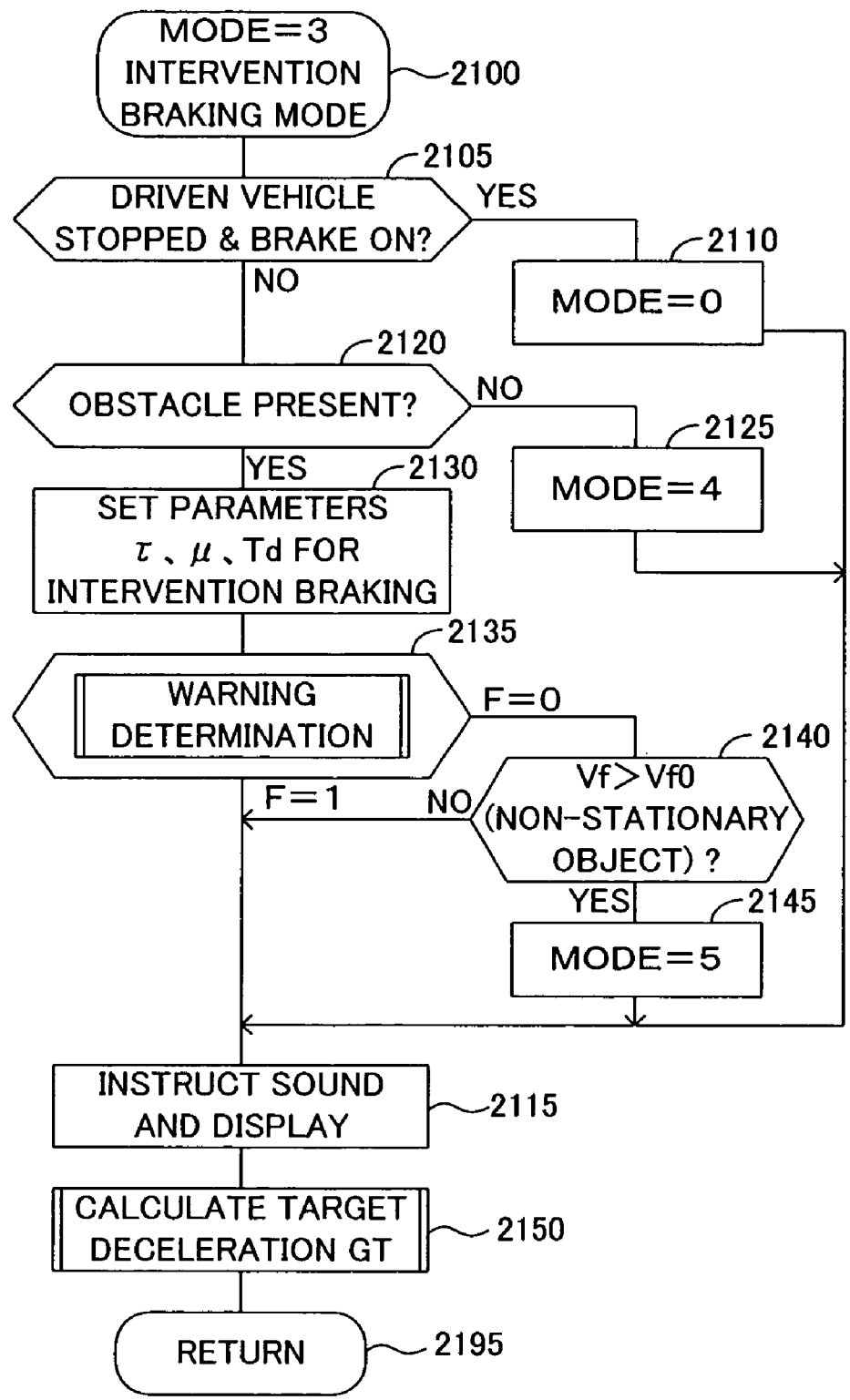
FIG. 21 is a flow chart showing an intervention braking mode routine which is executed by the CPU shown in FIG. 1.

As a result, in Step 1430, the CPU 10a makes the warning apparatus 30 generate a warning sound and an image instructed by Step 2115 of FIG. 21. Then, the CPU 10a proceeds to Step 1435, it performs processing based on the target deceleration GT for intervention braking found in Step 2150 of FIG. 21, to output an instruction signal to the brake actuator 40 so that the absolute value of the actual deceleration GD becomes equal to the target deceleration GT, and it controls the braking force.

(MODE-4 . . . G Reducing Mode)

Next, the case will be explained in which an obstacle disappears and the value of the state variable MODE is set to 4 when intervention braking is being carried out, i.e., the case in which a determination of "No" is made in Step 2120 of FIG. 21 and in Step 2125 the value of the state variable MODE is set to 4. In this case, the CPU 10*a* proceeds from Step 1420 of FIG. 14 to Step 1455 and it begins processing of the MODE-4 (G reducing mode) subroutine shown in FIG. 22 from Step 2200. This MODE-4 is a mode in which the target deceleration GT is decreased in a stepwise manner (gradually) in order to prevent the generation of a shock due to a large change in acceleration due to a sudden increase in vehicle separation D and an abrupt termination of intervention braking (a rapid decrease in braking force) when the preceding vehicle changes lanes or the like during intervention braking. The specifics of processing will be described below.

When the CPU 10*a* starts processing from Step 2200, it proceeds to Step 2205 and determines whether the target deceleration GT is smaller than a prescribed relatively small deceleration GT0 (such as 0.2·g). During intervention braking, the target deceleration GT is larger than the prescribed deceleration GT0, so the CPU 10*a* makes a determination of "No" in Step 2205 and proceeds to Step 2210, and in Step 2210 it instructs the output of a warning sound an image for carrying out a warning with respect to intervention braking. Then, the CPU 10*a* proceeds to Step 2215. In Step 2215, it sets a new value of the target deceleration GT equal to the target deceleration GT at that time minus a fixed value ΔGT, and as a result, the target deceleration GT at the time of intervention braking gradually decreases. Then, the CPU 10*a* returns to Step 1430 of FIG. 14 by way of Step 2295.

Figure 22:
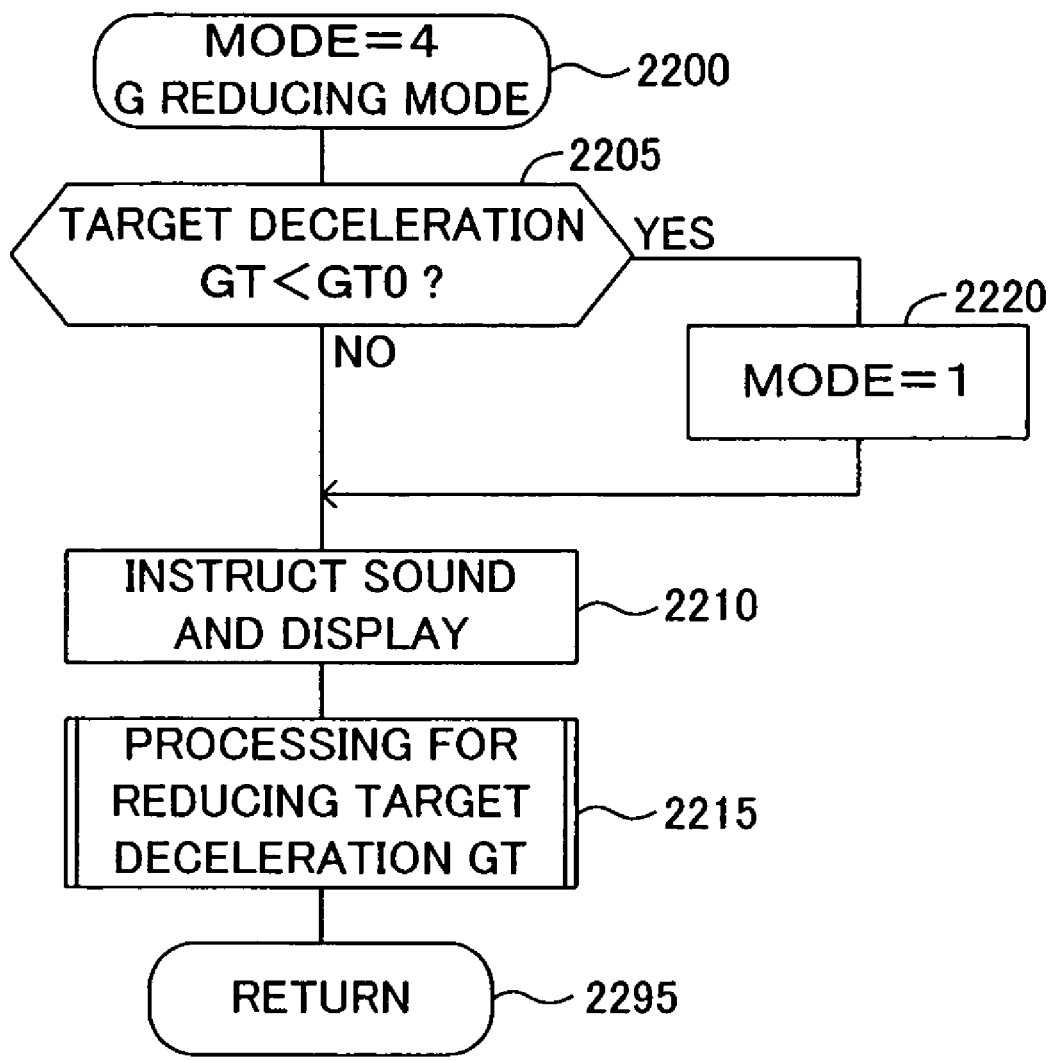
FIG. 22 is a flow chart showing a G reducing mode routine which is executed by the CPU shown in FIG. 1.

As a result, in Step 1430, the CPU 10*a* makes the warning apparatus 30 generate a warning sound and image corresponding to the intervention braking which was instructed in Step 2210 of FIG. 22. Then, the CPU 10*a* proceeds to Step 1435 and it performs processing based on the target deceleration GT which was gradually decreased in Step 2215 of FIG. 22, and when the absolute value of the actual deceleration GD is smaller than the absolute value of the target deceleration GT, it outputs an instruction signal to the brake actuator 40 to increase the braking hydraulic pressure to thereby increasing the braking force.

Then, as time passes and Step 2215 is repeatedly performed, the target deceleration GT becomes smaller than the prescribed deceleration GT0, so the CPU 10*a* makes a determination of "Yes" when executing the above Step 2205 and proceeds to Step 2220, and in Step 2220 it sets the value of the state variable MODE to 1. As a result, the CPU 10*a* proceeds from Step 1420 of FIG. 14 to Step 1425.

(MODE-5 . . . Vehicle Separation Control Mode)

Next, the case will be explained in which when intervention braking is being carried out, it becomes unnecessary to perform intervention braking, and the value of the state variable MODE is set to 5, i.e., the case in which the CPU 10*a* proceeds from Step 2135 of FIG. 21 to Step 2140, in Step 2140 it makes a determination of "Yes", it proceeds to Step 2125 to set the value of the state variable MODE to 5. This MODE-5 (vehicle separation control mode) is a mode in which the speed V of the driven vehicle is reduced due to intervention braking with respect to the preceding vehicle which is moving, to an extent that it is not necessary to carry out intervention braking, then the target deceleration GT is made a small value GTs (such as 0.1·μmax·g) to realize gentle deceleration to guarantee a safe vehicle separation which will not cause the first warning.

Figure 23:
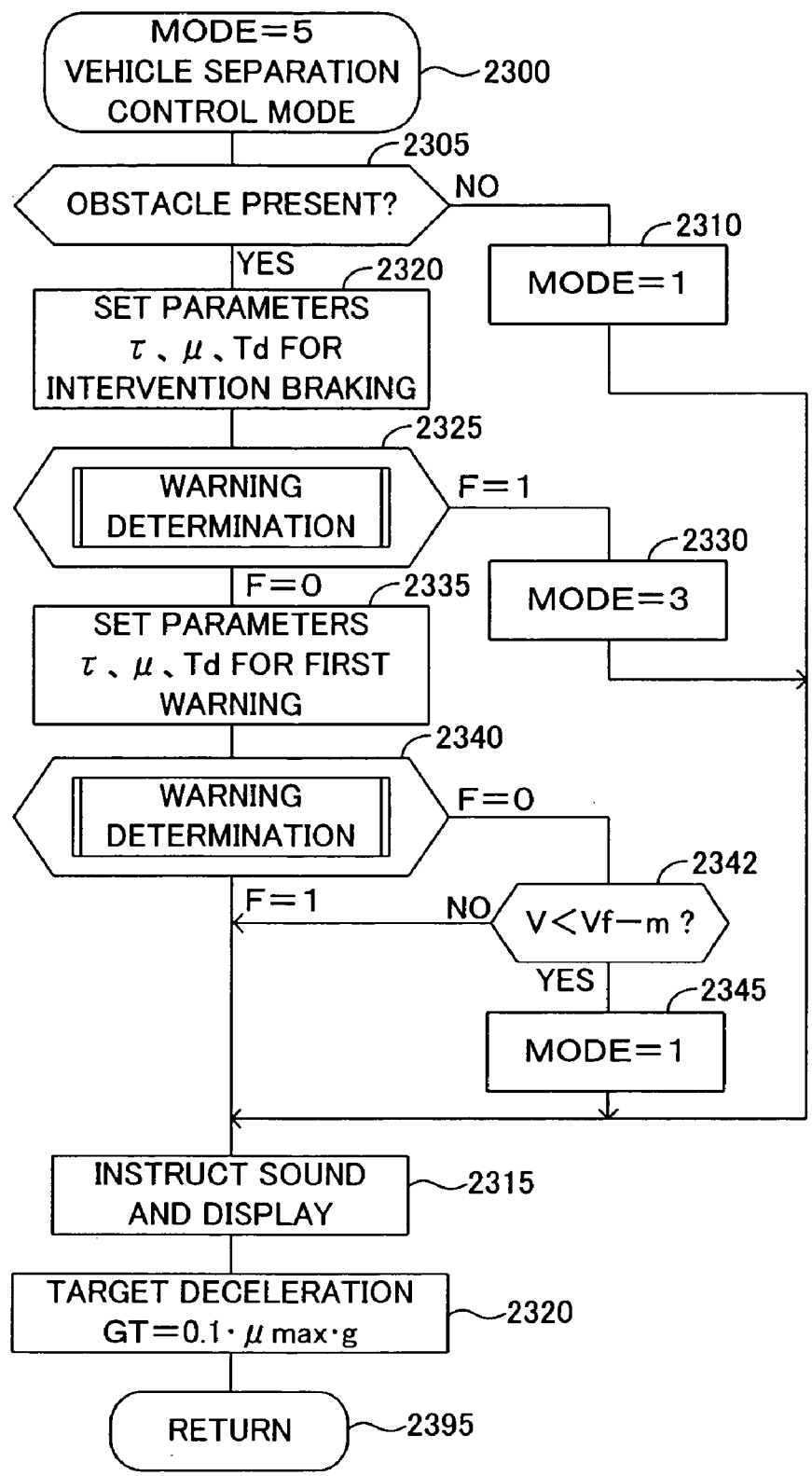
FIG. 23 is a flow chart showing a vehicle separation control mode routine which is executed by the CPU shown in FIG. 1.

In this case, the CPU 10*a* proceeds from Step 1420 of FIG. 14 to Step 1460, it begins processing of the MODE-5 (vehicle separation control mode) subroutine shown in FIG. 23 from Step 2300, and in subsequent Step 2305, it determines whether an obstacle is still present based on the presence of reflected waves of milliwave radar generated by the vehicle separation sensor 12. If there are no reflected waves of milliwave radar at this stage, the CPU 10*a* makes a determination of "No" in Step 2305 and proceeds to Step 2310, and in Step 2310 it sets the value of the state variable MODE to 1 and proceeds to Step 2315.

If an obstacle is still present, the CPU 10*a* makes a determination of "Yes" in Step 2305 and proceeds to Step 2320. In Step 2320, it sets the parameters for intervention braking in the same manner as in the above Step 1705, and it proceeds to Step 2325 and performs processing of the warning determining subroutine of FIG. 18. Namely, it is determined in Step 2320 and Step 2325 whether a state occurs for again carrying out intervention braking.

If a state occurs in which intervention braking should be performed, the value of the instruction issuance permission flag F is set to 1 in Step 1870 of FIG. 18, so the CPU 10*a* proceeds from the above Step 2325 to Step 2330 and sets the value of the state variable MODE to 3, and then it proceeds to Step 2315. On the other hand, if a state does not occur in which intervention braking should be performed, the value of the instruction issuance permission flag F is set to 0 in Step 1875 of FIG. 18, so the CPU 10*a* proceeds from the above Step 2325 to Step 2335.

In Step 2335, the CPU 10*a* sets the parameters for the first warning (however the idle running time τ has the value for a brake "off" state) in the same manner as in the above Step 1735, it proceeds to Step 2340, and it performs processing of the warning determining subroutine of FIG. 18. Namely, in Step 2335 and Step 2340, a determination is made whether a state occurs in which the first warning should be performed.

At this time, if a state does not occur in which the first warning should be performed, the value of the instruction issuance permission flag F is set to 0 in Step 1875 of FIG. 18, so the CPU 10*a* proceeds from Step 2340 to Step 2342, and in Step 2342, it determines whether the speed V of the driven vehicle is a speed which is smaller than the speed Vf of the preceding vehicle by more than a low speed m (such as 5 kilometers per hour). This is to guarantee safety even if MODE-5 (vehicle separation control mode) is terminated, since the speed V of the driven vehicle becomes a sufficiently smaller value than the speed Vf of the preceding vehicle. If the speed V of the driven vehicle has become smaller than a speed equal to the speed Vf of the preceding vehicle minus the speed m, the CPU 10*a* makes a determination of "Yes" in Step 2342 and proceeds to Step 2345. In Step 2345, it sets the value of the state variable MODE to 1, and then it proceeds to subsequent Step 2315. Step 2342 is provided because of the following reason. If the speed V of the driven vehicle becomes smaller than a speed equal to the speed Vf of the preceding vehicle minus the speed m, it is possible to avoid with certainty the situation in which the CPU 10*a* proceeds to Step 2345 to thereby end the MODE-5 (vehicle separation control mode) and enter the MODE-1 (non-warning mode) and carries out the first warning again immediately after the entry to the MODE-1.

It should be noted that, in the above Step 2335, the margin vehicle separation d0 is preferably increased by a prescribed value d0α (>0) and the value d0+d0α is used as d0 in Step 1815 of FIG. 18.

This also makes it possible to avoid with certainty the situation in which the CPU 10a proceeds to Step 2340 to thereby end the MODE-5 (vehicle separation control mode) and enter the MODE-1 (non-warning mode) and carries out the first warning again immediately after the entry to the MODE-1.

On the other hand, in the case in which a situation occurs in which the first warning should be carried out, the value of the instruction issuance permission flag F is set to 1 in Step 1870 of FIG. 18, so the CPU 10a proceeds from Step 2340 to Step 2315, and in Step 2315 it instructs an output of a warning sound and image for carrying out a warning with respect to intervention braking. Then, the CPU 10a proceeds to Step 2320. In Step 2320, it sets the value of the target deceleration GT to a prescribed small value GTs (such as 0.1·$\mu$max·g), and it returns to Step 1430 of FIG. 14 by way of Step 2395.

As a result, in Step 1430, the CPU 10a causes the warning apparatus 30 to generate a warning sound and image for intervention braking which were instructed in Step 2315 of FIG. 23. Then, the CPU 10a proceeds to Step 1435 and performs processing based on the target deceleration GT which was made the above-mentioned prescribed small value, and it outputs an instruction signal to the brake actuator 40 so that the actual deceleration GD becomes equal to the target deceleration GT. As a result, gentle deceleration is carried out.

If such deceleration is continued, the driven vehicle can be made to fall back until a prescribed vehicle separation is guaranteed without a large decrease in speed with respect to the preceding vehicle. As a result, since it is determined that a state no longer exists in which the first warning should be performed by the execution of Step 2340 of FIG. 23, the CPU 10a proceeds from Step 2340 to Step 2345, and the execution of MODE-1 (non-warning mode) is recommenced.

Next, "$\mu$max check control" in the above embodiment will be described.

$\mu$max Check Control

The above determination of whether to perform the first warning, the second warning, and intervention braking is based on finding the closest approach distance dmin assuming that the condition of the preceding vehicle (the deceleration $\mu$f of the preceding vehicle) which is recognized by the electric controller 10 at the present time (t=0) continues without change. However, as shown by the dashed line in FIG. 26, if at time t1 the preceding vehicle suddenly performs rapid braking (emergency braking) and undergoes rapid deceleration (deceleration=$\mu$max·g), due to the sum ($\tau$1) of the time for the electric controller 10 to recognize the condition of the preceding vehicle and the time required to make a determination of the necessity for the first warning, the second warning, or intervention braking, there is the fear of the driven vehicle approaching extremely close to the preceding vehicle.

Figure 26:
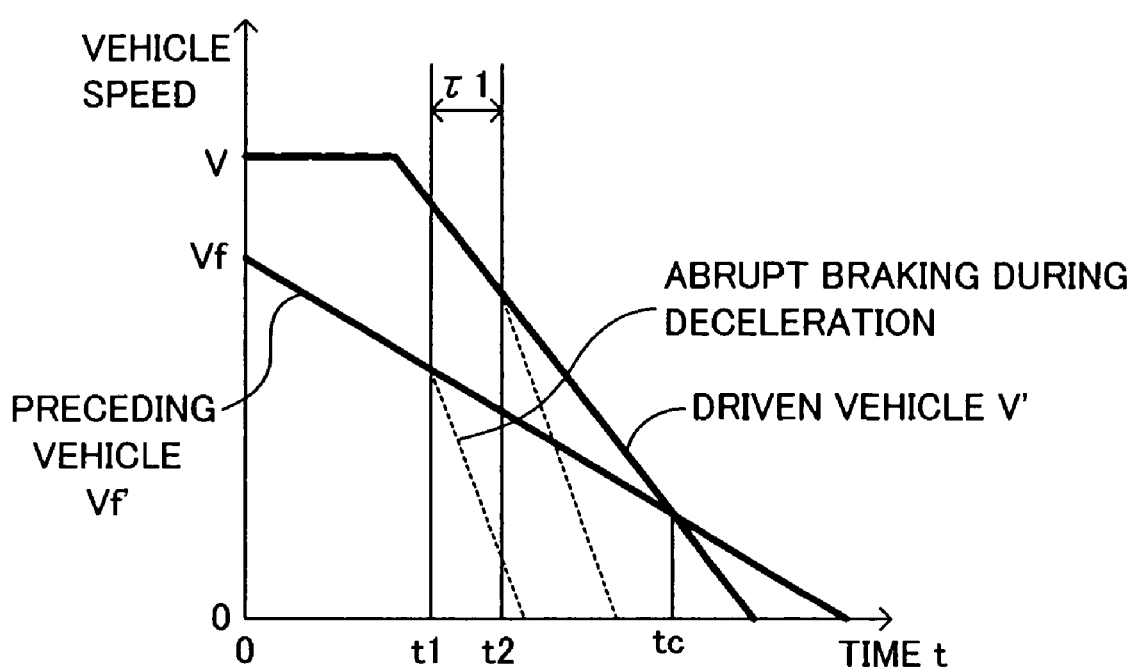
FIG. 26 is a figure showing the change in speed with respect to time of the driven vehicle and the preceding vehicle for explaining $\mu$max check control.

In $\mu$max check control, as shown in FIG. 26, it is assumed that the preceding vehicle decelerates at a maximum deceleration (=$\mu$max·g) determined by the road surface coefficient of friction $\mu$max at an arbitrary time (at time t=t1 in FIG. 26) between the present time (t=0) and the time of closest approach (t=tc) predicted at the present time. In this case, it is determined whether there is a need to carry out the first warning, the second warning, or intervention braking, from the standpoint that whether the margin vehicle separation d0 in Equation 34 is maintained between the driven vehicle and the preceding vehicle, if the driven vehicle decelerates with a maximum braking force with a delay of the sum ($\tau$1) of the lag time for recognition of the condition and the like of the preceding vehicle and the driven vehicle and the calculation processing time required to determine the need for the first warning, the second warning, and intervention braking by the above-described sensors 11–21 and the like and the electric controller 10. Thus, when it is determined that there is a need to perform the first warning, the second warning, or intervention braking, the first warning, the second warning, or intervention braking is carried out even before the need for the first warning, the second warning, or intervention braking is determined by use of the method using the first closest approach distance predicting means based on Table 1, in which the closest approach distance (the first closest approach distance) dmin is found assuming that the condition of the preceding vehicle (the deceleration $\mu$f of the preceding vehicle) will continue unchanged.

The actual conditions for carrying out the above-described $\mu$max check control, the closest approach distance (the second closest approach distance) dmin, and the speed at the time of closest approach (the second speed at the time of closest approach) Vs are as shown in Table 4. The CPU 10a which executes the equations shown therein performs the function of a second closest approach distance predicting means. This $\mu$max check control is carried out with respect to the first warning, the second warning, and intervention braking for the case of closest approach when the preceding vehicle is moving (when the operating region of the driven vehicle is in region (3) or (4) of FIG. 11). In actuality, a corresponding first warning, second warning, and intervention braking are carried out by comparing the second closest approach distance dmin found based on the above Table 4 and, for example, the above-described margin vehicle separation d0 as the suitable vehicle separation in this case (the second suitable vehicle separation) using a routine like that shown in FIG. 18 (for example, the second suitable vehicle separation dmin is found by Steps 1845, 1855, and the like of FIG. 18, and the right side of Step 1815 is made equal to the margin vehicle separation d0). The target deceleration (second target deceleration) GT (=$\mu$r·g) for each warning and for intervention braking is made equal to the above-described maximum permissible speed ($\mu$max·g).

TABLE 4

| Conditions of applicability | dmin: closest approach distance U = $\tau$ − $\tau$1 |
| --- | --- |
| Conditions of applicability of region (3) of Table 1 plus $\mu$max $\geq$ $\mu$ + $\mu$f + $\Delta\mu$ | |
| (V − $\tau$1 · $\mu$g) · ($\mu$max − $\mu$) > (Vf − $\mu$f · g · $\tau$) · ($\mu$max − $\mu$f) | dmin = D − (($\mu$ · (V + $\mu$ · g · U) − $\mu$f · Vf + (Vf − V − $\mu$ · g · U) · $\mu$max)$^2$/(2 · g · ($\mu$ − $\mu$f) · ($\mu$max − $\mu$ − $\mu$f)) + ((V + $\mu$ · g · U)$^2$ − Vf$^2$)/(2 · $\mu$max · g) − $\mu$ · g · U$^2$/2 + $\tau$1 · V) |

TABLE 4-continued

| Conditions of applicability | dmin: closest approach distance $U = \tau - \tau 1$ |
|---|---|
| $(V - \tau 1 \cdot \mu g) \cdot (\mu max - \mu) \leq$ $(Vf - \mu f \cdot g \cdot \tau) \cdot (\mu max - \mu f)$ Conditions of applicability of region (3) of Table 1 plus $\mu max \leq \mu + \mu f - \Delta \mu$ | dmin = $D - ((V - Vf) \cdot \tau + \mu f \cdot g \cdot \tau^2/2 + (V^2 - (Vf - \mu f \cdot g \cdot \tau)^2/(2 \cdot \mu max \cdot g) + \tau 1 \cdot V)$ Same as above |
| Conditions of applicability of region (3) of Table 1 plus $\mu + \mu f - \Delta \mu < \mu max < \mu + \mu f + \Delta \mu$ Conditions of applicability of region (4) of Table 1 plus $\mu f \cdot g < -0.05G$ & during idle running time | dmin = $D - ((V - Vf) \cdot \tau + \mu \cdot g \cdot (\tau^2 - \tau 1^2)/2 - (Vf^2 - (V + \mu \cdot g \cdot U)^2 + 2 \cdot g \cdot \tau \cdot (\mu \cdot (V + \mu \cdot g \cdot U) - \mu f \cdot Vf))/(2 \cdot \mu max \cdot g) + \tau 1 \cdot V)$ |
| $V \leq (1 - \mu f/\mu max) \cdot Vf$ $V > (1 - \mu f/\mu max) \cdot Vf$ | dmin = $D - ((V^2 - Vf^2)/(2 \cdot \mu max \cdot g) + \tau 1 \cdot V)$ dmin = $D - ((V^2 - Vf^2)/(2 \cdot \mu max \cdot g) - (\mu max \cdot (Vf - V) - \mu f \cdot Vf)^2/(2 \cdot \mu max \cdot \mu f \cdot (\mu max - \mu f) \cdot g) + \tau 1 \cdot V)$ |

In the above Table 4, the value U is shown by the below Equation 51, the value $\Delta \mu$ is the LSB of the value $\mu$ which is dealt with by the electric controller 10, and $\mu max$ in the table is the value of the road surface slope after correction which is given by the below Equation 52 when the vehicle is traveling on a downwardly sloping road with an angle $\theta$. This correction of the road surface slope is applied because the maximum acceleration which can be achieved by a vehicle differs even when the road surface coefficient of friction $\mu max$ (before correction) is the same.

$U = \tau - \tau 1$      Equation 51

$\mu max = \mu max$ (before correction)$\cdot \cos \theta - \sin \theta$      Equation 52

In the above manner, according to this embodiment, a warning or braking force are generated with an appropriate timing, and cancellation thereof is carried out in a state when a warning or braking force will not again be generated immediately after cancellation thereof. In addition, the target deceleration is determined so as to guarantee an appropriate vehicle separation, so the vehicle speed can be reduced to a safe level, a safe vehicle separation can be maintained, and the vehicle can be safely stopped.

Here, if the above steps are grouped as separate means for accomplishing the functions of the above steps, Steps 1825, 1835, 1845, and 1855 form a portion of a closest approach distance predicting means and a means for predicting the speed at the time of closest approach. The right side of Step 1815 forms a portion of a suitable vehicle separation determining means. Steps 1430 and 1435, Step 1610, all the steps in FIG. 17, and Steps 1815, 1870, and 1875 form a portion of a collision preventing means. Steps 1735, 1740 (including the steps in FIG. 18), 1745, 1430, and 1435 form a portion of a first collision preventing means. Steps 1720, 1725 (including the steps in FIG. 18), 1730, 1430, and 1435 form a portion of a second collision preventing means. Steps 1705, 1710 (including the steps in FIG. 18), 1715, 1430, and 1435 form a portion of a second collision preventing means. Steps 1930 and 1935 (including the steps in FIG. 18), or Steps 2335, 2340 (including the steps in FIG. 18), and 2342 form a portion of a preventive measure continuing means.

In addition, Step 2005 forms a portion of a vehicle stopping determining means, and Step 2040 forms a portion of a braking force maintaining means (stopped state braking force maintaining means) which maintains the braking force in a stopped state. Step 2055 forms a portion of a braking operation determining means which determines whether the brake apparatus of the driven vehicle is being operated by the driver, Step 2060 forms a portion of a braking force maintaining canceling means which cancels maintaining of the braking force, and Step 2050 forms a portion of an engine stopping means which stops the engine of the driven vehicle. Furthermore, Step 1435 forms a portion of a braking force generating means together with the brake actuator 40, and all the steps of FIG. 18 form a portion of a target deceleration calculating means.

This invention is not limited to the above-described embodiments, and various variations can be employed within the scope of the present invention.

The invention claimed is:

1. A collision preventing apparatus for a vehicle comprising:
   preceding vehicle running condition detecting means for detecting the running condition of a preceding vehicle,
   driven vehicle running condition detecting means for detecting the running condition of a driven vehicle,
   vehicle separation detecting means for detecting the vehicle separation between the driven vehicle and the preceding vehicle,
   closest approach distance predicting means for predicting the closest approach distance between the driven vehicle and the preceding vehicle based on the detected running condition of the preceding vehicle, the detecting running condition of the driven vehicle, and the detected vehicle separation,
   suitable vehicle separation determining means for determining a suitable vehicle separation corresponding to a vehicle separation between the preceding vehicle and the driven vehicle which is predicted for a future, and
   collision preventing means for generating a warning or braking force when the predicted closest approach distance is smaller than the determined suitable vehicle separation.

2. A collision preventing apparatus for a vehicle as described in claim 1, wherein the suitable vehicle separation determining means predicts a speed of the driven vehicle when the distance between the preceding vehicle and the driven vehicle becomes the closest approach distance as the speed at a time of closest approach, and it determines the suitable vehicle separation based on the predicted speed at the time of closest approach.

3. A collision preventing apparatus for a vehicle as described in claim 2, wherein the suitable vehicle separation determining means determines the suitable vehicle separation based on a product of the predicted speed at the time of closest approach and a previously set length of time.

4. A collision preventing apparatus for a vehicle as described in claim 3, wherein the suitable vehicle separation determining means determines the suitable vehicle separation based on the product of the predicted speed at the time of closest approach and a previously set length of time plus a prescribed margin vehicle separation.

5. A collision preventing apparatus for a vehicle as described in claim 1, further comprising target deceleration calculating means for calculating a target deceleration necessary to maintain the suitable vehicle separation, wherein the preceding vehicle running condition detecting means includes preceding vehicle speed detecting means for detecting the speed of the preceding vehicle as a running condition of the preceding vehicle, and preceding vehicle deceleration detecting means for detecting the deceleration of the preceding vehicle as a running condition of the preceding vehicle, the driven vehicle running condition detecting means includes driven vehicle speed detecting means for detecting the speed of the driven vehicle as a running condition of the driven vehicle, and driven vehicle deceleration detecting means for detecting the deceleration of the driven vehicle as a running condition of the driven vehicle, the closest approach distance predicting means predicts the closest approach distance based on the detected speed of the preceding vehicle, the detected deceleration of the preceding vehicle, the detected speed of the driven vehicle, and the detected vehicle separation, and the collision preventing means includes braking force generating means for generating braking force so as to make the detected deceleration of the driven vehicle equal to the calculated target deceleration when the predicted closest approach distance becomes smaller than the determined suitable vehicle separation.

6. A collision preventing apparatus for a vehicle as described in claim 5, wherein the closest approach distance predicting means predicts the closest approach distance on the assumption that the preceding vehicle decelerates at a deceleration detected by the preceding vehicle deceleration detecting means and that the driven vehicle decelerates at a prescribed assumed deceleration after running at a speed detected by the driven vehicle speed detecting means for a prescribed idle running time.

7. A collision preventing apparatus for a vehicle as described in claim 5, wherein the target deceleration calculating means maintains the calculated target deceleration when the vehicle separation becomes less than or equal to the vehicle separation recognition limit of the vehicle separation detecting means.

8. A collision preventing apparatus for a vehicle as described in claim 5, wherein the target deceleration calculating means determines whether the preceding vehicle is moving when the predicted closest approach distance becomes larger than the determined suitable vehicle separation after braking force is generated by the braking force generating means, and when it is determined that the preceding vehicle is moving, the target deceleration is maintained at a prescribed deceleration until the detected vehicle separation becomes a prescribed vehicle separation.

9. A collision preventing apparatus for a vehicle as described in claim 5, wherein the target deceleration calculating means determines whether the calculated target deceleration is unstable, and when it is determined that the calculated target deceleration is unstable, a different stable value is set as the target deceleration.

10. A collision preventing apparatus for a vehicle as described in claim 5, including driven vehicle stopped state determining means for determining whether the driven vehicle is stopped, and stopped state braking force maintaining means for maintaining the braking force at a prescribed value when it is determined by the vehicle stopped state determining means that the driven vehicle is stopped when braking force is being generated by the braking force generating means when the predicted closest approach distance occurs when the driven vehicle is stopped.

11. A collision preventing apparatus for a vehicle as described in claim 10, including brake operation determining means for determining whether the brake apparatus of the driven vehicle is being operated by the driver, and braking force maintaining cancelling means for cancelling the maintaining of the braking force by the stopped state braking force maintaining means when it is determined that the brake apparatus is being operated.

12. A collision preventing apparatus for a vehicle as described in claim 11, wherein the brake operation determining means determines whether the brake apparatus is being operated based on whether the hydraulic pressure of the brake master cylinder of the driven vehicle is larger than a prescribed hydraulic pressure.

13. A collision preventing apparatus for a vehicle as described in claim 5, including driven vehicle stopped state determining means for determining whether the driven vehicle is stopped, and engine stopping means for stopping the engine of the driven vehicle when it is determined by the driven vehicle stopped state determining means that the driven vehicle is stopped when braking force is being generated by the braking force generating means when the predicted closest approach distance occurs when the driven vehicle is stopped.

14. A collision preventing apparatus for a vehicle comprising:

preceding vehicle running condition detecting means for detecting the running condition of a preceding vehicle, driven vehicle running condition detecting means for detecting the running condition of a driven vehicle, vehicle separation detecting means for detecting the vehicle separation between the driven vehicle and the preceding vehicle, closest approach distance predicting means for predicting the closest approach distance between the driven vehicle and the preceding vehicle based on the detected running condition of the preceding vehicle, the detecting running condition of the driven vehicle, the detected vehicle separation, and an assumed deceleration of the driven vehicle, and collision preventing means for generating a warning or braking force when the predicted closest approach distance is smaller than a prescribed suitable vehicle separation, wherein the closest approach distance predicting means predicts the closest approach distance with the assumed deceleration being a deceleration smaller than the maximum deceleration determined by the road surface coefficient of friction of the road surface on which the driven vehicle is running.

15. A collision preventing apparatus for a vehicle as described in claim 14, wherein the closest approach distance predicting means obtain the assumed deceleration by multiplying the product of the coefficient of friction of the road surface on which the driven vehicle is running and the acceleration of gravity by a coefficient smaller than 1.

16. A collision preventing apparatus for a vehicle comprising:
preceding vehicle speed detecting means for detecting the speed of a preceding vehicle,
preceding vehicle deceleration detecting means for detecting the deceleration of the preceding vehicle,
driven vehicle speed detecting means for detecting the speed of a driven vehicle,
vehicle separation detecting means for detecting the vehicle separation between the driven vehicle and the preceding vehicle,
first closest approach distance predicting means for predicting a first closest approach distance between the driven vehicle and the preceding vehicle based on the detected speed of the preceding vehicle, the detected deceleration of the preceding vehicle, the detected speed of the driven vehicle, and the detected vehicle separation on the assumption that the preceding vehicle decelerates at the detected deceleration of the preceding vehicle and that the driven vehicle decelerates at a prescribed assumed deceleration after running at the detected speed of the driven vehicle for a prescribed idle running time,
second closest approach distance predicting means for predicting a second closest approach distance based on the detected speed of the preceding vehicle, the detected deceleration of the preceding vehicle, the detected speed of the driven vehicle, and the detected vehicle separation second closest approach distance predicting means for predicting a second closest approach distance based on the detected speed of the preceding vehicle, the detected deceleration of the preceding vehicle, the detected speed of the driven vehicle, and the detected vehicle separation on the assumption that the preceding vehicle begins to decelerate at a maximum deceleration determined by a road surface coefficient of friction and the driven vehicle begins to decelerate at the maximum deceleration after a prescribed length of time from the starting point of the deceleration of the preceding vehicle at a maximum deceleration by the time when the driven vehicle most closely approaches the preceding vehicle on the assumption that the first closest approach distance predicting means uses, and
collision preventing means for generating a warning or braking force when the predicted first closest approach distance is smaller than a first suitable vehicle separation or the predicted second closest approach distance is smaller than a second suitable vehicle separation.

17. A collision preventing apparatus for a vehicle comprising:
preceding vehicle running condition detecting means for detecting the running condition of a preceding vehicle,
driven vehicle running condition detecting means for detecting the running condition of the driven vehicle,
vehicle separation detecting means for detecting the vehicle separation between the driven vehicle and the preceding vehicle,
closest approach distance predicting means for predicting the closest approach distance of the driven vehicle and the preceding vehicle based on the detected running condition of the preceding vehicle, the detecting running condition of the driven vehicle, the detected vehicle separation, and an assumed deceleration which is assumed for the driven vehicle, and
collision preventing means for generating a warning or braking force when the predicted closest approach distance is smaller than a prescribed suitable vehicle separation and for generating a warning or braking force when the actual vehicle separation detected by the vehicle separation detecting means is smaller than a prescribed distance.

18. A collision preventing apparatus for a vehicle as described in claim 17, wherein the driven vehicle running condition detecting means detects at least the speed of the driven vehicle, and the collision preventing means set a product of the detected speed of the driven vehicle and a previously set prescribed length of time plus a prescribed margin vehicle separation as the prescribed distance.

19. A collision preventing apparatus for a vehicle comprising:
preceding vehicle running condition detecting means for detecting the running condition of a preceding vehicle,
driven vehicle running condition detecting means for detecting the running condition of a driven vehicle,
vehicle separation detecting means for detecting the vehicle separation between the driven vehicle and the preceding vehicle,
closest approach distance predicting means for predicting the closest approach distance between the driven vehicle and the preceding vehicle based on the detected running condition of the preceding vehicle, the detecting running condition of the driven vehicle, the detected vehicle separation, and an assumed deceleration which is assumed for the driven vehicle,
suitable vehicle separation determining means for predicting a speed of the driven vehicle when the distance between the preceding vehicle and the driven vehicle becomes the closest approach distance as the speed at a time of closest approach and for determining a suitable vehicle separation based on the predicted speed at the time of closest approach, and
collision preventing means for generating a warning or braking force when the predicted closest approach distance is smaller than the suitable vehicle separation determined by the suitable vehicle separation determining means, and for stopping the generation of the warning or the braking force when the predicted closest approach distance has become larger than the suitable separation determined by the suitable vehicle separation determining means by a prescribed distance after the generation of the warning or the braking force.

20. A collision preventing apparatus for a vehicle comprising:
preceding vehicle speed detecting means for detecting the speed of a preceding vehicle,
preceding vehicle deceleration detecting means for detecting the deceleration of the preceding vehicle,
driven vehicle speed detecting means for detecting the speed of a driven vehicle,
vehicle separation detecting means for detecting the vehicle separation between the driven vehicle and the preceding vehicle,
first collision preventing means for predicting a first closest approach distance between the driven vehicle and the preceding vehicle and a first speed at a time of closest approach on an assumption that the preceding vehicle decelerates at the detected deceleration and that the driven vehicle decelerates at a first assumed deceleration after running for a first idle running time at the detected speed, and for generating a warning or braking force when the predicted first closest approach distance is smaller than a first suitable vehicle separation determined based on a product of the predicted first speed at the time of closest approach and a previously set first length of time, second collision preventing means for predicting a second closest approach distance between the driven vehicle and the preceding vehicle and a second speed at the time of closest approach on the assumption that the preceding vehicle decelerates at the detected deceleration and that the driven vehicle decelerates at a second assumed deceleration greater than the first assumed deceleration after running at the detected speed for a second idle running time less than the first idle running time and for generating a warning or braking force when the predicted second closest approach distance is smaller than a second suitable vehicle separation determined based on the product of the predicted second speed at the time of closest approach and a previously set second length of time which is less than the first length of time, and preventive measure continuing means for continuing the generation of a warning or braking force by the second collision preventing means until a situation is achieved where the warning or the braking force is no longer generated by the first collision preventing means when a warning or braking force has been generated by the second collision preventing means.

21. A collision preventing apparatus for a vehicle as described in claim 20, comprising brake operation determining means for determining whether a brake apparatus of the driven vehicle is being operated by the driver, wherein the first collision preventing means predicts the first closest approach distance with changing the first idle running time to a longer time when it is determined by the brake operation determining means that the brake is not being operated than when it is determined that the brake is being operated, and the preventive measure continuing means continues the generation of a warning or braking force by the second collision preventing means until a state is realized in which the warning or the braking force is not generated even if the first collision preventing means predicts the first closest approach distance based on the first idle running time which is changed to the longer time.

22. A collision preventing apparatus for a vehicle comprising:

preceding vehicle speed detecting means for detecting the speed of a preceding vehicle, preceding vehicle deceleration detecting means for detecting the deceleration of the preceding vehicle, driven vehicle speed detecting means for detecting the speed of a driven vehicle, vehicle separation detecting means for detecting the -vehicle separation between the driven vehicle and the preceding vehicle, brake operation determining means for determining whether the brake apparatus of the driven vehicle is being operated by the driver, collision preventing means for predicting a closest approach distance between the driven vehicle and the preceding vehicle based on the detected speed of the preceding vehicle, the detected deceleration of the preceding vehicle, the detected speed of the driven vehicle, and the detected vehicle separation, on an assumption that the preceding vehicle decelerates at the detected deceleration and that the driven vehicle decelerates at an assumed deceleration after running for a prescribed idle running time at the detected speed and for generating a warning or braking force when the predicted closest approach distance is smaller than a prescribed suitable vehicle separation, and idle running time changing means for changing the prescribed idle running time to a longer time when it is determined by the brake operation determining means that the brake is not being operated than when it is determined that the brake is being -operated.

23. A collision preventing apparatus for a vehicle comprising:

preceding vehicle speed detecting means for detecting the speed of a preceding vehicle, preceding vehicle deceleration detecting means for detecting the deceleration of the preceding vehicle, driven vehicle speed detecting means for detecting the speed of a driven vehicle, vehicle separation detecting means for detecting the vehicle separation between the driven vehicle and the preceding vehicle, parameter storing means for storing a plurality of sets of parameters which determine an idle running time, an assumed vehicle deceleration of the driven vehicle, and a suitable vehicle separation, to output one of the plurality of stored sets of parameters in response to operation from the outside, and collision preventing means for predicting a closest approach distance between the driven vehicle and the preceding vehicle based on the detected speed of the preceding vehicle, the detected deceleration of the preceding vehicle, the detected speed of the driven vehicle, and the detected vehicle separation on an assumption that the preceding vehicle decelerates at the detected deceleration and that the driven vehicle decelerates at an assumed deceleration determined based on the output parameter after running at the detected speed for a prescribed idle running time determined based on the output parameter and for generating a warning or braking force when the predicted closest approach distance is smaller than a suitable vehicle separation determined based the output parameter.

24. A collision preventing apparatus for a vehicle as described in claim 23, wherein the suitable vehicle separation is determined by a product of a speed at the time of closest approach predicted under the above assumptions and a predetermined length of time, and the parameter which determines the suitable vehicle separation is predetermined length of time.

25. A collision preventing apparatus for a vehicle comprising:

preceding vehicle running condition detecting means for detecting the running condition of a preceding vehicle, driven vehicle running condition detecting means for detecting the running condition of a driven vehicle, vehicle separation detecting means for detecting the vehicle separation between the driven vehicle and the preceding vehicle, closest approach distance predicting means for predicting the closest approach distance between the driven vehicle and the preceding vehicle based on the detected running condition of the preceding vehicle, the detected running condition of the driven vehicle, and the detected vehicle separation, suitable vehicle separation determining means for predicting, as speed at the time of closest approach, a speed of the driven vehicle at the time when the distance between the preceding vehicle and the driven vehicle becomes the closest approach distance and for determining, as a suitable vehicle separation corresponding to a vehicle separation between the preceding vehicle and the driven vehicle which is predicted for a future, a value obtained through addition of a prescribed margin vehicle separation to a product of the predicted speed at the time of closest approach and a headway time, which is set on the basis of a value obtained through division of a vehicle separation between the preceding vehicle and the driven vehicle which a drive usually maintains when the driver drives the driven vehicle at the same speed as that of the preceding vehicle by the same speed, and collision preventing means for generating a warning or a braking force when the predicted closest approach distance is smaller than the determined suitable vehicle separation.

* * * * *